United States Patent [19]

Andros et al.

[11] Patent Number: 5,121,115
[45] Date of Patent: Jun. 9, 1992

[54] METHOD OF TRANSMITTING INFORMATION USING PROGRAMMED CHANNELS

[75] Inventors: Andrew A. Andros, Spring, Tex.; Thomas J. Campana, Jr., Chicago, Ill.; Gary F. Thelen, Palos Park, Ill.; Robert A. Kinast, Chicago, Ill.

[73] Assignee: Telefind Corporation, Coral Gables, Fla.

[21] Appl. No.: 409,390

[22] Filed: Sep. 19, 1989

Related U.S. Application Data

[63] Continuation-in-part of Ser. No. 158,984, Feb. 22, 1988, Pat. No. 4,868,562.

[51] Int. Cl.⁵ .............................................. H04Q 9/00
[52] U.S. Cl. ............................ 340/825.02; 455/31.1; 379/57
[58] Field of Search ........... 340/825.44, 311.1, 825.48, 340/825.02; 455/31, 38; 379/56, 57, 59, 60; 370/94.1

[56] References Cited

U.S. PATENT DOCUMENTS

| | | | |
|---|---|---|---|
| 4,155,040 | 5/1979 | Harmon et al. | 455/31 |
| 4,178,476 | 12/1979 | Frost | 379/56 |
| 4,577,060 | 3/1985 | Webb et al. | 379/56 |
| 4,644,351 | 2/1987 | Zabarsky et al. | 340/825.44 |
| 4,706,080 | 11/1987 | Sincoskie | 340/825.02 |
| 4,713,808 | 12/1987 | Gaskill et al. | 370/94.1 |
| 4,740,954 | 4/1988 | Cotton et al. | 340/825.02 |
| 4,891,637 | 1/1990 | Siwiak et al. | 340/825.44 |
| 4,891,638 | 1/1990 | Davis | 340/825.44 |

FOREIGN PATENT DOCUMENTS

| | | | |
|---|---|---|---|
| 0285164 | 10/1988 | European Pat. Off. | 379/59 |
| 0085943 | 7/1981 | Japan | 379/59 |

Primary Examiner—Donald J. Yusko
Assistant Examiner—Edwin C. Holloway, III

[57] ABSTRACT

A paging network is disclosed which utilizes a plurality of distributed switches to transmit pages on a non-real time basis to achieve efficient and low cost transmission. Each of the switches processes packets of pages received from the network. Each of the switches also processes pages into packets of pages to be transmitted to another switch in the network or into batches of pages to be transmitted by a local paging service if the switch is a local switch. The network dynamically programs the reception channel(s) of the paging receivers in response to traffic conditions of a local switch or in accordance with service options specified by a subscriber to a local paging service. The digits of the paging receiver identification code are transmitted in an order of increasing significance to conserve battery life of the paging receivers. Pages may be initiated by placing a local call to any lata switch in the network and service options may be varied by placing of a local call to a lata switch.

30 Claims, 42 Drawing Sheets

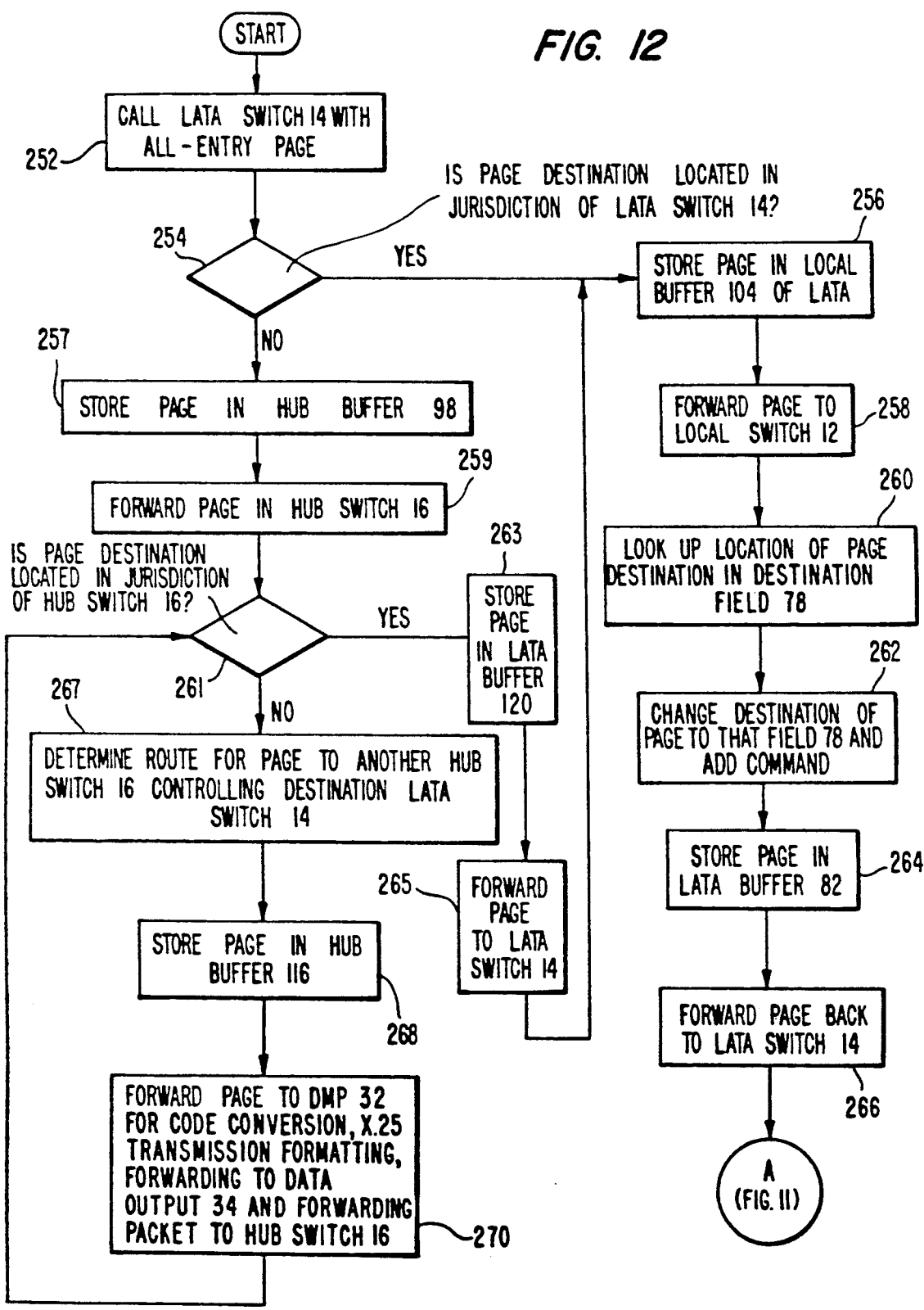

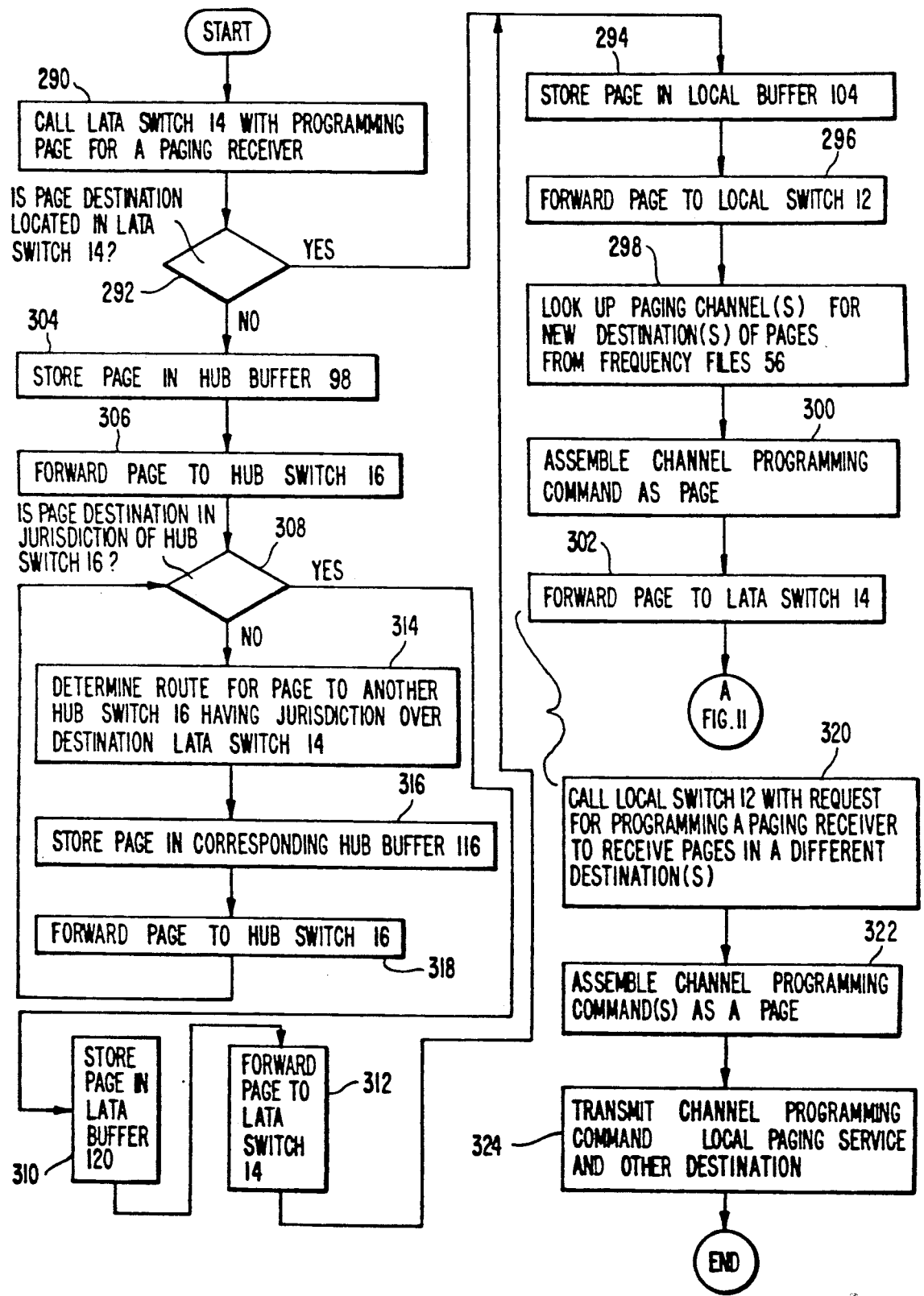

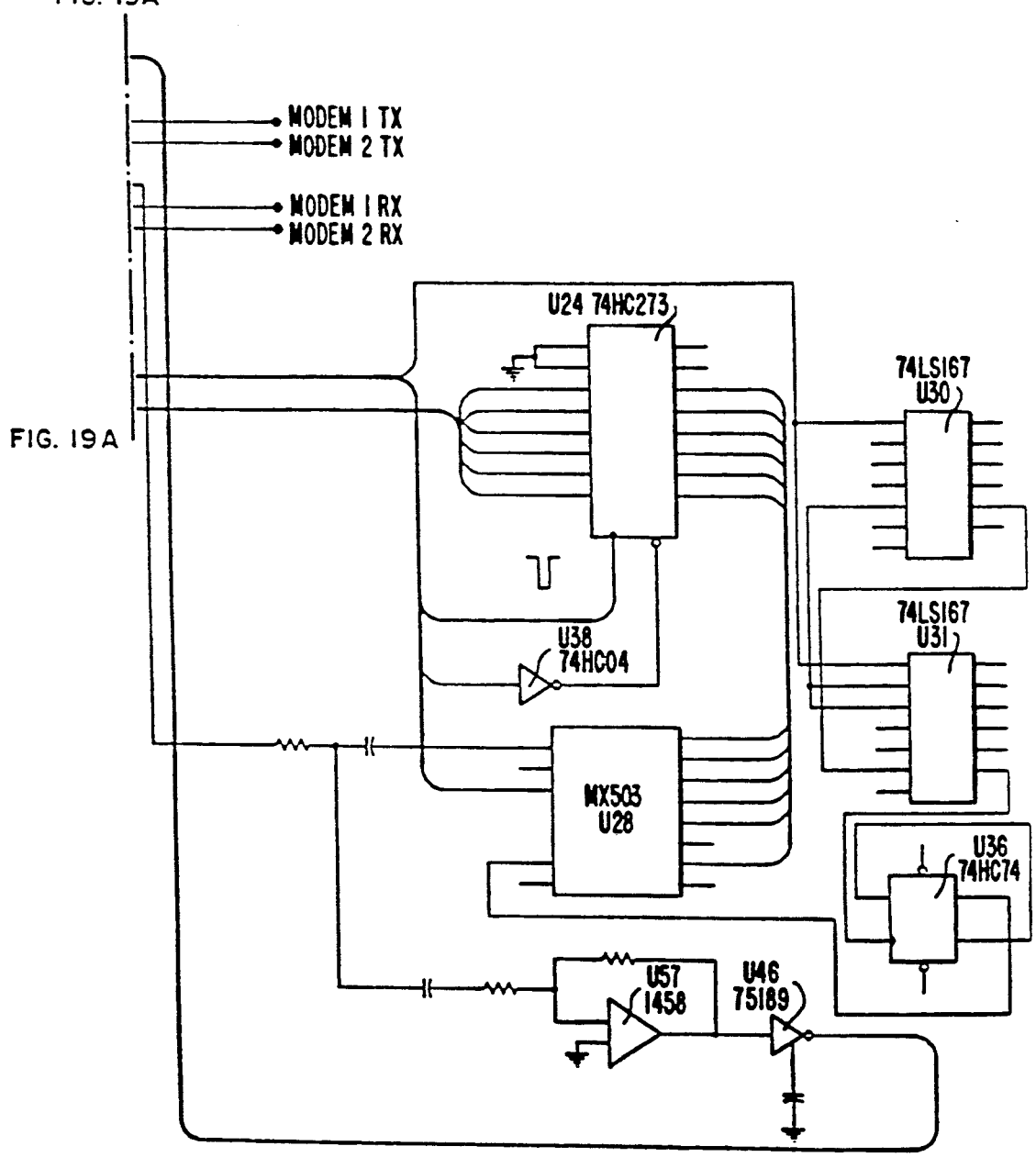

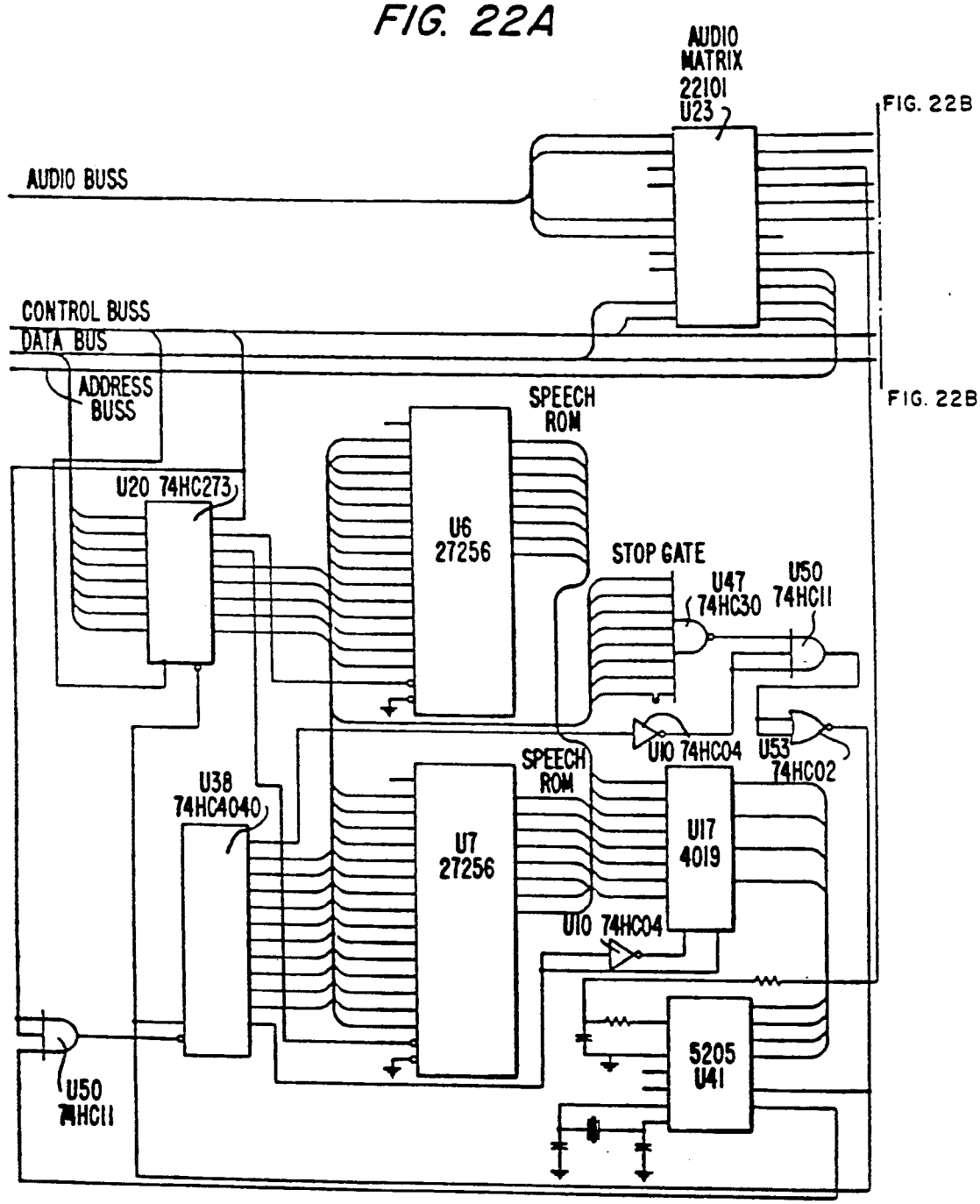

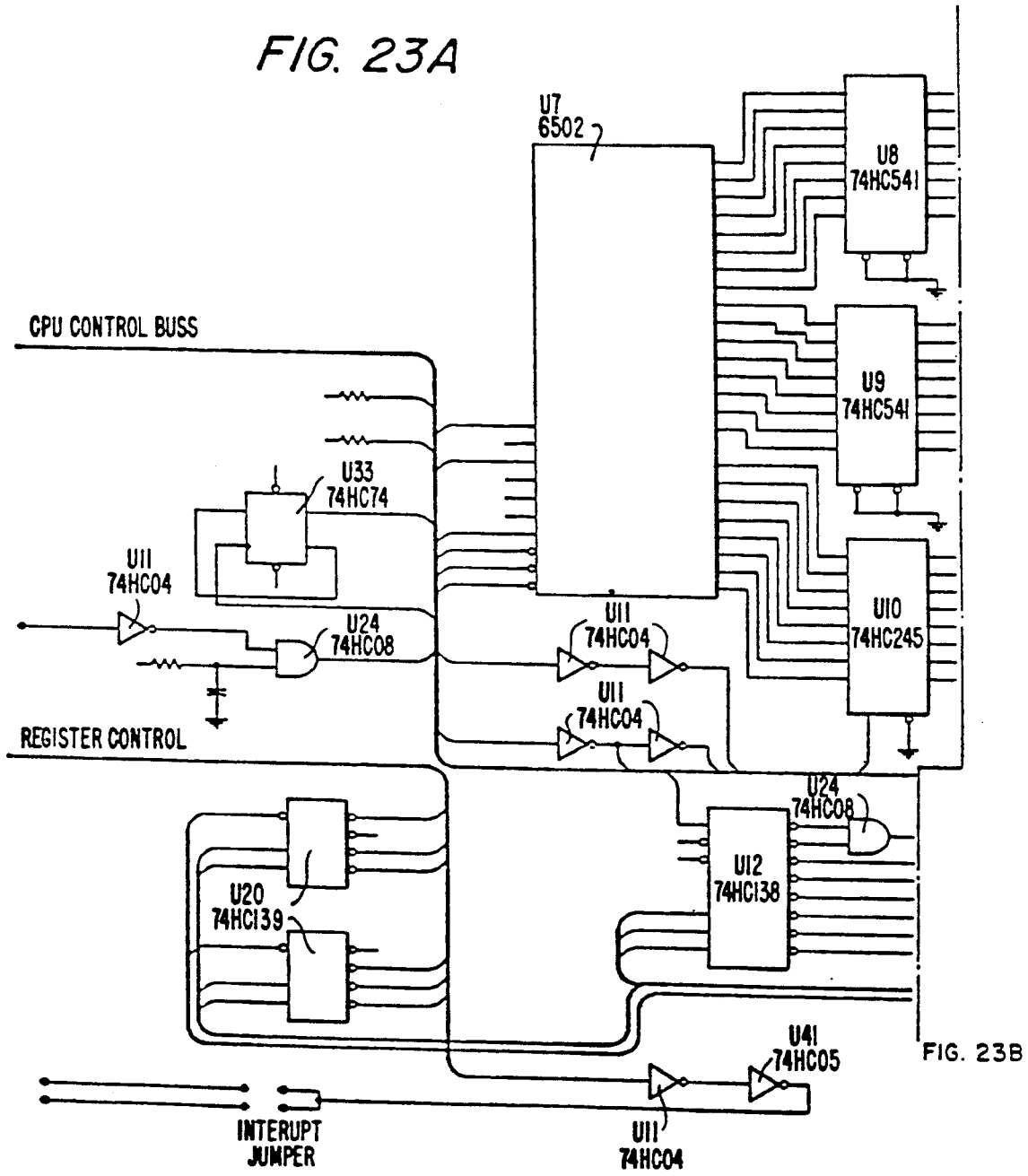

FIG. 25A

| DATA BOARD MEMORY MAP |||
|---|---|---|
| FFFF<br>C000 | 16K EPROM ||
| BFFF<br>A01F ERROR CONTROL REGISTER (ECR)<br>A01E CLOCK CONTROL REGISTER (CCR)<br>A01D BAUD RATE DIVIDER REGISTER 2 (BRDR2)<br>A01C BAUD RATE DIVIDER REGISTER 1 (BRDR1)<br>A01B ADDRESS REGISTER 2 (AR2)<br>A01A ADDRESS REGISTER 1 (AR1)<br>A019 PROTOCOL SELECT REGISTER 2 (PSR2)<br>A018 PROTOCOL SELECT REGISTER 1 (PSR1)<br>A015 SERIAL INTERRUPT ENABLE REGISTER (SIER) | A011 SERIAL INTERFACE CONTROL REGISTER (SICR)<br>A010 SERIAL INTERFACE STATUS REGISTER (SISR)<br>A00D TRANSMITTER INTERRUPT ENABLE REGISTER (TIER)<br>A00A TRANSMITTER DATA REGISTER (TDR)<br>A009 TRANSMITTER CONTROL REGISTER (TCR)<br>A008 TRANSMITTER STATUS REGISTER (TSR)<br>A005 RECEIVER INTERRUPT ENABLE REGISTER (RIER)<br>A002 RECEIVER DATA REGISTER (RCR)<br>A001 RECEIVER CONTROL REGISTER (RCR)<br>A000 RECEIVER STATUS REGISTER (RSR) | MPCC 2 |
| 9FFF<br>8003 WRITE TO 06 MODEM STATUS<br>8002<br>8001 WRITE TO 02 INTTERRUPT STATUS<br>8000 WRITE RX DATA | WRITE TO PC REGISTERS<br><br>READ PC REGISTERS ||
| 7FFF<br>6003<br>6002 READ INTERRUPT<br>6001 READ INTERRUPT COMMANDS<br>6000 READ TX DATA | ┌ ─ D2 TX LATCH HAS DATA<br>┼ ─ D1 RX LATCH FULL<br>└ ─ D0 INT ENABLE LATCH HAS DATA ||
| 5FFF<br><br>401F ERROR CONTROL REGISTER (ECR)<br>401E CLOCK CONTROL REGISTER (CCR)<br>401D BAUD RATE DIVIDER REGISTER 2 (BRDR2)<br>401C BAUD RATE DIVIDER REGISTER 1 (BRDR1)<br>401B ADDRESS REGISTER 2 (AR2)<br>401A ADDRESS REGISTER 1 (AR1)<br>4019 PROTOCOL SELECT REGISTER 2 (PSR2)<br>4018 PROTOCOL SELECT REGISTER 1 (PSR1)<br>4015 SERIAL INTERRUPT ENABLE REGISTER (SIER)<br>4011 SERIAL INTERFACE CONTROL REGISTER (SICR)<br>4010 SERIAL INTERFACE STATUS REGISTER (SISR)<br>400D TRANSMITTER INTERRUPT ENABLE REGISTER (TIER)<br>400A TRANSMITTER DATA REGISTER (TDR)<br>4009 TRANSMITTER CONTROL REGISTER (TCR)<br>4008 TRANSMITTER STATUS REGISTER (TSR)<br>4005 RECEIVER INTERRUPT ENABLE REGISTER (RIER)<br>4002 RECEIVER DATA REGISTER (RCR)<br>4001 RECEIVER CONTROL REGISTER (RCR)<br>4000 RECEIVER STATUS REGISTER (RSR) | MPCC 1 ||
| 3FFF<br>2000 | 8K RAM MEMORY ||
| 1FFF<br>0000 | 8K RAM MEMORY ||

FIG. 25B

DATA PORT DB25 PINOUTS

PIN 1
PIN 2  FORWARD CHANNEL TX AUDIO
PIN 3
PIN 4  FORWARD CHANNEL TX AUDIO
PIN 5
PIN 6  FORWARD CHANNEL RX AUDIO
PIN 7
PIN 8  FORWARD CHANNEL RX AUDIO
PIN 9
PIN 10  FORWARD CHANNEL "E" LEAD
PIN 11
PIN 12  FORWARD CHANNEL "M" LEAD
PIN 13
PIN 14  RECEIVE CHANNEL TX AUDIO
PIN 15
PIN 16  RECEIVE CHANNEL TX AUDIO
PIN 17
PIN 18  RECEIVE CHANNEL RX AUDIO
PIN 19
PIN 20  RECEIVE CHANNEL RX AUDIO
PIN 21
PIN 22  RECEIVE CHANNEL "E" LEAD
PIN 23
PIN 24  RECEIVE CHANNEL "M" LEAD
PIN 25

PROTOCOLS AVAILABLE:
CCITT X.25
IBM BINARY SYNCHRONOUS COMMUNICATIONS (BSC) IN ASCII OR EBCDIC
SIX BIT BSC, X3.28, ISO IS1745, ECMA-16.
SYNCHRONOUS BIT ORIENTED PROTOCOLS (BOP), SDLC, HDLC, X.25.
SELECTABLE PARITY (ENABLE, ODD, EVEN) AND CRC.
PARITY CRC-16, CCITT U.41, LRC/LRC.
SOFTWARE SELECTABLE HALF-FULL DUPLEX, AUTOECHO MODES.
ASYNCHRONOUS AND ISOCHRONOUS MODES.
STAR OR RING CONFIGURATION
DUAL CHANNEL DIRECTIONAL LOOP OPERATION WITH LOOP MONITORING
POWER FAIL BYPASS OPERATION WITH LOOP OPERATION.
BOARD EMULATES PC SERIAL PORT.
BOARD CONTINUES TO OPERATE WHEN PC IS OFF LINE.
BOARD BUFFERS RECEIVED DATA DURING OFF LINE.

STRAP AND ADDRESS DETAILS

STRAPS ARE LOCATED ON BOARD TO ALLOW OPERATION
ON COMM. 1 TO 4 OPERATION

THE FOLLOWING REGISTERS ARE AVAILABLE:
COMM. 1   3F8, 3F9, 3FA, 3FD, 3FE
COMM. 2   2FX
COMM. 3   3EX
COMM. 4   2EX

METHOD OF TRANSMITTING INFORMATION USING PROGRAMMED CHANNELS

CROSS REFERENCE TO RELATED APPLICATIONS

This application is a continuation-in-part of U.S. application Ser. No. 07/158,984, filed Feb. 22, 1988 now U.S. Pat. No. 4,868,562, which is incorporated herein in its entirety.

Reference is made to the following United States patent applications which are incorporated herein by reference in their entirety.

1. U.S. patent application Ser. No. 110,514, entitled "Paging Receiver With Continuously Tunable Antenna" which was filed on Oct. 20, 1987 now U.S. Pat. No. 4,851,830.
2. U.S. patent application Ser. No. 110,658, entitled "Paging Receiver With Programmable Areas of Reception" which was filed on Oct. 20, 1987, now abandoned, which was filed as continuing patent application Ser. No. 355,851, filed May 18, 1989, which is now U.S. Pat. No. 4,935,732.
3. U.S. patent application Ser. No. 110,511, entitled "Paging Receiver With Paging Receiver Identification Code Digits Transmitted In Order of Increasing Significance" which was filed on Oct. 20, 1987 now U.S. Pat. No. 4,857,915.
4. U.S. patent application Ser. No. 110,664, entitled "Paging Receiver With Dynamically Programmable Functionality" which was filed on Oct. 20, 1987 now U.S. Pat. No. 4,849,750.
5. U.S. patent application Ser. No. 110,522, entitled "Paging Receiver Displaying Place of Origin of Pages" which was filed on Oct. 20, 1987 now U.S. Pat. No. 4,853,688.
6. U.S. patent application Ser. No. 110,512, entitled "Paging Receiver For Receiving Pages From Analog or Digital Paging Transmitters" which was filed on Oct. 20, 1987 now U.S. Pat. No. 4,928,100.
7. U.S. patent application Ser. No. 158,716, entitled "Paging System Local Switch" which was filed on Feb. 22, 1988 now U.S. Pat. No. 4,870,410.
8. U.S. patent application Ser. No. 158,937, entitled "Paging System Lata Switch" which was filed on Feb. 22, 1988 now U.S. Pat. No. 4,868,558.
9. U.S. patent application Ser. No. 158,584, entitled "Paging System Hub Switch" which was filed on Feb. 22, 1988 now U.S. Pat. No. 4,866,431.
10. U.S. patent application Ser. No. 158,931, entitled "Paging System With Dynamically Programmable Reception Frequencies" which was filed on Feb. 22, 1988 now U.S. Pat. No. 4,881,073.
11. U.S. patent application Ser. No. 158,982, entitled "Paging System With Commands For Changing Functionality of a Paging Receiver" which was filed on Feb. 22, 1988 now U.S. Pat. No. 4,878,051.
12. U.S. patent application Ser. No. 158,983, entitled "Paging System For Entering Pages By Local Telephone Call" which was filed on Feb. 22, 1988 now U.S. Pat. No. 4,868,860.
13. U.S. patent application Ser. No. 158,981, entitled "Paging System With Transmission Protocol Compatible With Analog and Digital Transmitters" which was filed on Feb. 22, 1988 now U.S. Pat. No. 4,875,039.
14. U.S. patent application Ser. No. 158,950, entitled "Paging System Sublocal Switch" which was filed on Feb. 22, 1988 now U.S. Pat. No. 4,876,538.
15. U.S. patent application Ser. No. 381,483, entitled "Paging Receiver with Continuously Tunable Antenna and RF Amplifier" which was filed on Jul. 18, 1989.
16. U.S. patent application Ser. No. 381,527, entitled "Paging Receiver with Continuously Tunable Antenna" which was filed on Jul. 18, 1989.

BACKGROUND OF THE INVENTION

1. Field of the Invention

The present invention relates to paging systems.

2. Description of the Prior Art

Paging systems are in use throughout the world. There are paging systems which transmit pages from satellite transmitters to different cities. An example of such a system is that operated by National Satellite Paging which transmits only pages consisting of numeric characters. A system operated by Metrocast transmits pages to any city within the system through a serial communication link between the cities. The Metrocast system has a central switch which includes all of the subscriber files and a plurality of local switches which are located in separate geographic locations that are connected together by the serial communication link. In the Metrocast system, pages transmitted locally by a single paging service are exclusively made by calling into the city where the page is to be made by a local telephone call. A page to be made on a regional basis involving transmission of pages between two or more locations is called in by an 800 number telephone call to a central facility in San Diego from which the page is transmitted to the city where the page is to be broadcast by the serial communication link. The page is received from the communication link at the city where it is to be broadcast and then broadcast locally by an existing paging service to transmit the page to the person to be paged. In the Metrocast system, the pages are transmitted from the central switch with an address of a switch in a remote location which is to receive the page. All of the intermediate local switches between the central switch and the remote switch which is to receive the page function to relay the pages to the remote switch. The pages are transmitted in on direction along the serial communication link which functions as a loop beginning and ending at the central switch. Each intermediate switch located along the serial communication link removes pages which are addressed to it. However, the intermediate switches do not disassemble the pages and reassemble the pages and add pages thereto originating at the intermediate switches for transmission to other switches along the serial communication link.

BBL Industries manufactures a digital linking module which connects multiple switches together to form a regional paging network. This system transmits individual pages between the switches over a dedicated communication link. The subscriber file is located at the switch originating the page. The remaining switches function only to remove pages which are addressed to them and do not modify the pages. Pages must be originated by calling the switch with the subscriber file.

Paging systems currently in use in the United States maintain subscriber identification information used for making pages transmitted between multiple switches at a single location. In Metrocast, the central switch in San Diego stores the subscriber information in a file which includes the destination(s) of pages for each subscriber.

Local paging services which service a single area also maintain a subscriber file at a central location.

Subscriber files contain a subscriber identification number which is a unique identification of the subscriber within the system, whether national or local in nature. The subscriber identification number also functions as the address of the paging receiver of the subscriber and is broadcast with each page that is addressed to the paging receiver of the subscriber. Furthermore, the subscriber file stores the type of service that each subscriber is to have provided when the paging service receives a request for a page. Paging systems rely on the subscriber file to provide the information necessary to provide the type of service that each subscriber requires upon receipt of a request for a page and do not require the requester of a page to know anything other than the identification number of the party being paged and the page itself.

Currently, subscriber files do not store subscriber identification numbers which have a geographic significance regarding the location of the subscriber local paging service within an overall system. Moreover, current paging systems do not process the subscriber identification number to determine a subscriber local paging service location which stores the subscriber file of the subscriber when pages are made which originate outside of the area of the subscribers' local paging service. Current paging systems do not transmit requests for pages originating outside the local paging service providing local service to the subscriber to the local paging service to determine the type of service and the destination of the page by using the network to transmit the request to the local paging service. To place a page from a geographic area outside of the subscribers' local paging service area, current systems require an 800 type call (Metrocast) or a long-distance phone call to be made. Current paging systems do not permit a local call to be used for originating a request for a page from outside the service area of the local paging service, such as requesting a page in Washington, D.C., while being located in New York by making a local phone call to a location in New York.

To date, there is no existing national paging system which substantially covers the geographical United States with reliable service. Because of the cost of hardware, a system like the Metrocast system is not economical in small cities or rural areas where the paging volume is relatively low. Accordingly, while the objective of achieving nationwide paging has been attempted for many years, no existing system integrates local and national paging substantially throughout the geographical United States or throughout the world. The vast majority of paging systems operate totally locally with each system having a limited functionality because of their inability to effectively deliver regional or national (non-local) paging.

Most paging receivers are tuned to receive only a single channel which inherently limits their usage at times when heavy paging conditions exist in a local paging system and further prevents usage in other geographical locations where other channels are used.

Typically, each existing paging system has unique specifications which prevent operation of its paging receivers in other systems. For example, the paging receiver identification codes are not universal. Furthermore, existing paging receivers only receive pages from a single type of transmitter (analog or digital). As a result of paging receivers differing in design and operation, the cost of paging receivers is higher as a result of smaller manufacturing volumes than would be realized if a single paging receiver was usable for a worldwide network.

Paging services which provide a service area that is not limited to a local paging service area (pages involving more than one switch) transmit on a single channel or cyclically on a band of closely related channels.

It is estimated that 25% of the paging receivers in use in the United States are serviced by private paging systems and services (non-common carrier). The private municipal paging system 384, private hospital paging system 386, stock quote service 388, and other private systems 374 illustrated in FIG. 28 are representative of the prior art private paging systems and services. These prior art systems and services have not been integrated with common carrier local paging services as illustrated in accordance with the present invention in FIG. 28 or into a paging network as illustrated in accordance with the present invention in FIG. 1. Paging receivers encompassing both private and common carrier multiple paging frequencies have not been available to date. The transmitters of non-common carrier systems and services have lower broadcast power than the transmitters of common carrier paging systems, and therefore have a limited range in comparison with common carrier systems. As a result, there is a lack of continuity in service range provided by non-common carrier systems and services when a comparison is made to common carrier local paging services. Moreover, the lack of continuity in the range of service provided by private paging systems and services causes persons wishing to receive paging service from common carriers and private non-common carrier systems and services to carry multiple paging receivers creating at least an inconvenience for the user and additional expense in purchasing multiple paging services.

While current paging services providing paging involving transmission of pages between multiple switches have a distributed network of switches, they do not utilize the distributed switches to maximize the efficiency of transmission of pages within a local service area and outside of the local service area. These systems control the transmission of pages between switches by sorting of the pages at the originating central switch where the subscriber file is located. The pages are not further sorted and packetized during their transmission at intermediate switches located between the originating central switch and the destination switch which limits the efficiency of transmission that could be achieved by a system in which the pages at intermediate switches are sorted, buffered and combined with new pages that originate at the intermediate switches that are to be transmitted toward the destination switch to minimize the cost of transmission to a destination switch. Furthermore none of these systems permits pages to be entered by the local switch into the switching network while bypassing the central switch because of the fact that subscriber information is centrally stored and must be centrally processed.

The central processing of pages by existing systems has distinct disadvantages. First, expansion of the capacity of the network is limited by the capacity of the central switch to process all requests for pages. Since studies of the assignee reveal that a majority of pages (70%) originating at a local paging facility are typically intended for only the broadcast by a single local paging facility, central processing of a page to be broadcast by a single local paging service necessarily places a high processing overhead on the central processor's ability to process pages which are to be transmitted between switches (i.e., non-local paging) and necessitates the making of a long-distance or 800 phone call. Furthermore, the cost of expanding the capacity of a central processing facility to increase the volume of pages can involve substantial expense. Finally, a malfunction in the central processing system processing the requests for pages throughout the network can cause the whole network to go down.

Each paging receiver in the Metrocast system cyclically scans a plurality of closely spaced channels to detect the presence of a page addressed to the paging receiver on any one of the closely spaced channels. Paging receivers in the Metrocast system have the disadvantage that the required continual scanning of the closely spaced channels consumes a substantial amount of power causing the batteries of the paging receiver to have a short service life. Short battery life increases the cost of operation of the paging receiver, can cause pages to be lost when the batteries are not promptly replaced and can interfere with the ability to market paging services as being "economical" given the cost of battery replacement.

There currently is no universal standard for issuing identification numbers to paging receivers, with the largest system having capacity for issuing only 2,000,000 paging receiver identification codes. Worldwide, there currently are over 12,000,000 paging receivers in use with projected growth on an annual basis in the paging industry possibly exceeding 20%. Thus, current paging systems do not permit a worldwide paging system to be realized as a result of the actual and projected number of paging receivers being far larger than the capacity of the identification codes in the largest existing paging system.

All paging receivers currently consume considerable battery power in monitoring the one or more channels on which they are designed to receive pages to detect if a paging receiver identification code accompanying a page on the one or more channels matches its stored paging receiver identification code. If a match exists, then a page is processed and an alarm and a display of the message is provided by the paging receiver of the message contained with the page. These systems transmit the paging receiver identification code in an order of decreasing significance of the digits of the identification code. In other words, if a paging receiver has the identification code 12345, the transmitter precedes the transmission of the page which is addressed to the paging receiver with the sequence of digits 12345. Each paging receiver which receives the channel on which the paging receiver identification code is transmitted continually detects each of the successive digits and maintains its radio frequency receiver tuner in any "on" state until a mismatch is found between the transmitted and stored paging receiver identification code digits. As a result of the fact that many paging receivers have the most significant digits in common with other paging receivers within a system, a substantial amount of battery power is consumed detecting if a broadcast page is addressed to a particular paging receiver. Each paging receiver which receives the digits of the paging receiver identification code in an order of decreasing significance is statistically likely to have its radio frequency receiver turned on for most of the transmission of the digits of the paging receiver identification code until the lesser significant digits of the paging receiver identification code are received which enable a final determination to be made of the paging receiver to which a page on a frequency is addressed. The lesser significant paging receiver identification code digits are the digits which begin to distinguish one paging receiver from another and only the least significant paging receiver identification digit distinguishes the paging receiver which is desired to receive a particular page from all other paging receivers. Accordingly, the transmission of the paging receiver identification code digits in an order of decreasing significance substantially increases power consumption lessening the life of the batteries of the paging receivers in a system.

Throughout the world, different frequency bands have been adopted for transmitting pages. In the United States, transmissions are authorized on VHF and UHF bands. In the United States, the channels of the VHF and UHF bands are separated by 5 KHz steps. Moreover, for each of these bands in the United States, transmitters are in existence which transmit pages by frequency modulation of a digitally encoded carrier wave and other transmitters which transmit pages by frequency modulation of an analog encoded carrier wave. Currently, no paging receiver exists which is compatible with transmissions from both analog and digital transmitters. Furthermore, Europe has allocated VHF channels for paging with individual channels being separated by 6.25 KHz steps and Far Eastern countries have allocated paging frequencies on a 280 MHz VHF band with individual channels being separated by 2.5 KHz steps. Currently, paging receivers do not exist which are operational on any more than one of the above-identified frequency bands. The inability of current paging receivers to receive pages on the different frequency bands allocated throughout the world effectively prevents worldwide paging to be received on a single paging receiver.

None of the existing paging systems dynamically change the channels on which a paging receiver in the system may receive pages which severely restricts the paging receivers to usage in limited geographical areas. In the United States, there are a large number of paging in use in different geographical parts of the country. Because of the fact that the channel reception channels of existing paging receivers are not dynamically changed, it is impossible to universally receive pages throughout the country to offer special services, or to shift allocation of channels used by a local paging service to accommodate traffic variations because of the fact that reception of channels in current systems is limited to a single channel frequency fixed upon obtaining the paging receiver from the paging service or to cyclically scan a group of closely spaced channels such as with the paging receiver used by the Metrocast system. The prior art paging receivers' inability to dynamically change the channels which may be received severely limits the usage of paging for business or other travel.

Currently, no paging system exists which effectively and at low cost permits paging on a regional, national and international level. This is a consequence of the inability of the paging receivers to dynamically receive different and a large number of channels, the lack of a standard transmission protocol which is compatible with existing analog an digital transmitter hardware and existing systems not having a universal paging receiver identification code which uniquely identifies each of the paging receivers throughout the world. The possibility exists in the current systems of several pager having the same paging receiver identification code. Furthermore, the architecture of existing systems is committed to the construction of dedicated communication links between switches and/or the construction of new broadcast facilities such as at the local switches which involves substantial capital expenditures. A universal paging receiver identification code is needed having the capacity to uniquely identify all of the paging receivers throughout the world. Furthermore, in order to inexpensively implement regional, national and international paging, a system is needed which utilizes existing local paging services without expenditures on communication links between switches or new broadcast facilities.

Currently in the United States, a relatively small number of channels are used in the large metropolitan areas where most of the paging traffic occurs. As paging traffic increases in view of the relatively small number of channels predominantly in use in metropolitan areas, there is the likelihood that message traffic during the three peak paging periods that occur each day will increase to the point where the predominantly used small number of channels will become so busy that it is impossible to rapidly transmit pages to a paging receiver. This condition has occurred in large metropolitan areas and results in delays in pages being transmitted during peak traffic periods. Because of the fact that current paging receivers are not dynamically programmable to receive pages on different channels, existing networks do not have the ability to dynamically switch channels in large metropolitan areas from a channel having the highest traffic to a channel or channels having lower traffic, to accommodate paging traffic variations when one channel becomes so busy that rapid paging is not possible. In fact, in large metropolitan areas, there currently are VHF and UHF mobile channels that are under-utilized due to the current cellular radio system which could be used as alternative paging channels to receive traffic on commonly used stations.

Distinct FM analog and FM digital paging encoding protocols exist, but no universal encoding protocol exists which may be transmitted by existing analog and digital FM paging transmitters and universally received by paging receivers. Existing protocols for the FM analog and digital paging systems do not have a high efficiency in transmitting data per transmitted code. Existing digital transmitters modulate a digital FM transmitter with a binary signal which utilizes frequency shift keying of the basic carrier signal to transmit the high level of a bit with a burst of the shifted frequency and the low level of a bit with the unshifted frequency of the carrier. Thus, each identifiable digit of the transmission from an FM digital paging transmitter can encode only two distinct levels for each frequency burst of the carrier. Analog FM paging transmitters frequency modulate a sinusoidal carrier with a total of 15 tones to create a hexadecimal value level transmitting system in which no modulation of the basic carrier frequency is considered to be the "F" value and the remaining 15 different values are encoded by modulating the FM carrier with distinct tones. Paging receivers which are designed to receive analog transmissions require substantial reception time of each ton to validly detect each character. Thus, while the protocol of FM analog paging transmitters transmits a much higher number of data values for each frequency burst, the slowness of the paging receivers in detecting the discrete tones does not result in a high throughput speed of transmitting characters.

Prior art alphanumeric paging (the capability of transmitting pages having numerical and alphabetic type characters) has been commercialized using the above-referenced digital encoding protocol. Since only about 15% of existing paging services use a digital transmitter, which is necessary currently for implementing alphanumeric paging, the great majority of subscribers to paging services may not obtain alphanumeric paging. The analog protocol, which is based upon a hexadecimal tone encoding format, has not been utilized for encoding a character set to transmit alphanumeric messages.

Moreover, current alphanumeric paging service has been expensive to implement both from the perspective of the paging service and from the subscriber. The necessary input devices have proved to be expensive and there is no standard input device design or data encoding protocol. Conversion equipment for changing an analog paging service to a digital service with alphanumeric capability has proven expensive and there is no existing computer system for changing an analog system to a digital system which is inexpensive.

Existing paging systems which permit paging in multiple locations have the deficiency when a subscriber desires to place a page from a location remote from the subscriber file or to modify the level of service from a location remote from the subscriber file of requiring a long-distance phone call to be made to the location where the subscriber file exists. Because of the fact that the long-distance phone call is charged to the person wishing to make the page or change of service level or to the operator of the system (800 service), the expense of using these paging systems is increased and may discourage users from making pages or changes in the level of service by calling in from a location remote from the subscriber file. No national or regional prior art paging system permits a page or a change in service level to be initiated from a geographic area outside the area where the subscriber file is located by making a local phone call to a switch in an area remote from the switch containing the subscriber file within the system and further for the paging receiver to be programmed to receive the page on a particular channel used at the location where the page is to be received.

Current paging systems do not broadcast and current paging service receivers do not execute a repertoire of commands permitting the functional characteristics of the paging receiver to be programmed dynamically by RF transmission to the paging receiver. Current paging receivers do respond to commands which provide an alarm to the person wearing the paging receiver that a page has been received such as activating a display and/or providing an audio alarm. However, current paging systems do not broadcast and current paging receivers do not execute a diversity of commands in which the system influences operation and structure of the paging receiver, including commands activating the display to indicate if the page has originated locally or from another region, causing the message transmitted with the page to be stored in a particular memory location in the paging receiver, programming the channels on which the paging receiver is to receive pages, and permitting the paging receiver to serve as a relay for pages either to be transmitted or received and to interface with peripheral devices.

Cellular radio systems dynamically assign channels on which cellular radio receivers are to receive telephone calls. To make or receive a telephone call, a mobile cellular radio is locked onto a set up channel through communications with the transmitter which are established when the cellular radio receiver is turned on. The cellular system then assigns the mobile cellular radio to a specific channel while the mobile cellular radio is making or receiving a telephone call within a cell. As the cellular radio receiver moves from one cell to another cell, the channel is dynamically changed from one channel to another channel to maintain a strong signal frequency. A cellular radio receiver does not have a channel memory which stores channels which are to be scanned to establish if a call is forth coming. The dynamic assignment of a channel is initiated by the transmitter for the sole purpose of establishing the channel over which voice communications are to be initiated or to be maintained when moving from one cell to another. Cellular radio systems do not assign channels based upon information assigned in a subscriber file.

The telephone system is based upon a network of distributed switches having a local/regional/national-/international functional responsibility. In the United States local telephone offices are connected to "lata" switches which are analogous to area codes but which are identified by a different number pattern based upon system considerations. The local, lata, and hub switches of the present invention operate in a fundamentally different manner than the switches of the telephone system in that they perform substantial data processing to provide packets of data which are periodically transmitted to other switches to provide efficient and low cost operation. The operation of the telephone system is fundamentally different from a paging system in that processing of calls in the telephone system is on a real-time basis which does not process calls to provide packets which are periodically transmitted and in that the initiation of a successful call requires the caller to know the destination of the call (phone number), neither of which occurs in a paging system.

A network known as ISDN (Integrated Service/Digital Network) has been proposed. This network will interface with the telephone system and provide data communications between switches in the network. Data is to be transmitted in blocks between switches in the network. The proposal does not include disassembly, processing and reassembly of blocks of data by intermediate switches located along the communication path between an originating and destination switch.

The X.25 transmission protocol has been developed which is used for sending a single block of data between an originating location and a receiving location. The prior art X.25 transmission protocol is identical to that discussed with reference to FIG. 29 except that it has not been used in paging and further has not been used for transmitting multiple blocks of data analogous to the multiple pages illustrated therein.

U.S. Pat. No. 4,422,071 discloses a system for programming an identification code of a receiver by a radio frequency communication between a transmitter and the receiver.

SUMMARY OF THE INVENTION

The present invention provides a paging system having substantial advantages over current paging systems. The paging system of the present invention is based upon utilization of existing transmitters which are in place at existing local paging services which eliminates the need for the building of new transmitting facilities. Furthermore, the present invention utilizes existing communication facilities to transmit information between different switches in the system such as, but not limited to, telephone lines. The use of existing communication facilities lessens the overall expense in constructing the network by eliminating the capital cost for new communication lines between the switches such a with the Metrocast system. The system of the present invention is upwardly expandable by adding additional sublocal, local, lata and hub switches as the network expands, which currently may be accomplished in a more cost-efficient manner than updating the capacity of a central switch.

The distributed switching network efficiently transmits pages locally and between switches for performing regional and national paging without requiring routing through a single central switch which processes pages throughout the system. The distributed network of switches permits each of the individual switches to be implemented by a low-cost switching network controlled by a conventional PC with a processing assist from distributed processing units for processing input, output communications and data. The processing assist for data processing strips the communications protocol used for transmitting packets of pages to a switch, converts the data code used for transmission of pages to the data code used by the PC to process the pages, and converts the code used by the PC back to the code used for transmission of pages between switches and adds the communications protocol. The present invention utilizes non-real-time communications with buffering of packets of pages to be sent between switches and further buffers and batches pages to be transmitted between a local switch and an associated local transmitter which provides communications of pages between the switches and the local paging service and the local transmitter in a cost-efficient manner.

The system functions to permit the channel or channels received by each paging receiver to be dynamically programmed which has the advantages of (1) increasing transmission spectrum efficiency by permitting the channels carrying pages in a local paging service during high traffic time periods to be dynamically varied to maximize the efficiency of the transmission of pages on existing paging facilities such as those found in large metropolitan areas, (2) permitting pages to be made in a plurality of regions by dynamically programming the channels which are to be received by a paging receiver to be the same as those channels available in the area in which the paging receiver is to receive the page, (3) permitting battery savings to be achieved for paging receivers which are transported into an area outside of the local paging area by permitting the paging receiver to respond to only pages which have a destination preamble which is transmitted as the first digit of the paging receiver identification code to minimize the time during which the paging receiver is "on" to determine if the page is addressed to it, and (4) creating special service channels for use by local paging services.

The encoding format utilized by the invention is compatible with the existing analog FM modulation and digital FM modulation transmitters used by local paging services which permits the utilization of existing broadcast facilities in the network.

The distributed switching network minimized the effects of switch malfunction on the operation of the system and permits information to be transmitted through alternative switching paths, other than a normal switching path, if a malfunction occurs.

The system permits pages to be made anywhere within a country or throughout the world without long-distance charges being incurred by utilizing a geographically descriptive identification code which is processed by a lata switch receiving the request by local phone call for a page. The lata switch generates a page including the geographically descriptive identification number accompanying the request for a call which is forwarded by the network to the local switch having the subscriber file storing the subscriber identification code service option and the destinations to which pages are to be transmitted. The local switch receiving the page generates a page in accordance with the level of paging service stored in the subscriber file and adds a destination(s) to the page in accordance with the stored destination information accompanying the subscriber identification number. Furthermore, the information in individual subscriber files at each local switch may be programmed by a local call made to a lata switch anywhere in the network without incurring long distance charges in a manner analogous to the placing of calls to request a page to a lata switch as described above.

The paging system utilizes a command structure for sending pages which differentiates between local and national pages which permits battery savings by the paging receivers.

Each local paging service transmits pages with the digits of the paging receiver identification code transmitted in an order of increasing significance which minimizes battery consumption by the local paging receivers tuned to the frequency on which the pages are transmitted by permitting a rapid determination of whether or not the page is addressed for a particular paging receiver.

Each local paging service transmits pages in a batched form which are batched by the least significant digit of the paging receiver identification code which further saves battery life of the receiver by permitting an increase in the time interval between which the paging receiver is cyclically turned on to sample whether channel frequency is present.

The present invention provides alphanumeric paging which is fully compatible with existing analog and digital transmitters. A universal encoding protocol is used which encodes each alphanumeric character as two successive tones.

The system further permits the paging receiver to pass pages to peripheral devices which may function as data processors, printers, telex services, facsimile service or support for other types of data processing devices.

The invention permits the integration of private paging systems and services into a local paging service or into a common carrier network. Integration of the subscribers of private paging systems (non-radio common carrier) and services into the subscriber base of a local paging service functioning alone or contained in a network extends the service options which may be provided to subscribers of the private paging systems and services to those available in the local paging service or network and extends the reception range of the paging receiver to that of the local paging service or the network. The pages received from the private paging systems and services are broadcast by the transmitter of the local paging service to which they are directly connected and/or by other local paging systems that are part of the network.

The operation of paging receivers located anywhere in the network is dynamically controlled by one or more system commands which are added to each page by the local switch at the time of origination of the page. The system commands are added by the local switch under the control of a processor, which upon matching an identification code accompanying the page with a subscriber identification code stored in a subscriber file, adds one or more system commands to each page in accordance with selected service options stored within the subscriber identification code. For each selected service option one or more corresponding system commands are added to the page prior to transmission to a local paging service or to the network.

DEFINITIONS

The following definitions shall apply throughout the disclosure:

1. Jurisdiction—Jurisdiction is control exercised by a switch over one or more additional switches to which the switch is connected or over paging receivers having an identification code stored in a subscriber file of the switch. A page is also a group of tones which is to be transmitted to a paging receiver and may include additional information, including identification code, one or more destinations, and a command specifying a function to be performed by a paging receiver.

2. Page—A page is a group of numerical or alphanumerical characters to be sent to a paging receiver. A page may include additional information including an identification code, one or more area destinations, and a command specifying a function to be performed by a paging receiver.

3. Packet—A packet is one or more pages which are transmitted as a group which have a switch as an area destination. A packet may have a transmission protocol and is transmitted between an originating switch and a destination switch.

4. Batch—A batch is a group of one or more pages which are forwarded to a transmitter for broadcast having one or more common paging receiver identification code digits.

5. Sublocal Switch—A sublocal switch is the lowest level entry point switch in the network of the present invention.

6. Local Switch—A local switch is a switch having jurisdiction over any sublocal switches to which the local switch is connected and in the absence of any sublocal switch being connected thereto is the lowest entry point into the network and has jurisdiction over subscribers stored in a subscriber file therein. The local switch may be associated with a common carrier local paging service.

7. Lata Switch—A lata switch is a switch having jurisdiction over any local switches to which the lata switch is connected.

8. Hub Switch—A hub switch is a switch having jurisdiction over any lata switches to which the hub switch is connected.

BRIEF DESCRIPTION OF THE DRAWINGS

FIG. 12 is a flowchart of the operation of the network in processing pages called to a lata switch in the network.

FIG. 13 is a flowchart of the operation of the network in processing a request for programming a subscriber file by calling a lata switch within the network.

FIGS. 25A and B are a Data Board Memory Map of the data module processor 32 of the present invention.

DESCRIPTION OF THE PREFERRED EMBODIMENTS

I. System Overview

Figure 1:
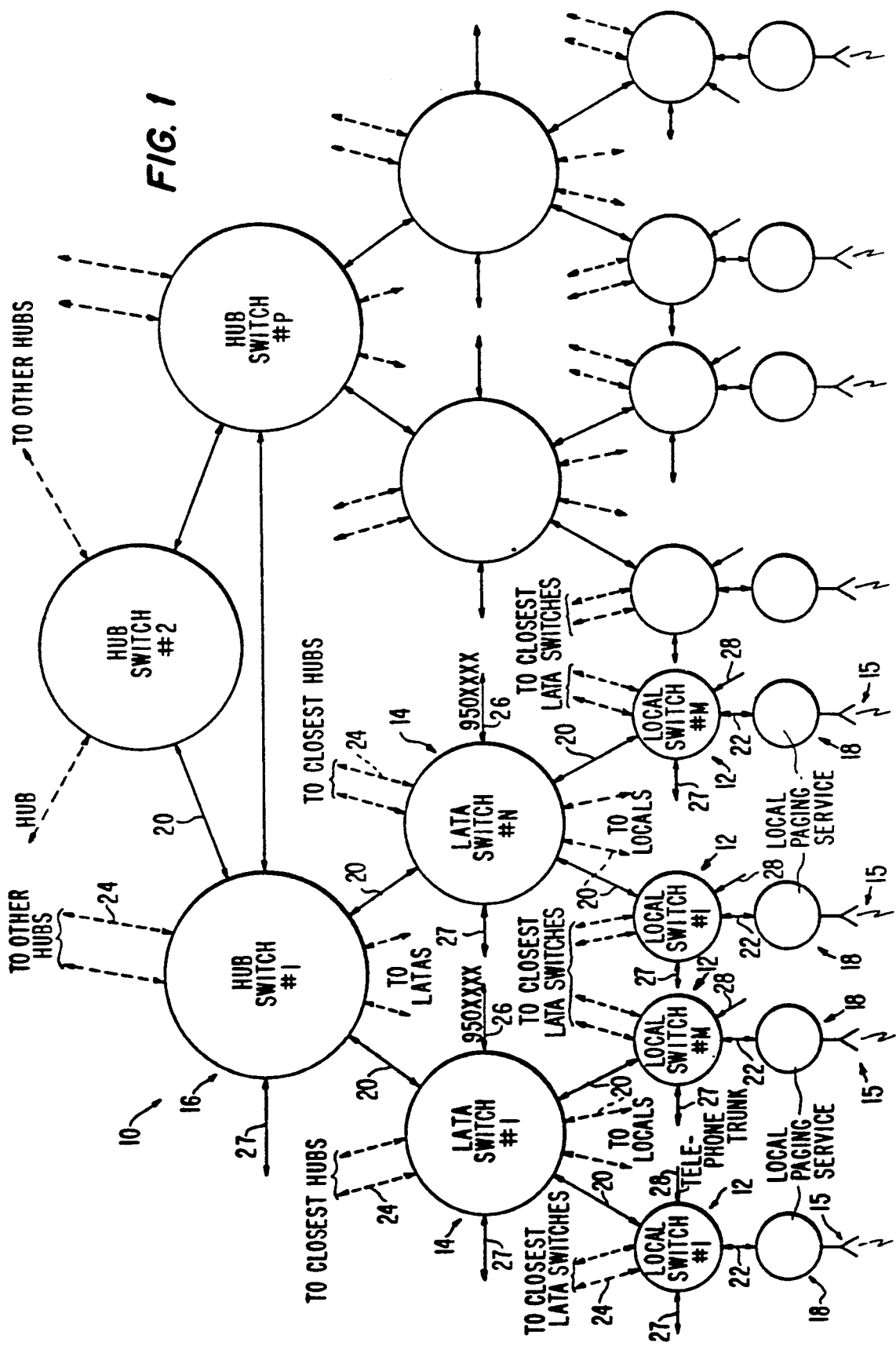
FIG. 1 is a system diagram of the present invention.

FIG. 1 illustrates a diagram of a paging network 10 in accordance with the present invention which provides worldwide paging capability. The system is a distributed network of switches comprised of a plurality of local switches 12, a plurality of lata switches 14 and a plurality of hub switches 16 with each switch being located in a different geographical location within an area being serviced by the system. The hub switches 16 may be located totally within a country to provide national service or in multiple countries to provide international service. In order to simplify the drawings only a single portion of the network is labelled with reference numerals with it being understood that repeating portions exist such as for that portion under the jurisdiction hub switch #P. Communication links which are illustrated as a dotted arrow represent network structure which has been omitted for clarity that is identical to structure that is illustrated in detail. Additionally, one or more sublocal switches as discussed with reference to FIG. 28 below may optionally be provided within the system under the jurisdiction of the local switch. The sublocal switches have been omitted for purposes of clarity. Each switch has jurisdiction over a geographic area. The functions performed by the local switch 12, the lata switch 14 and the hub switch 16 are described below. The architecture of the local, lata and hub switches are similar to each other with a preferred embodiment of the hardware being illustrated below in FIGS. 14-25. A block diagram of the local, lata and hub switches is discussed below with reference to FIGS. 2, 4 and 6. A single overall control program is used in each of the sublocal, local, lata and hub switches with the program of each switch being programmable by technician setting up the switch by inputs from a keyboard to program the specified function to be performed by the switch. A local paging service 18 is typically connected to each of the local switches 12 which offers other paging services than that provided by the present invention although it should be understood that the local switch may be used exclusively to control all services offered at the local level. The local paging service 18 is typically an existing common carrier paging service which services an area within broadcast distance of a transmitter 15 under the jurisdiction of the local paging service to which the local switch 12 has been connected to permit the local paging service to function in the network. The transmitter 15 may be either an analog or digital transmitter as discussed above with reference to the prior art. Communications between the local, lata and hub switches may be by any existing communication medium 20 such as direct dialup circuits (IDD Circuits International), direct outward dial circuits (end-to-end), in-bound watts (and other in-bound services that are volume discounted), outbound watts (and other out-bound services that volume discounted), feature group A (U.S. service), feature group B (U.S. and European services), MF tie trunks (U.S. and European services), and direct inward dial (international service, where available), as well as any future medium which permits pages to be transmitted between switches. Each of these services are indicated schematically by a bi-directional arrow 20 which interconnects a local switch 12 to a lata switch 14, a lata switch 14 to a hub switch 16, and a hub switch 16 to another hub switch 16. Furthermore, the local switches 12 are connected to a local paging service 18 by a communication link 22 of any conventional nature, including wires connecting the local switch to the local paging service. Each switch is provided with a local telephone trunk 27 which functions as a maintenance port. Furthermore, dotted bi-directional lines 24 illustrate alternative communication paths between switches 20 which may be used in the case of malfunction or busy conditions. It should be further understood that the invention is not limited to any particular communication protocol linking switches, nor connecting the local switch to the local paging service. A telephone trunk 28 functions as an input for manual (telephone handset) and automatic device entry of pages as described below.

The network 10 provides numeric, alphanumeric and data services to all points within the United States and participating countries. In the preferred embodiment of the network, a universal code is used for encoding transmissions of characters over both the communication links 20 and 22 which is compatible with existing analog and digital transmitter 15. The universal code discussed below utilizes sixteen tones for encoding all characters for transmission between, switches, or to a local paging service 18. For numeric paging each character is transmitted as successive single tones and for alphanumeric paging each character is transmitted as two successive tones as discussed below in detail. An X.25 transmission protocol as discussed below in detail is preferably utilized for transmitting packets of pages between switches. While in the preferred embodiment, a preferred code and transmission protocol is utilized it should be understood that the invention is not limited thereto.

The network 10 is economical to implement and operate as a consequence of utilizing distributed processing technologies, and transmission of pages periodically in packets of pages between the switches. Dynamic interaction between a frequency agile pager, which preferably is of the type described in the above-referenced patent applications filed on Oct. 20, 1987, and the network 10 efficiently utilizes transmission time that is available in the channel spectrum. One of the distinct advantages of the network 10 is that it utilizes existing paging common carriers to deliver pages to the end user with existing paging RF coverage in the United States being greater than 85% of its geographical area with just two 150 MHz frequencies, with a total of 10,500 additional channels being available for paging receiver use. Wire line common carriers, private systems, hospital, government, emergency and many other services can be accommodated by the utilization of dynamic channel programming, as described below, by the network 10 to change the channel on which individual paging receivers may receive pages. The network 10 in combination with its paging receiver described in the above-referenced patent applications filed on Oct. 20, 1987 presents a universal product useful throughout the world.

The network 10 provides an integrated sublocal, local, regional and nationwide paging network that is transparent to use by the subscriber and provides for pages to be called into an existing local paging service 18 by the making of a local phone call on a telephone trunk 28 connected to the local switch 12 in a conventional fashion as well as to any lata switch 14 throughout the network 10 by a local phone call to telephone trunk 26, as is described below. The functionality of permitting pages to be originated anywhere within the network 10 by local telephone call, preferably by calling a single number within the country (950-XXXX) avoids the telephone expense and system overhead caused by calling of a central switch to originate a page such as in the Metrocast system which necessitates providing a high capacity expensive switching system. It should be understood that the network's usage of periodically transmitting packets of pages between switches results in a much lower cost than the cost of 800 or conventional long distance service. The phone trunk 26 for calling the lata switch 14 to place a page anywhere within the network 10 is indicated by bi-directional arrows to each lata switch 14. As will be described below, regardless of the location of the person making the telephone call to a lata switch 14 over telephone trunk 26 to originate a page, the lata switch 14 will formulate a page with the destination specified by geographically descriptive digits of the identification code inputted with the call to request a page to the lata switch and the network 10 will automatically route the page through the switches of the network to the person being paged by way of the local switch 12, which stores the subscriber file 54 described below with reference to FIG. 3, that stores the identification code of the subscriber and paging receiver. The local switch 12 which stores the identification code inputted with the page in its subscriber file adds one or more destinations to the page and transmits the page(s) to the local paging service 18 and/or the network 10 by way of the lata switch 14 having jurisdiction. The person placing the page by calling the local switch 12 on telephone trunk 28 or the lata switch 14 on telephone trunk 26 does not have to know the location of the person receiving the page.

II. Local Switch

Figure 2:
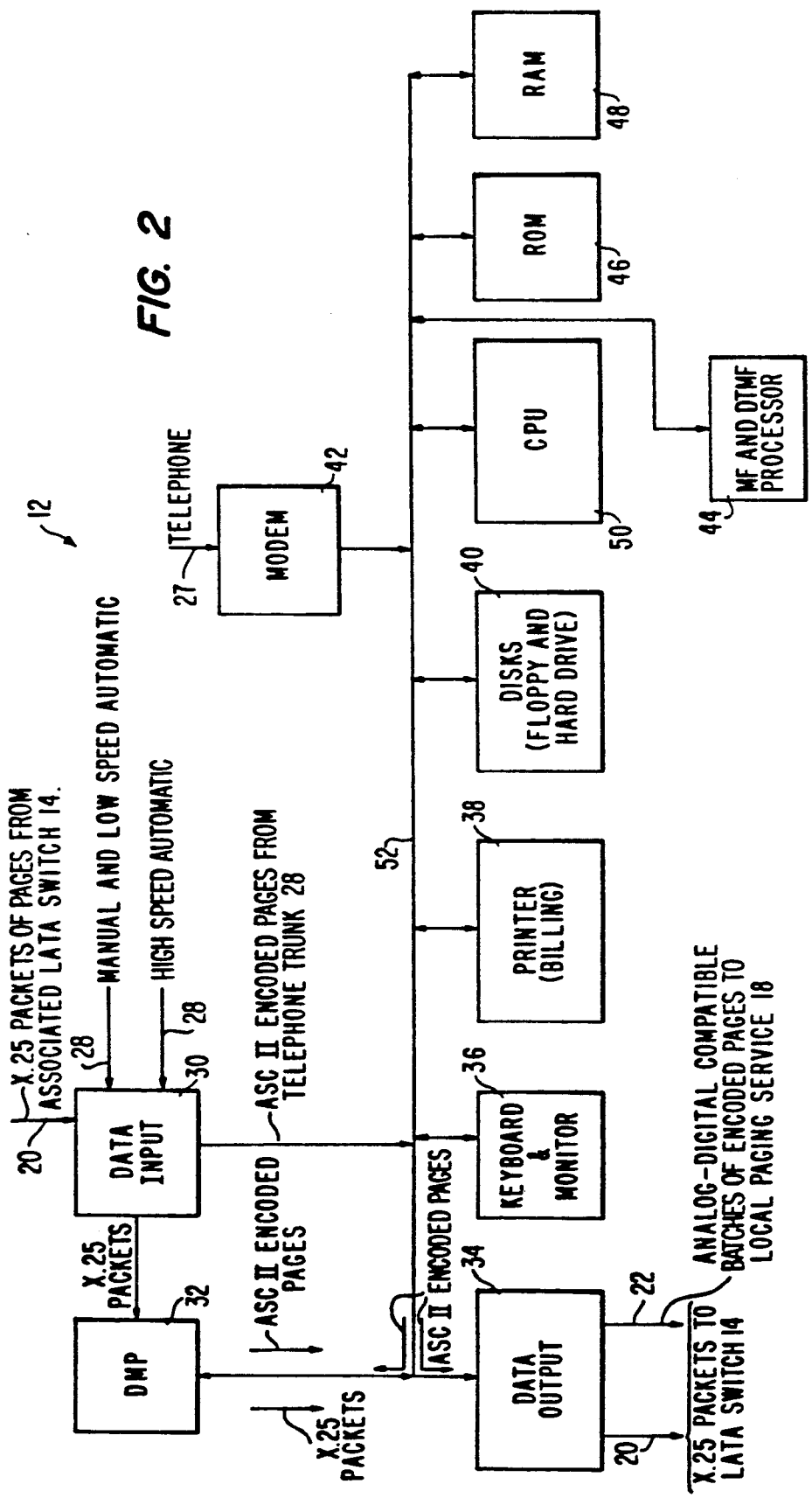
FIG. 2 is a block diagram of a local switch in accordance with the invention.

The local switch 12 is connected to a participating common carrier paging service 18 located in a particular geographic area. The local switch 12 has local direct inward dial trunks 28 which permits the subscriber to use a local telephone call to place a page. Pages over the local telephone trunks 28 may be (1) numeric characters which are entered manually by DTMF tones or other telephone coding mechanisms, (2) alphanumeric characters which are entered manually by DTMF tones or other coding mechanisms, (3) alphanumeric characters which are entered by an automatic message inputting device using an encoding format having a transmission protocol of conventional nature such as DTMF tones or (4) a high speed (baud rate) encoding protocol such as the X.25 protocol described below. With reference to FIG. 2, the top input to data input 30, which is labelled "Manual and LOW SPEED Automatic Pages", receives the first three inputs and the bottom input to the data input, which is labelled "HIGH SPEED AUTOMATIC" receives the fourth input. It should be understood that any number of inputs to the data input 30 may be used in practice. The local switch 12 has voice prompting which facilitates the person placing a call on the telephone trunk 28 to enter a message to be transmitted as a page.

Pages which are entered by the telephone trunk 28 in the four different formats described above are encoded with a command structure as follows. Manually entered numeric character pages consist of digits encoded by the telephone handset. An entry of this type does not have a command header. Manually entered alphanumeric character pages may be entered by the following format consisting of two successive DTMF tones or rotary dial inputs:

| Numeric: | All numbers are sent as themselves preceded by a zero. | | | |
|---|---|---|---|---|
| Alphanumeric: | A = 21 | H = 42 | O = 63 | V = 83 |
| | B = 22 | I = 43 | P = 71 | W = 91 |
| | C = 23 | J = 51 | Q = 11 | X = 92 |
| | D = 31 | K = 52 | R = 72 | Y = 93 |
| | E = 32 | L = 53 | S = 73 | Z = 12 |
| | F = 33 | M = 61 | T = 81 | Space = 00 |
| | G = 41 | N = 62 | U = 82 | |

An asterisk is used as a command header which precedes the alphanumeric transmission of a manually entered alphanumeric character page. Automatic input from an input device, which is audio coupled to the telephone handset, is encoded with a double (repeated once) asterisk command and preferably utilizes the hybrid coding format discussed below. Input from a high speed automatic entry device, having an X.25 transmission protocol, is encoded with a triple (repeated twice) asterisk header and is preferably encoded in the hybrid coding format discussed below at a high baud rate such as 1200 baud which necessitates a much shorter tone duration than that used by the transmitters 15. The command header is decoded by the data input 30 discussed below with reference to FIG. 2 to control the processing of the different data input formats from the telephone trunk line 28.

Furthermore, following the command header in all inputs. except for the manually entered numeric character input, is a language field which is used to encode whether the page is for transmission in English or Japanese. The dual language capability of the system is discussed below. The processing by the system of pages in two languages is totally controlled by the aforementioned language field. As will be discussed below, the language field controls the commands which are placed with each page except for purely number pages. The individual paging receivers decode the command and display the page in the language dictated by the command.

The local switch 12 processes the pages received from the telephone trunk 28 and from the associated lata switch 14 to which the local switch 12 is connected by the communication link 20 as described below in detail. It should be understood that the local switch 12 has programming which automatically and dynamically monitors paging traffic when a plurality of transmission channels are used and allocates the channels available to the paging service 18 for transmission to the paging receivers to maximize the local paging services paging throughput as described below. The local switch 12 calls the resident local paging terminal of the paging service 18 and determines how much air time it has to deliver a batch of pages to the transmitter 15 associated with the local paging service. The local switch 12 then calls the local paging terminal of the local paging service 18 and transmits a batch of pages encoded in the hybrid encoding format described below which is compatible with existing analog and digital FM paging transmitters.

The local switch periodically transmits packets of pages stored in its outbound lata buffer 82 over communication link 20 as described below in conjunction with FIG. 3 to the lata switch 14 having jurisdiction over it which provides cost efficient transmission and efficient page processing by avoiding processing by a single central switch controlling the network as in the prior art. This architecture is highly efficient in routing the pages originating at the local switch 12 to be transmitted by the network 10 which are intended for broadcast by a transmitter remote from the local switch having the subscriber file storing the identification code of the subscriber to be paged.

In the preferred embodiment, when the paging subscriber desires to receive regional, national, or international service, the local lata switch 12 is programmed by the subscriber by simple telephone area code entries which identify the service areas although it should be understood that the invention is not limited to the usage of telephone area codes to identify the service areas. The programming is accomplished by adding or deleting one or more area codes of the subscriber's destination field 78 contained in a subscriber file 54 maintained in the subscriber's local switch 12 described below with reference to FIG. 3. In the United States, area codes are used for ease of subscriber use and telephone books may then serve as the service area directory. The same ease of use is available to worldwide customers with county-city code entries available from telephone books in any airport, hotel or business.

The local switch controls the generation of individual pages having the message detail as described below with reference to FIG. 31. The number of pages which are generated in response to a page received without an area destination from the telephone trunk 28 or from a lata switch 14 is determined by the central processor of the local switch 12 interrogating any area destinations listed in the destination area code field 78 as described below with reference to FIG. 3. Each page generated by the processor contains the same message content. A separate page is generated for each destination area listed in field 78 and if the local service option of the service option field 68 is selected, an additional page is generated for broadcast by the local paging service 18 without an area destination in the network which is processed by the local switch 12 as a page received from the network for broadcast by the local paging service 18. Furthermore, each individual page generated by a local switch contains one or more commands which are discussed. The commands which are added to each page transmitting a message are determined by the operation of the central processor of the local switch 12 in response to interrogation of the selected service options of field 68. Programming of paging receivers with the channel programming command is in response to the local switch programming the paging receiver to receive one or more channels, subscriber programming of destination areas in field 78, and the degree of utilization of the programming of the local transmitter 15 as described below with reference to FIG. 26.

The central processor of the local switch 12 processes each individual page received from the network to determine if it originated from a local switch 12 or a lata switch 14. This determination is made by determining if a destination header identifying a lata switch 14 originating the page precedes the paging receiver identification code in a packet having the configuration of FIG. 31. In the absence of the header (which is a geographic identification of the originating lata switch 12 in the network) in an individual page, the page is processed exclusively by the local switch 12 for broadcast by the associated local paging service 18 without interrogation of a subscriber file in the local switch. If the header is found in a page, the central processor processes the page as either a request to reprogram the subscriber file or as a page received on the telephone port 28 without an area destination which must be processed to determine one or more area destinations and formed into new pages each with a different area destination from the field 78 if transmission by the paging network is to occur and into a page without an area destination if transmission by the local paging service is to occur as described below.

The local switch 12 also serves as the dynamic programming interface between the paging receiver and the network 10. The local paging service 18 may program channels to be received by paging receivers, change subscriber identification codes and add new customers to the network 10 utilizing the local switch 12. The functionality of the paging receiver can be changed from a fixed channel to a multi-channel or a scanning pager as required by use of the channel programming command discussed below.

Messages originating at the local switch 12 which are transmitted to the lata collector switch 14 having jurisdiction over it are packetized as described below with reference to FIGS. 2 and 3. Destination area codes (telephone area codes or other geographically descriptive code) are added to pages prior to transmission to the lata switch 14 as described below and the paging receiver is dynamically and automatically reprogrammed for the new service areas by the local switch 12 issuing channel command(s) in the form of a page as described below which ensures that the paging receiver is programmed to receive channels in each designated area. The current paging channels remain in the pager to avoid loss of a message while a subscriber is still in the area.

III. Lata Switch

The lata switch 14 provides a second tier of network intelligence. This intelligence includes page processing, packetizing and routing. The lata switch 14 receives packets of pages from each of the local switches 12 within its jurisdiction as well as the hub switch 16 having jurisdiction over it. The lata switch 14 provides the geographical presence for the network 10 to originate and terminate paging messages utilizing dial-up or dedicated communication services.

The lata switch 14 is responsible for collection of pages from the local switches 12 within its jurisdiction. When a packet of pages is received from the local switch 12, it is disassembled, processed and stored for transmission to the proper destination(s) in one or more packets each consisting of one or more pages which are intended for destination(s) either within or outside the lata switch jurisdiction. The lata switch 14 periodically transmits packets of pages stored in its outbound hub buffer 98 and its outbound local buffer 104 described below with reference to FIG. 5 to the associated hub switch 16 having jurisdiction over it and to local switches 12 within its jurisdiction which provides cost efficient transmission and efficient page processing by avoiding processing by a single central switch controlling the network 10. This architecture is highly efficient in routing pages originating within the jurisdiction of the lata switch 14 which are intended for broadcast outside its jurisdiction as well as distributing pages from one local switch 12 to one or more additional local switches within the jurisdiction of the lata switch. If the page is destined for distribution within the jurisdiction of the lata switch 14, the page is processed into packets of pages for transmission to each of the local switches 12 within its jurisdiction or alternatively to less than all of the local switches in its jurisdiction. The pages are then periodically transmitted as packets to the local switches 12 within the jurisdiction of the lata switch 14.

The lata switch 14 is also responsible for collection of pages outside its jurisdiction to be broadcast to the local switches 12 within its jurisdiction. Packets of pages received from the hub switch 16 are disassembled, processed, and packetized for transmission to the destination local switches 12.

The lata switch 14 also serves as a source of regional paging billing collection. The lata switch 14 will be interrogated periodically to obtain the call records for pages within its jurisdiction that have been distributed to each of the local paging services 18 associated with the local switches 12 within its jurisdiction. A dial-up modem port 27 is utilized for this function.

The function of the lata switch 14 in collecting requests for placing pages in the network or to reprogram the subscriber file 54 of a local switch 12 by placing a local phone call on telephone trunk 26 is an important aspect of the present invention. The lata switch 14 places the header discussed above, which geographically identifies the lata switch 14 originating the page in front of the paging receiver identification code, in a packet as illustrated in the message detail of FIG. 31 to enable the local switch 12 to differentiate between pages which are for broadcast by the local paging service 18 associated with a receiving local switch 12 and pages which require access to the subscriber files 54 to generate one or more pages for broadcast or pages for reprogramming a subscriber file. Preferably, the header is four digits comprised of a country code followed by the telephone area code identifying the lata switch 14 which received the call for the originating page. The commands utilized by the local switch 12 in the packet configuration of the message detail of FIG. 31 discussed below with reference to system commands are not utilized by the lata switch.

IV. Hub Switch

The hub switch 16 provides the third tier of network intelligence and serves as an inter-regional communications link. One hub switch 16 will preferably be located in each international region to serve as a network routing switch. In the United States, a hub switch 16 will be located within the region served by each of the Bell regional companies (RBOC's). Accordingly, in the United States the preferred implementation of the network 10 includes seven distinct hub switches 16. Each hub switch 16 in a preferred embodiment can have fifty-five lata switches 14 under its jurisdiction. The hub switch 16 also serves as a network routing switch for inter-hub calls when pages are to continue in the hub-to-hub network.

When a packet of pages is received from either another hub switch 16 or a lata switch 14 within its jurisdiction, the pages are disassembled for examination. Each page is examined for its destination address(es). A determination is made if the hub switch 16 should forward the page to one of the six adjacent hub switches or forward the page to one of the 14 within its jurisdiction as described below in detail. The pages are then destination processed and packetized for transmission to either another hub switch 16 or a lata switch 14 within its jurisdiction. The first hub switch 16 to receive a page to be transmitted between hub switches will also provide nationwide billing records. The hub switch 16 will be interrogated by a dial-up modem 27 to transfer the message records to the billing center.

V. Switch Architecture

Each of the sublocal, local, lata and hub switches utilize the same hardware with changes in function being implemented by programming at the time of installation. The control programs for each of the processors in the sublocal and local, lata and hub switches are modified by keyboard input to perform the desired function of each of the different switches.

A. Local Switch 12

FIG. 2 illustrates a functional block diagram of the local switch 12. The local switch 12 is comprised of a data input terminal 30, a data module processor 32, a data output 34, a keyboard and monitor 36, a printer 38, floppy and hard drive disks 40, a modem 42, MF and DTMF processor 44, a read-only memory (ROM) 46, a random access memory (RAM) 48 and a central processing unit (CPU) 50. Each of the aforementioned elements are connected to a data bus 52.

The local switch 12 serves as the primary point of entry into the network 10. Each participating common carrier (local paging service 18) is furnished a local switch 12 to perform diverse functions. The local switch provides both DID (direct dial) and DOD (overdial) access to local subscribers issued a paging receiver. Voice synthesized prompting allows customers to readily enter the necessary identification code to activate a page and numeric messages. Entry for alphanumeric character pages also takes place on the DOD and DID trunks via a slow-speed (manual or automatic) DTMF entry or high-speed modem (X.25 protocol).

The local switch 12 performs a number of important functions. The local switch 12 permits local subscriber entry from the keyboard 36 or the modem 42 to change the subscriber file 54 as described below with reference to FIG. 3 upon inputting a correct secret code. The local switch 12 provides for the batching of local pages to be sent to the local paging service 18. Pages to be transmitted throughout the jurisdiction of the lata switch 14 associated with a local switch 12 and nationwide pages to be transmitted to a plurality of lata switches 14 are formed into packets and forwarded to the lata switch having jurisdiction over the local switch 12 for distribution to the network 10. Packets of pages to be transmitted by a local paging service 18 which are received from the network 10 are received from the lata switch 14 having jurisdiction over the local switch 12 by means of communication link 20.

The CPU 50 performs the overall control of the local switch 12 with processing assists as described below from the data input 30, data module processor 32 and data output 34. The CPU 50 formats each request for a page which is inputted by the telephone trunk 28 to include the paging receiver identification code in an order of increasing significance of the digits from the least significant digit to the most significant digit, a destination(s) as determined by interrogation of field 78 as described below with reference to FIG. 3, a command as determined by interrogation of the service option field 68 as described below with reference to FIG. 3 and the language field inputted with the page. As explained below, the formatting and broadcast of the paging receiver identification code digits in an order of increasing significance produces substantial battery savings for each of the paging receivers in the system.

The CPU 50 may be any processing system but, in a preferred embodiment of the present invention, is a PC AT processor based upon an Intel 80286 microprocessor. The PC will be provided with a plurality of slots for receiving circuit boards carrying the data module 32, modem 42, data output 34, data input 30 and blank slots for expansion.

1. Data Input 30

The data input 30 performs the important function of being the input for all pages inputted by the telephone trunk 28 and the input of pages received from the network 10 which are addressed to the lata switch 14 having jurisdiction over the local switch 12. The data input 30 decodes the command format of the inputted pages discussed above from the trunk lines 28. Page inputs on the trunk lines 28 which are not in X.25 protocol are converted into ASCII with the rate of conversion being controlled by the decoded command. It further strips all inputs, which are not in X.25 protocol, of any communication protocol, that is typically in a DTMF format, and converts the pages into ASCII code for storage in the buffer 84 of the RAM 48 as discussed below with reference to FIG. 3 and subsequent processing by the CPU 50. All inputs in the X.25 transmission protocol to the local switch, whether from a lata switch 14 or from a telephone trunk line 28, are forwarded to the data module 32 for stripping of the X.25 transmission protocol, as discussed below with reference to FIG. 31, and for conversion into ASCII code format for storage in buffers 80 and 84 of the RAM 48 of FIG. 3 discussed below.

Figure 14A:
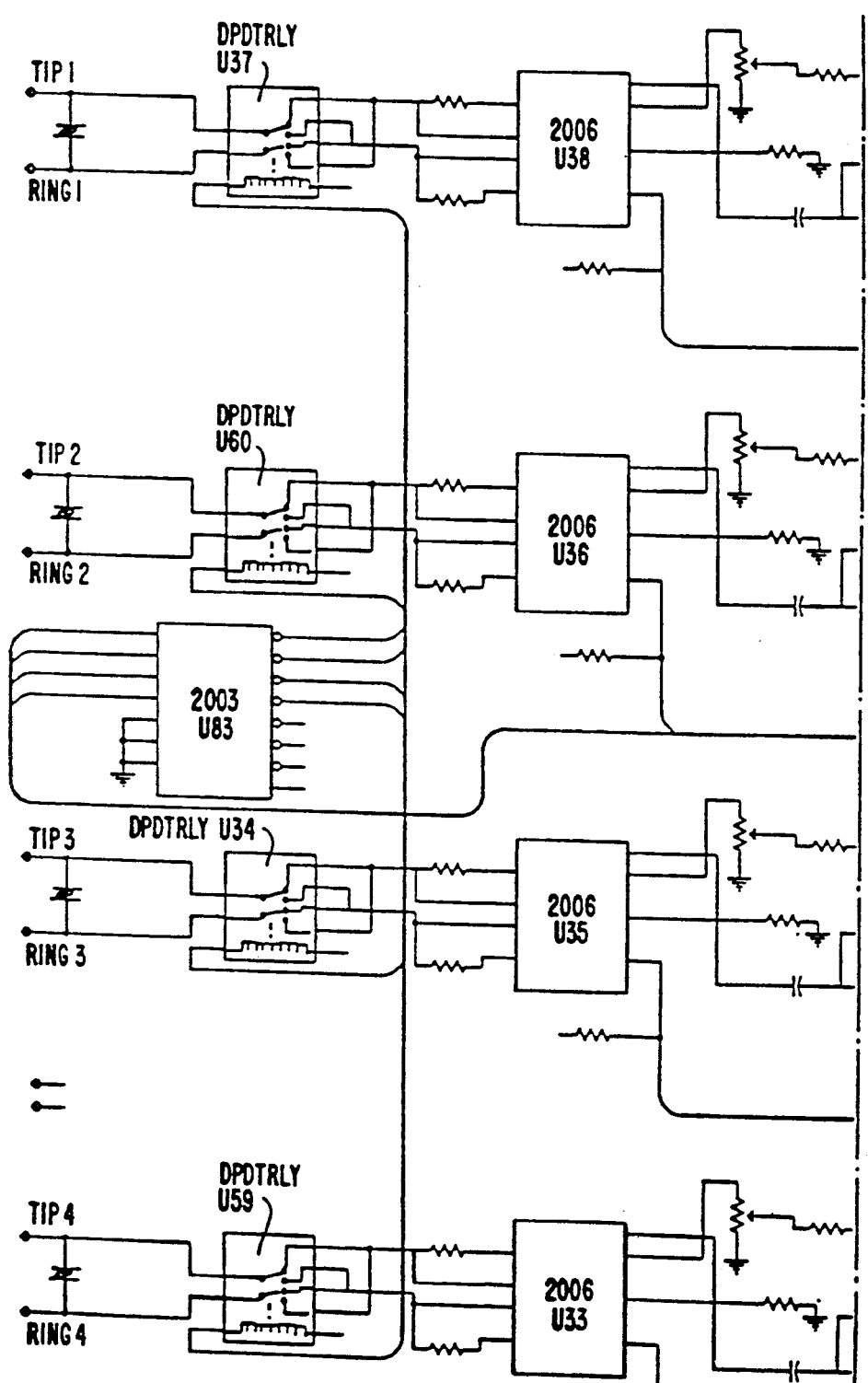
FIGS. 14A and B are a circuit schematic of a PC DID Trunk Interface of the data input 30 in accordance with the present invention.
Figure 14B:
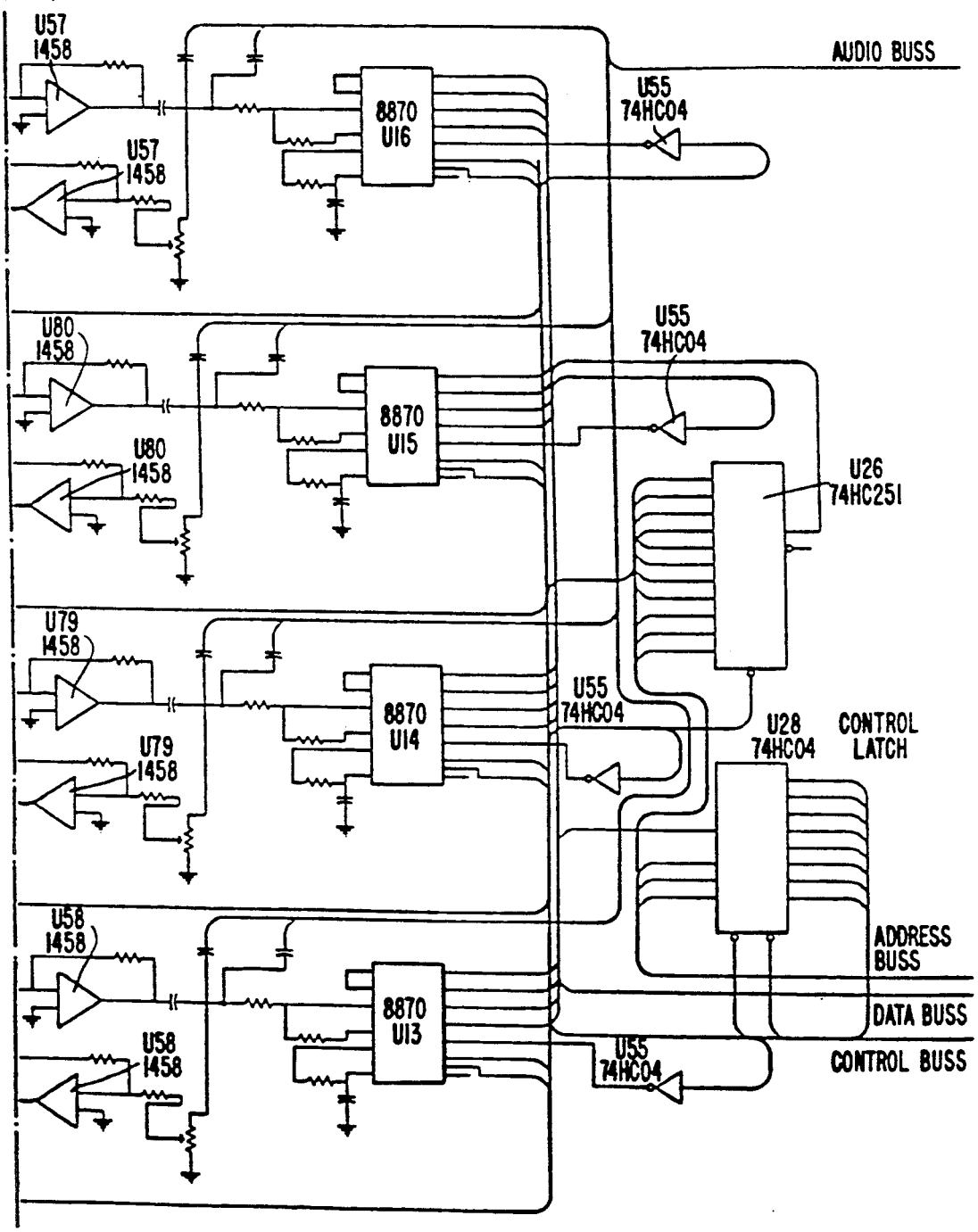

A preferred embodiment of the data input 30 is illustrated in FIGS. 14(A&B)-16(A&B). Integrated circuits are identified by their industry or manufacturer's designation. The control program for the data input processor is programmable by input from the keyboard 36 to alter its function to perform the inputting of data for any one of the sublocal, local, lata and hub switches. The data input 30 contains support for four direct inward dial DID trunks. Digits out-pulsed from the central telephone office may be rotary dial or DTMF tones up to sixteen digits in length. The data input 30 supports immediate or wink-start trunks. A preferred implementation of the DID trunk board with trunk interfaces is illustrated in FIGS. 14A and B. Validation relay U37 provides the necessary tip-ring line reversals for call validation. The U38 electronic SLIC provides the two-wire to four-wire conversion for the on-board electronics. Resistors R4 and R5 determine the line impedance for the 2006 SLIC. Hybrid balance is set by resistor R6 at 40/60 db. Off-hook seizure of the trunk is detected by the 2006 SLIC. The off-hook logic is routed to U26 for detection by the on-board processor. The off-hook output also detects rotary dial signalling. The line amplifier U57 provides an adjustable input and output level for DTMF tones and voice messages. The U15 8870 DTMF decoder detects dialed-up and "over-dialed" digits sent from the central office or the subscriber. The data valid output of the U15 8870 DTMF decoder is routed to U26 for detection by the microprocessor. The valid date relay is controlled by the relay driver U83 and the control latch U28.

Figure 15A:
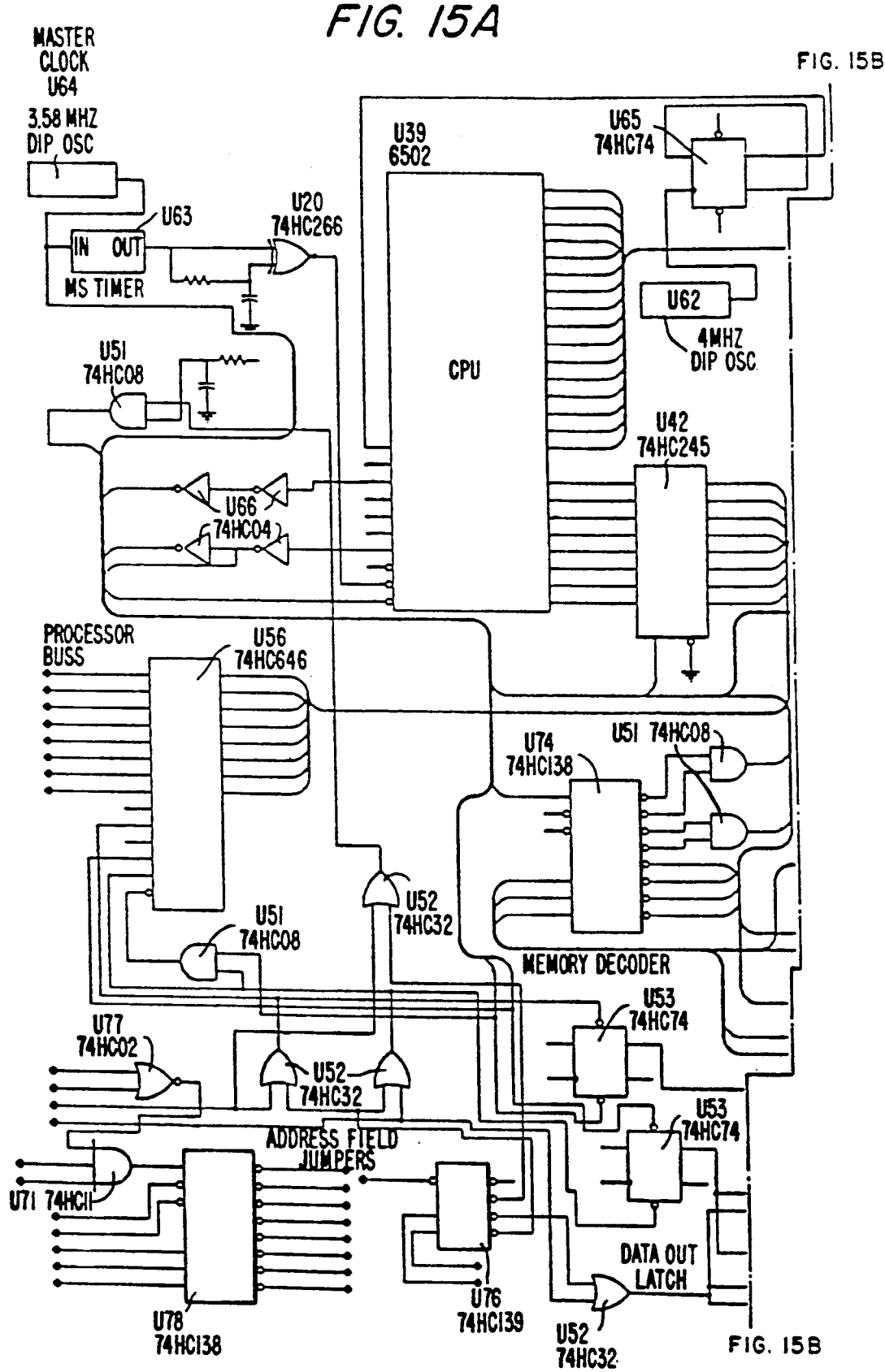
FIGS. 15A and B are a circuit schematic of a PC DID CPU Interface of the data input 30 in accordance with the present invention.
Figure 15B:
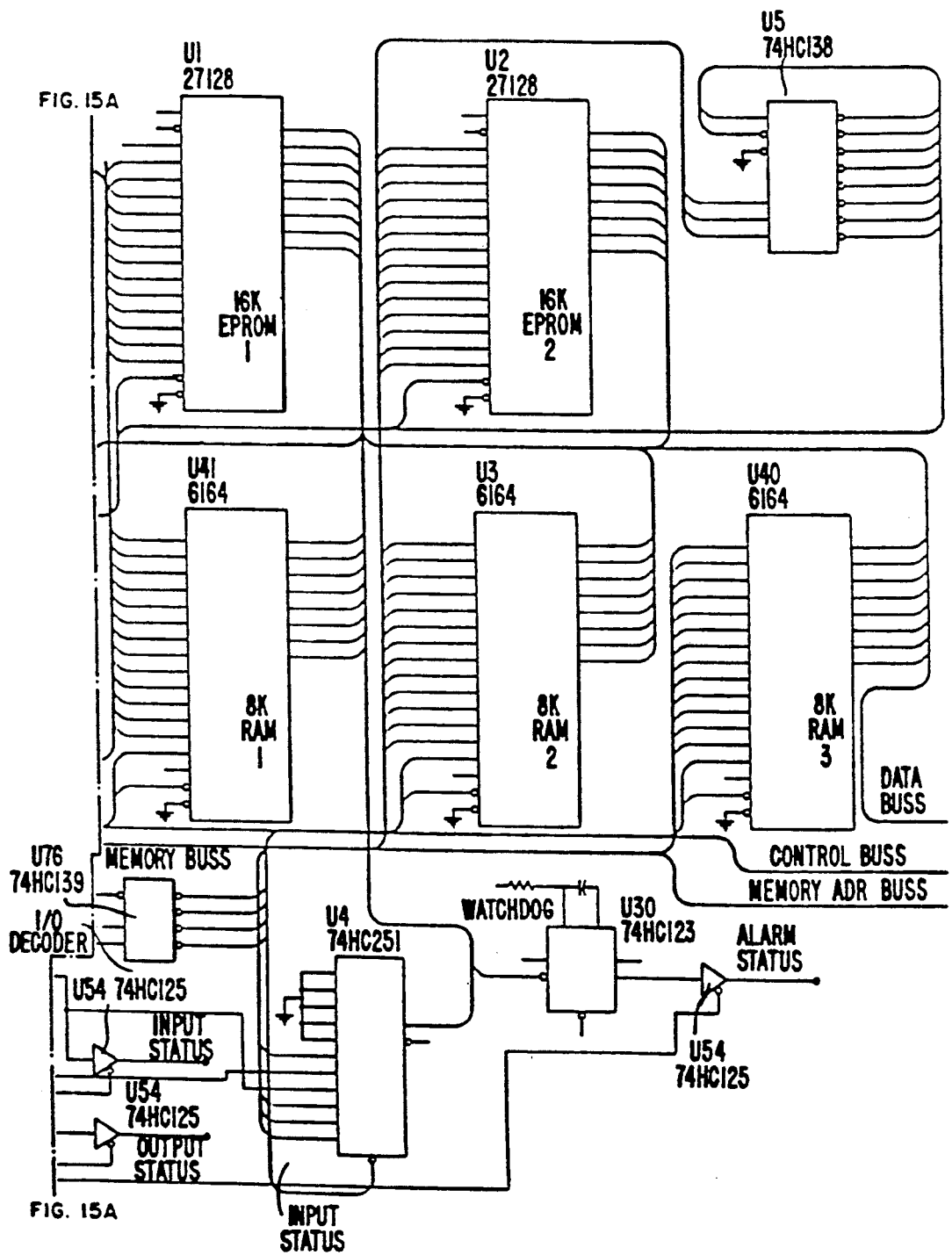

FIGS. 15A and B are discussed as follows. FIG. 15A contains the resident microprocessor U39 of the data input 30 which has 32 bytes of stored program in EPROM (U1 and U2) and 24K bytes of RAM (U3, U40 and U41) for temporary message storage contained in FIG. 15B. The resident microprocessor applies the buffer address of the inbound pages buffer 84 to pages that are inputted by the telephone trunk 28 in non-X.25 protocol. The operational status of the resident processor is monitored by watchdog timer U30. In the event of processor failure, the watchdog timer alerts the CPU 50 that a malfunction exists. The data interchange between the resident microprocessor of the data input 30 and the CPU 50 takes place with the bi-directional latch U56. Buffer status latches U53 determine the status of data entering and exiting the data input 30. Board address decoding is determined by the U76, U77, U78 and U21. The address jumpers are set to determine the starting address field for the data input.

Figure 16A:
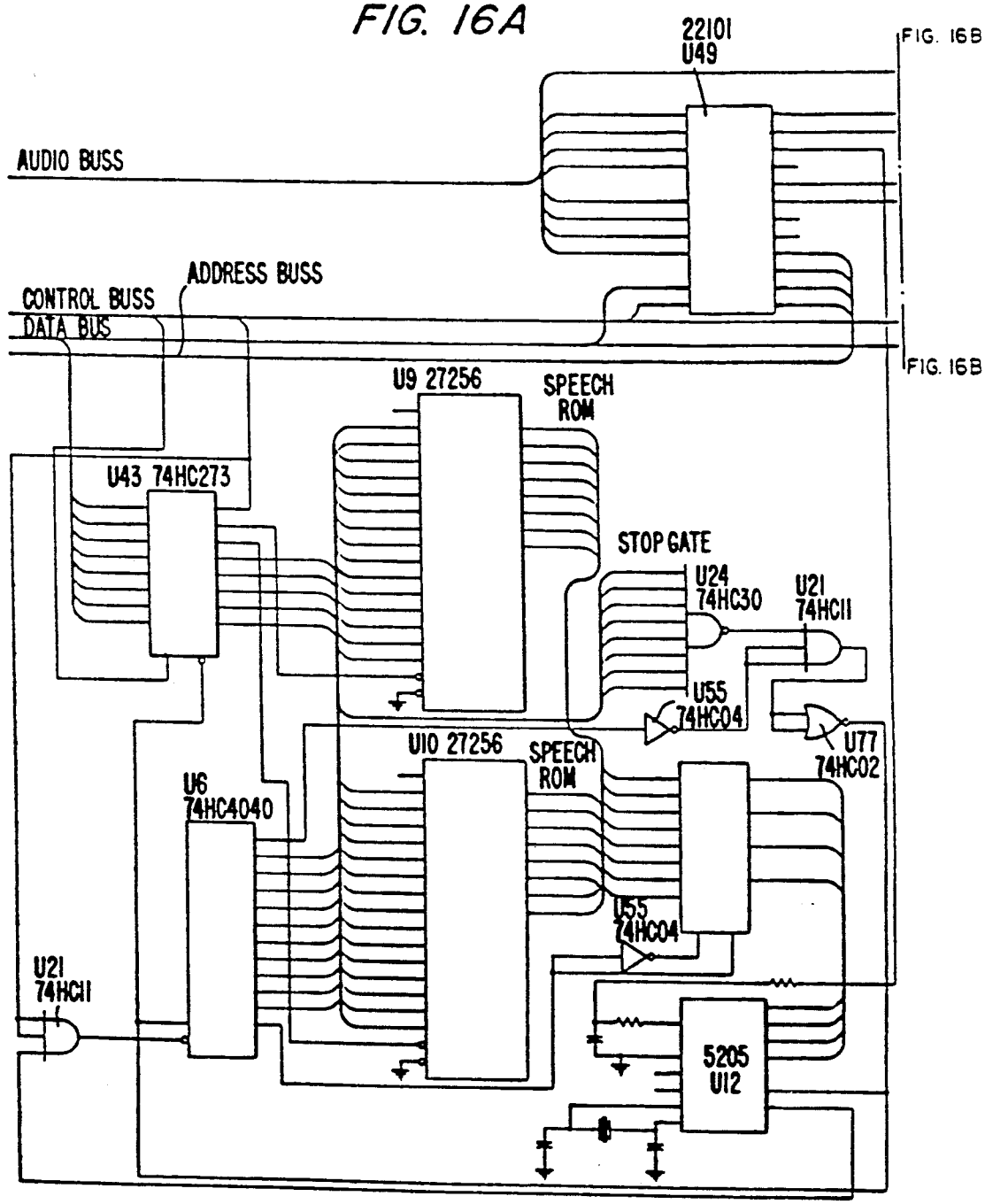
FIGS. 16A and B are a circuit schematic of PC DID Audio Routing of the data input 30 in accordance with the present invention.
Figure 16B:
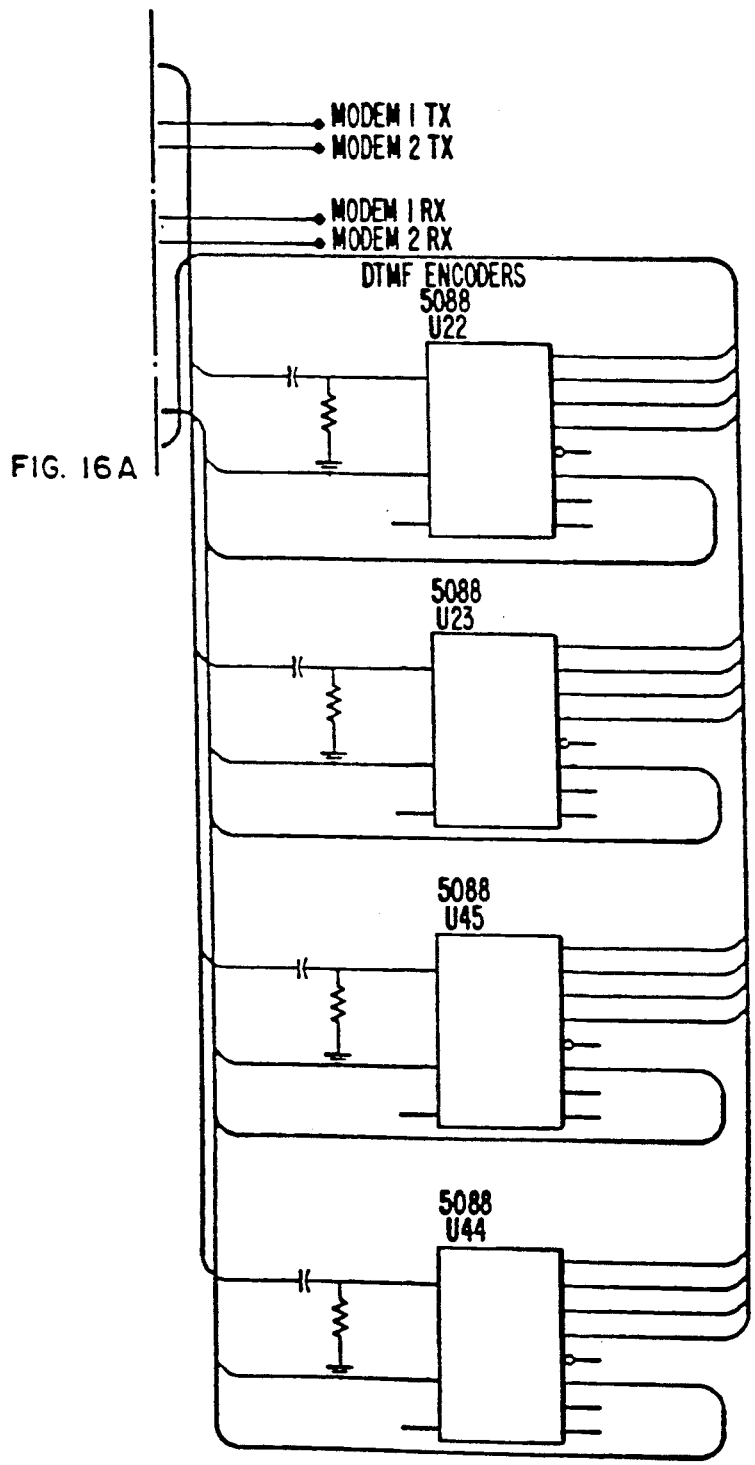

FIGS. 16A and B contain the voice messaging synthesizers, the audio matrix switch and the DTMF encoders of the data input 30. The voice synthesizer is under direct control of the CPU 50 via the word latch U43 and functions to provide necessary voice prompting between persons calling in pages or programming their subscriber file. The starting address of the word addresses the speech ROMs U9 and U10. The U6 HC 4040 word address counter presents the four-bit ADPCM words to the U8 HC 4019 four-bit gate to the U12 5205 voice synthesizer message. The voice audio is routed through the U49 22101 audio matrix switch to the respective DID trunk.

Dedicated trunk DTMF encoders U22, U23, U45 and U44 encode digits sent to the trunks 1-4, respectively of the data input 30. The encoded digits are sent from the microprocessor to the respective encoder. The output levels are present relative to the adjusted audio level from the line amplifiers for a level equal to the maximum voice level.

2. Data Output 34

The data output 34 performs several functions. For batches of pages which are destined for the local paging service 18, the data output converts the pages as outputted from the ID code buffers 86 from ASCII to the hybrid encoding format discussed below. However, it should be understood that the invention is not limited to the use of the hybrid encoding format. For packets of pages which are destined for the lata switch 14, the data output 34 accepts the pages which have been formatted in the X.25 transmission protocol by the data module processor 32 as described below and outputs them to the lata switch over communications link 20. A preferred embodiment of the data output 34 is illustrated in FIGS. 17(A&B)-19(A&B). A control program for the data output 34 is programmable by input from the keyboard 36 to alter its function to perform the outputting of data for any of the sublocal, local, lata and hub switches Integrated circuits are identified by their industry or manufacturer's designation. The transmission of pages from the data output 34 are periodic (non-real time) to both the lata switch 14 having jurisdiction over the local switch 12 and to the local paging service 18.

The ports of the data output 34 perform the following functions. A first port serves as the network entry/exit point for the network. X.25 data packets are sent and received between the first port which is connected by communication link 20 to the lata switch 14 having jurisdiction. The first port utilizes a two-wire subscriber line to send X.25 encoded packets which originate from the local switch 12 to the lata switch 14 having jurisdiction. Ring-in on the port connected to the lata switch 14 initiates a network answer and network paging data can be down-loaded from the lata switch 14. The second port of the data output 34 may perform any one of three functions. It may operate as a telephone port as described above. When operated as a telephone port, it dials into an unused DID trunk of the local paging service 18. An unused telephone and voice pager is assigned to the terminal of local paging service 18. This permits functioning as the local paging service 18 front-end entry to the network 10. This configuration is especially useful when the local paging service 18 has an existing analog compatible transmitter. The second function of the second port is a stand-alone paging switch connected directly to a locally controlled transmitter 15 in the local paging service 18 or "hand-shaked" with an existing analog system. The output audio is paralleled or switched with the transmitter controlled local control connections. Hand-shake inputs and outputs permit the local switch 12 and the terminal of the local paging service 18 to "share" transmitter control without collisions. A collision is when one terminal attempts to page while the other is paging on the transmitter control pair. In this configuration, the local collector may operate as a stand-alone or "shared" terminal. The third function of the second port permits the local switch 12 to operate as a stand-alone or shared switch for a digital-only paging service 18. In the stand-alone digital configuration, the local switch 12 is connected to the digital transmitter 15 via the data and transmitter keying control logic outputs. When shared with an existing digital transmitter, the data transmitter control and hand-shake control lines are routed through the local switch 12 for control.

The data output 34 contains a resident microprocessor to control the local and network ports, encode and decode telephone digits. The microprocessor performs the important function of converting ASCII encoded batches of pages which are received from the ID code buffers 86 for transmission to the local paging service 18 into the hybrid encoding format discussed below which is compatible with analog or digital FM paging transmitters. Each character of a numeric page which is transmitted with the A3, C3, A5 and C5 commands is encoded with a single tone discussed below. Each character of a page which is transmitted with the A4, C4, A6 and C6 commands is encoded with sequential tones discussed below to be transmitted to a local paging service 18 is encoded by two tones in accordance with the table set forth below whether the page is to be in English or Japanese. The pages previously grouped by the CPU 50 in the ID code buffers 86 are buffered in the data output until their periodic transmission. The data output 34 controls the transmitter 15 of the local paging service 18. A prompting voice synthesizer and the audio matrix switch for routing X.25 formatted packets of pages are also contained in the data output 34.

Figure 17A:
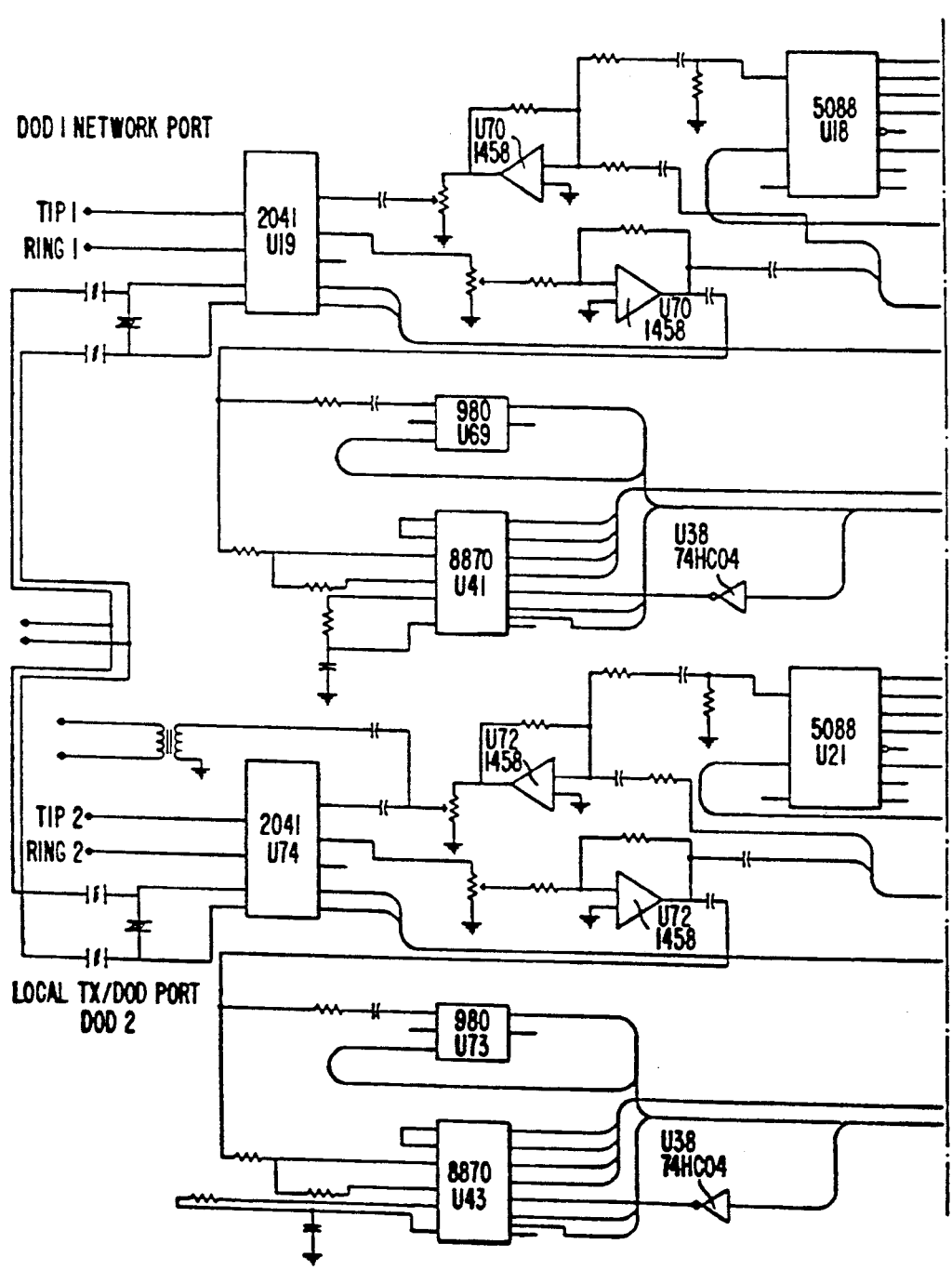
FIGS. 17A and B are a circuit schematic of a PC DOD Trunk Interface of the data output 34 of the present invention.
Figure 17B:
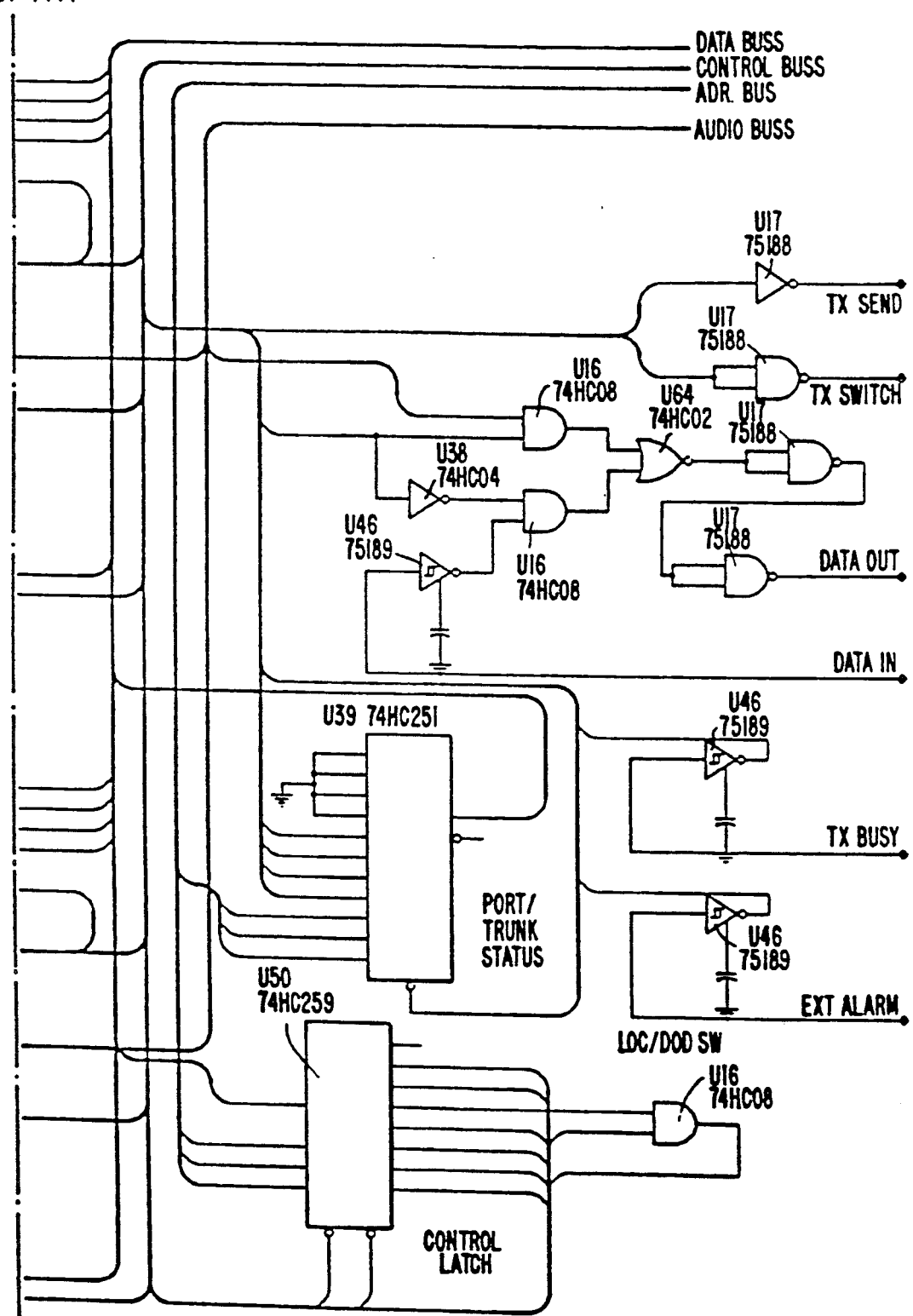

FIGS. 17A and B contain the telephone trunk interface electronics. When both ports are used in a dial-up configuration, the U19 and U20 2041 electronic RSLIC's convert to the two-wire TIP-RING to a four-wire circuit An internal hybrid provides the necessary isolation. Ring-in detection and seizure of the telephone circuit are also accomplished by the RSLIC. The U70 and U72 1458 line amplifiers provide gain for receiving and transmitting audio. DTMF digits are decoded by the U41 and U43 8870 decoders. Telephone office tones are detected by the U69 and U70 M980 detectors. Tones are monitored by frequency and cadence permitting the sequence for determining call status. A U18 or U21 5088 DTMF encoder is utilized under direct processor control to originate DTMF signalling digits.

Figure 18A:
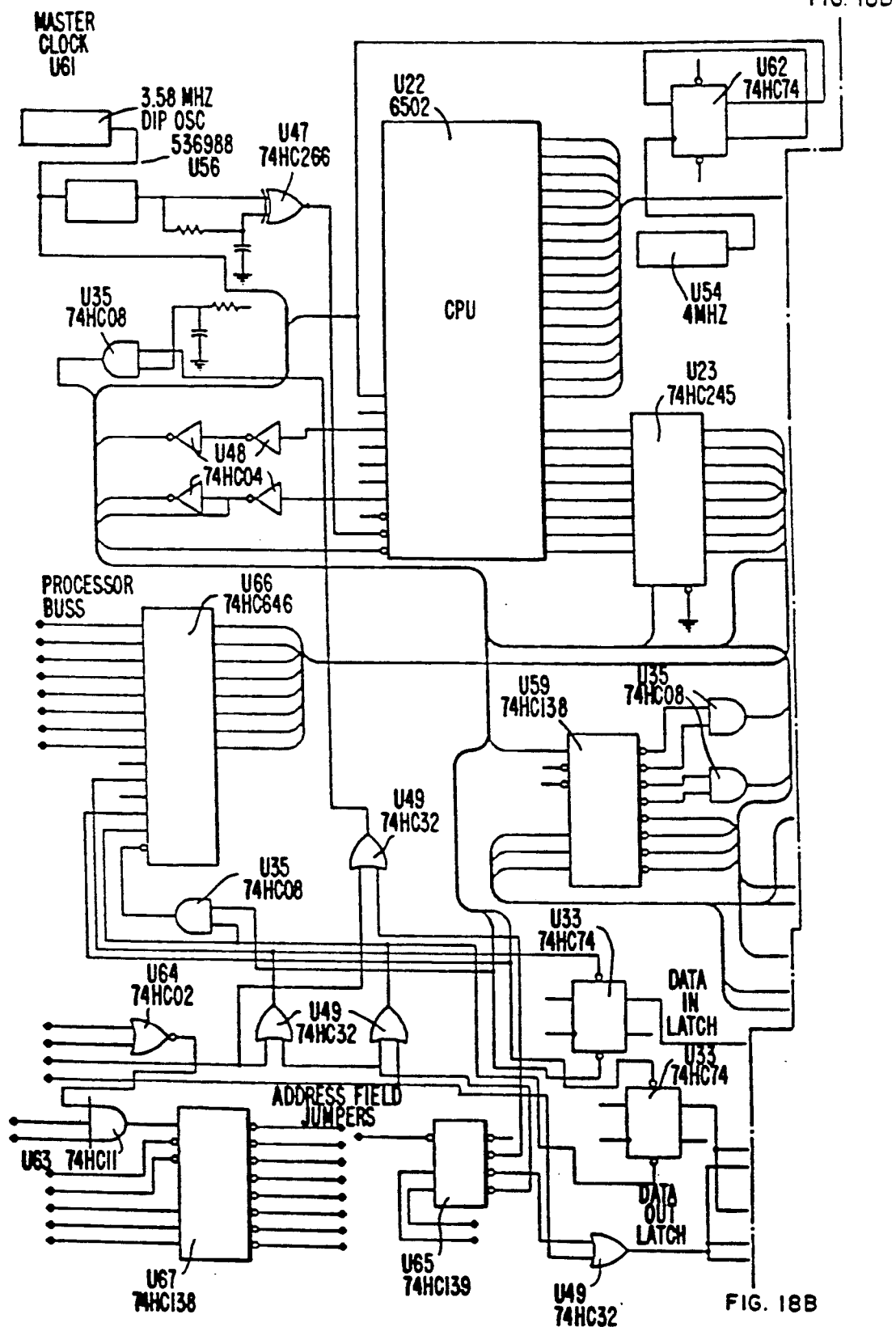
FIGS. 18A and B are a circuit schematic of a PC DOD CPU Interface of the data output 34 of the present invention.
Figure 18B:
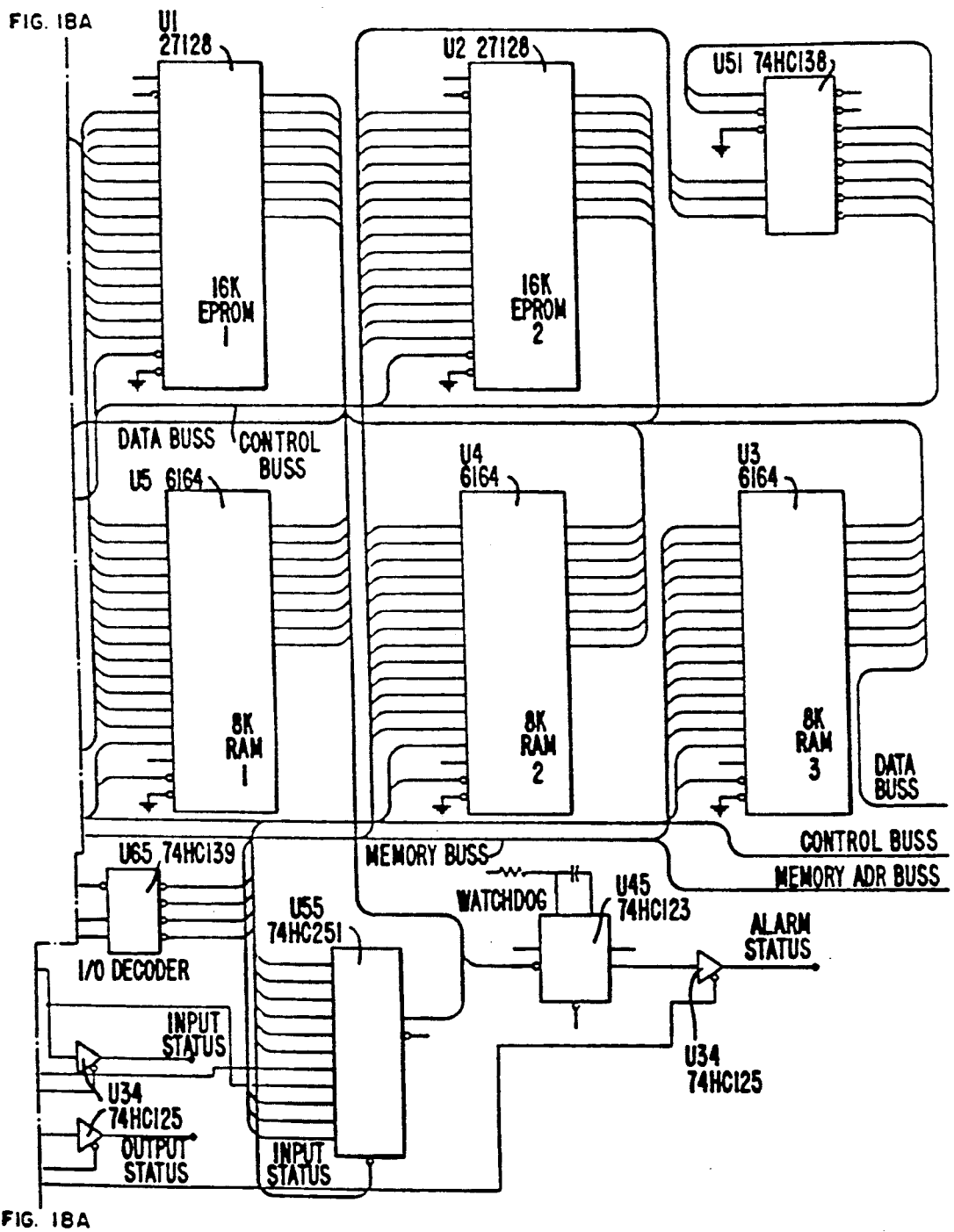

FIGS. 18A and B contain the resident microprocessor (U22), RAM (U3-U5) and EPROM (U1 and U2) memories utilized for the stored program and the buffering of messages. Storage of 32K bytes of stored program and 24K of RAM memory are utilized for these functions. The address jumpers are located within the appropriate bus buffer U66 and status latch U33. A watchdog timer U45 monitors the operation of the processor and alerts the switch when a malfunction is detected.

Figure 19A:
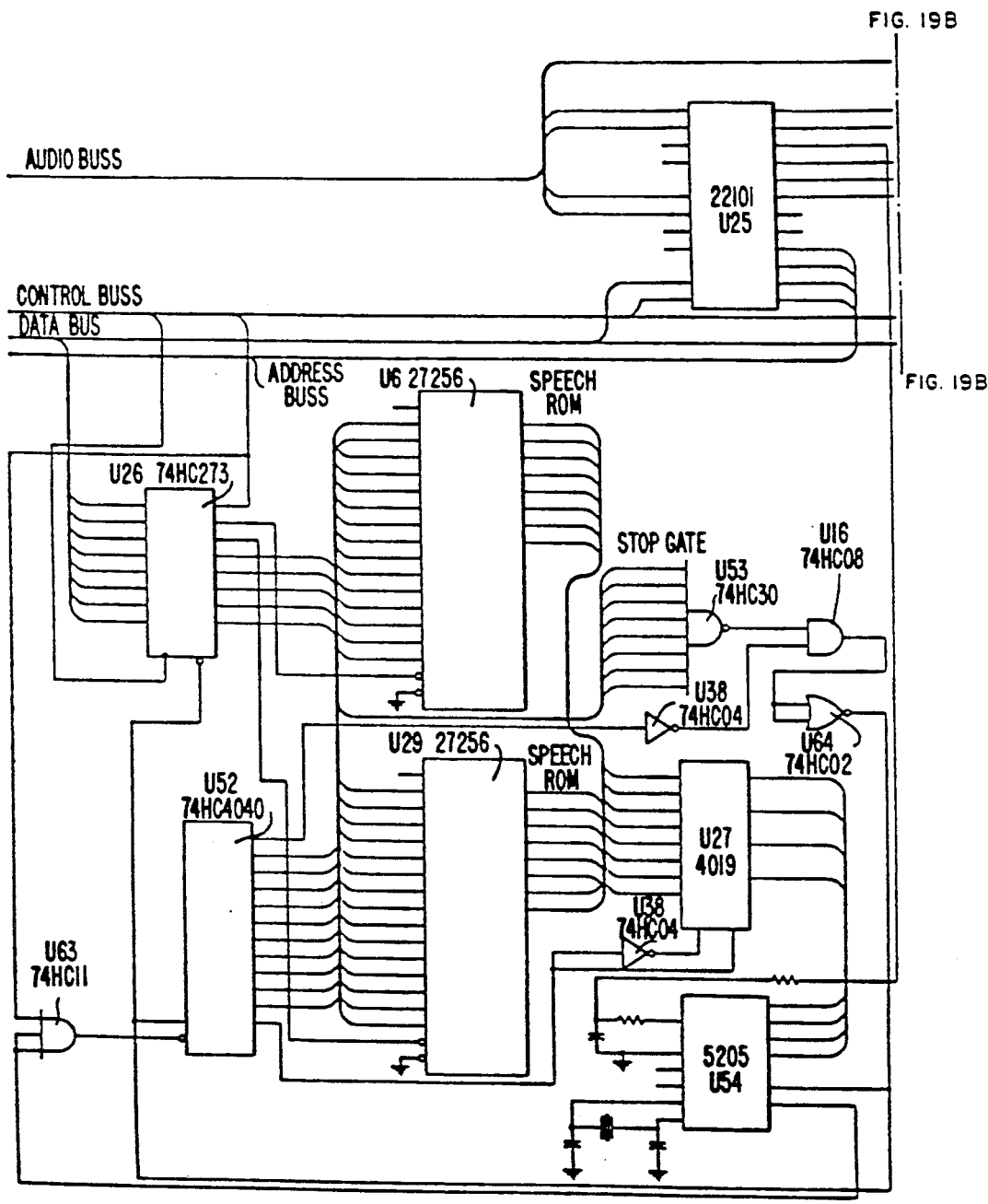
FIGS. 19A and B are a circuit schematic of PC DOD Audio Routing of the data output 34 of the present invention.

FIGS. 19A and B contain the voice message synthesizer, X.25 matrix switch and the paging protocol encoder for encoding batches of pages received from the ID code buffers 86 for transmission to the local paging service. The protocol encoder U28 is under direct control of the processor via the latch U24. The analog protocol is converted into a digital waveform by U46 and U57 when digital outputs are used from the board. The U25 22101 audio matrix switch routes pages to and from the CPU 50 and also routes the voice messaging audio to the network ports. The voice synthesizer U54 synthesizes words stored in ROM memories U6 and U29 that are selected by word latch U26. Message generation is under direct control of the processor of the microprocessor.

3. MF and DTMF Processor 44

The MF and DTMF processor is utilized when interfacing to four-wire E and M trunks requiring MF signalling and bi-directional supervision. The MF and DTMF processor 44 contains two trunks, the MF encoders and decoders and DTMF encoders and decoders under the direct supervision of an on-board microprocessor. A preferred embodiment of the MF and DTMF processor 14 is illustrated in FIGS. 20(A&B)-22(A&B). Integrated circuits are identified by their industry or manufacturer's designation.

Figure 20A:
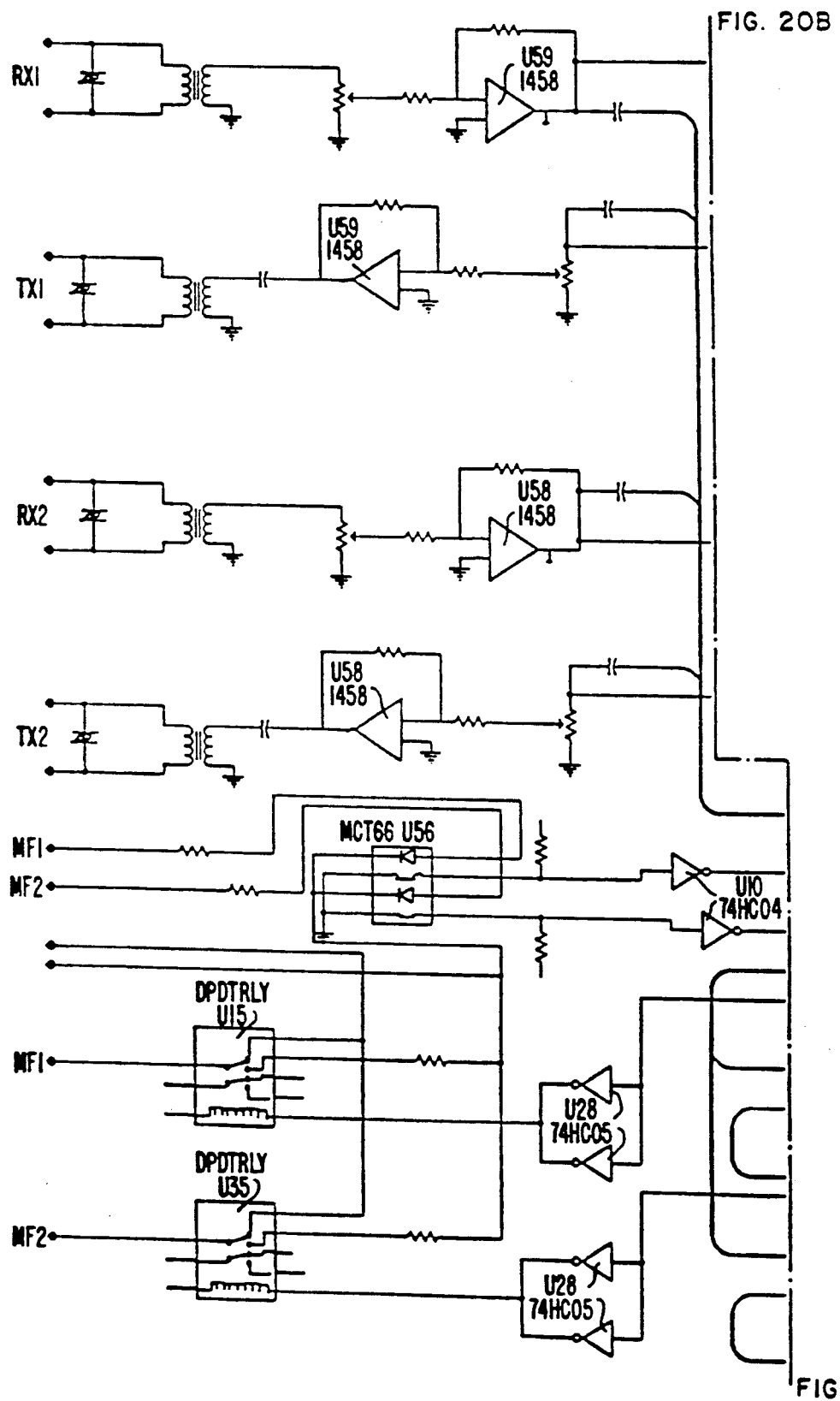
FIGS. 20A and B are a circuit schematic of a PC MF Trunk Interface of the MF and DTMF Processor 44 of the present invention.
Figure 20B:
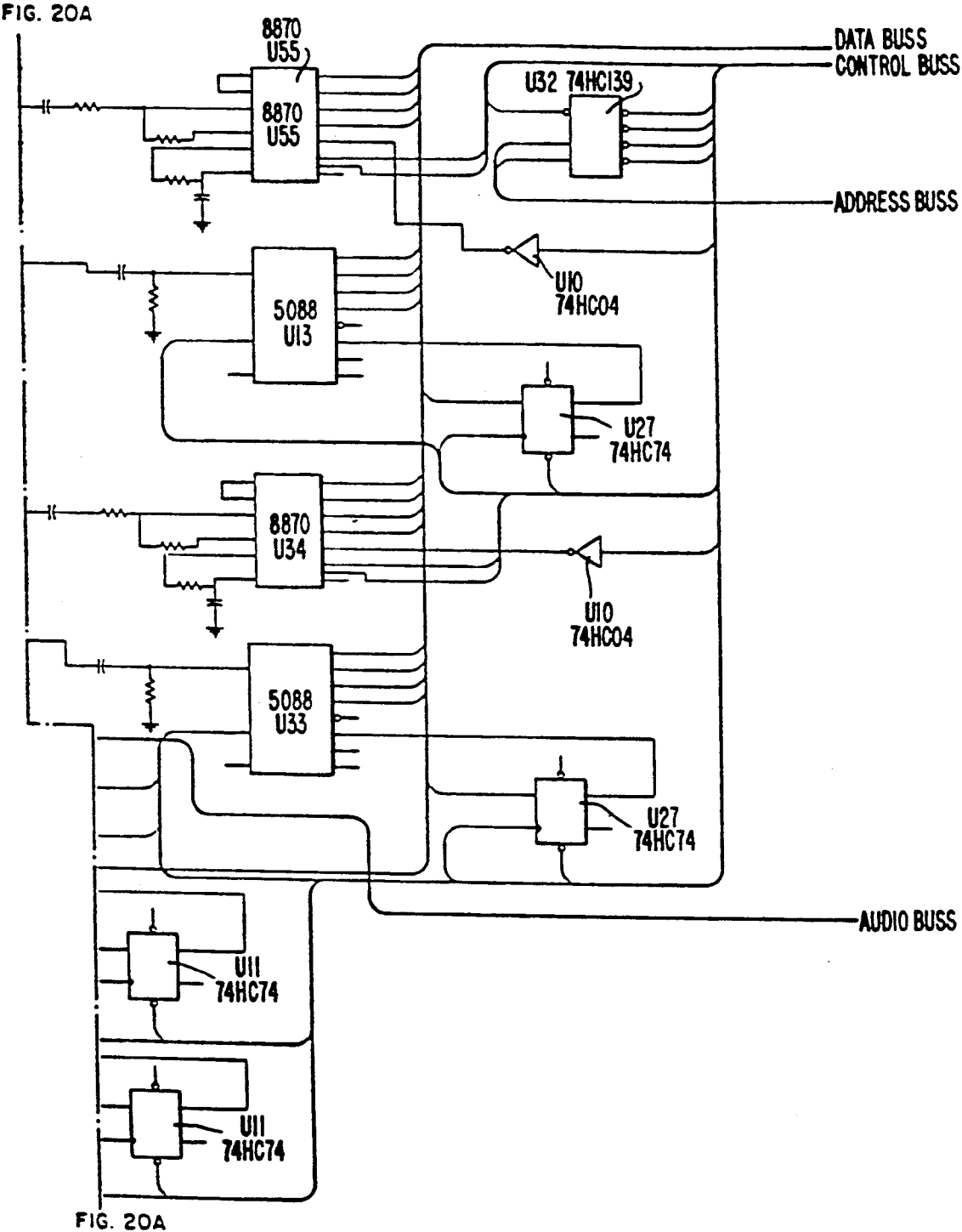

FIGS. 20A and B are described as follows. FIG. 20A contains the trunk line amplifiers U58 and U59 for the two trunk pairs. The "E" lead supervision inputs for each trunk are controlled by the opto-isolator U56. Current is limited to 15 milliamps in each of the "E" lead circuits by resistors R25 and R26 for trunks 1 and 2, respectively. The "M" lead control for each trunk is provided by relays U15 and U35 with current-limiting resistors R27 and R28. The "M" lead is at a battery-common potential when at rest and changes to a −48 volt battery during wink and supervision periods. The "E" lead logic signals are routed to the processor for interpretation. FIG. 20B performs the following functions. The "M" lead control is under direct control of the microprocessor via latch U11. DTMF encoders and decoders are provided. The U34 and U55 8870 decoders contain the amplifiers, filters and tone detection electronics to detect the presence of DTMF tones. When a tone is detected, the microprocessor is alerted via the DV (data valid) output on pin 15. DTMF tone generation is accomplished by the 5088 encoders U13 and U33. Tone duration is microprocessor controlled with the tone enable latches U27 and U32. Modem audio and voice messaging is routed to the audio matrix switch for distribution.

Figure 21A:
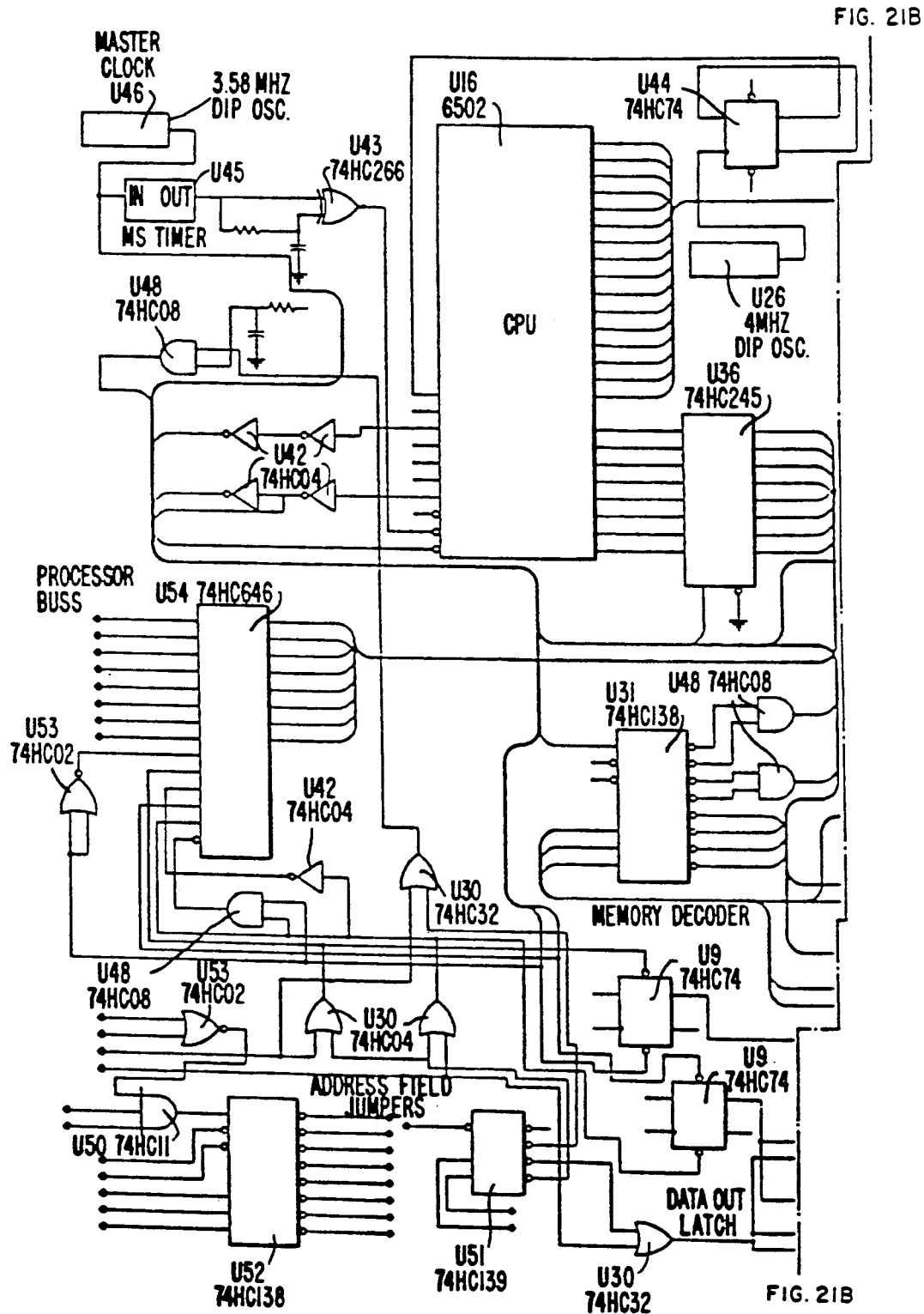
FIGS. 21A and B are a circuit schematic of a PC MF CPU Interface of the MF and DTMF Processor 44 of the present invention.
Figure 21B:
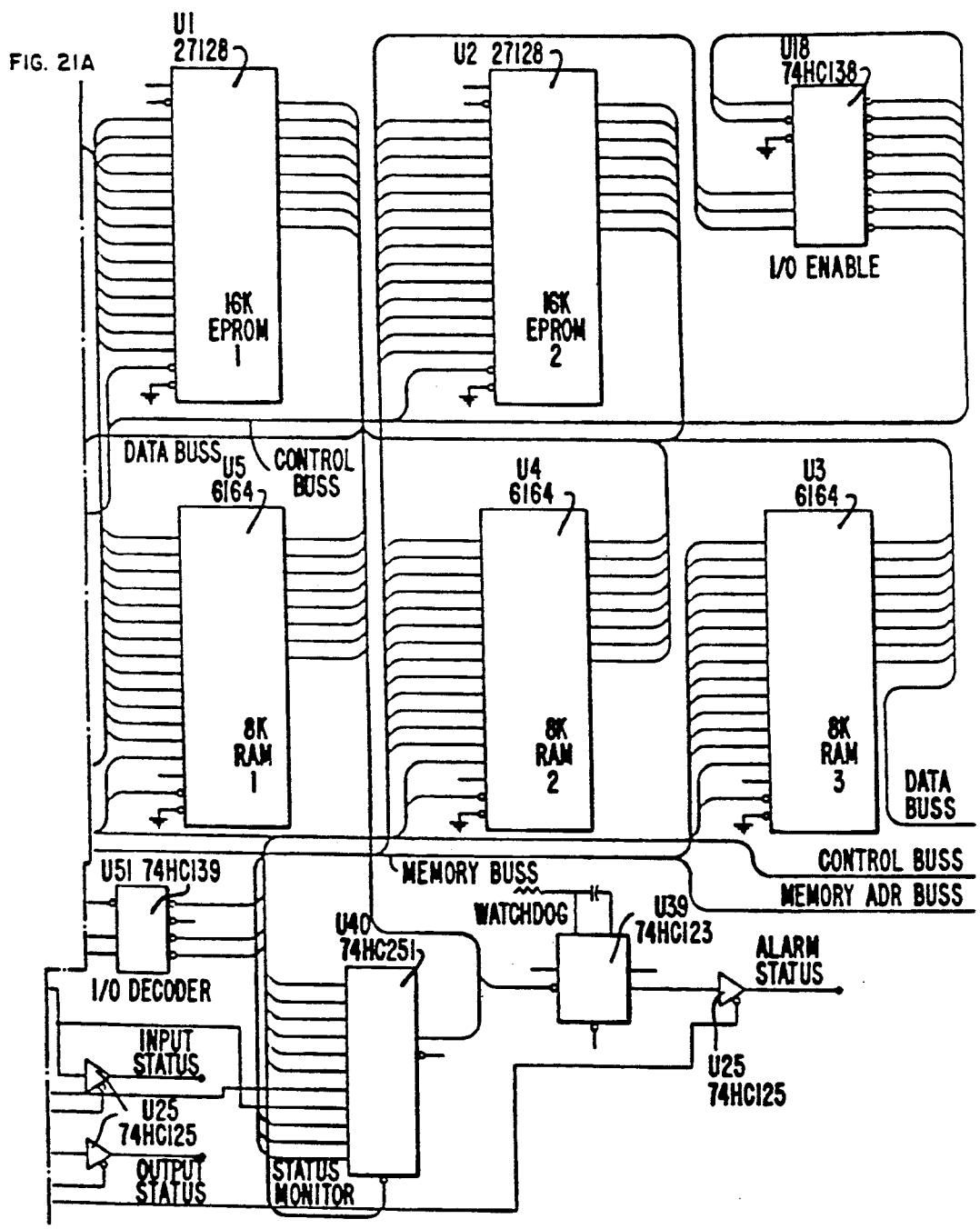

FIGS. 21A and B contain the microprocessor and related support electronics. The U46 master clock for the processor U16 is a 3.58 MHz and is utilized for the DTMF encoders and decoders and the interrupt timers. The master clock frequency is divided by two by U44 and sent to the clock input of the processor. Five millisecond interrupts are generated by the 3.5 MHz divider U45 and the EXCLUSIVE OR gate U43. Every 5 milliseconds, the processor determines if any change in input/output functions has taken place. The processor also uses the 5 millisecond interrupts as a timer reference for determining timing and signalling sequences. Two 27128 16K byte EPROM memories (U1 and U2) contain the stored program for the microprocessor. Memory of 24K bytes of RAM (U3-U5) are used for temporary storage of pages to be sent or received via DTMF signalling and trunk status. A watchdog timer U39 monitors the status of the data bus and, upon failure of the microprocessor, alerts the central processing unit 50. The input/output interface between the MF and DTMF processor 44 and the CPU 50 utilizes a bi-directional tri-state latch. The latch U54 can send, receive and store messages simultaneously. The address of the MF and DTMF processor 44 within the architecture of FIG. 2 is determined by U52, U53, U51, U9 and U26. When the MF and DTMF processor 54 receives data from the microprocessor, the data is ready to be read.

Figure 22B:
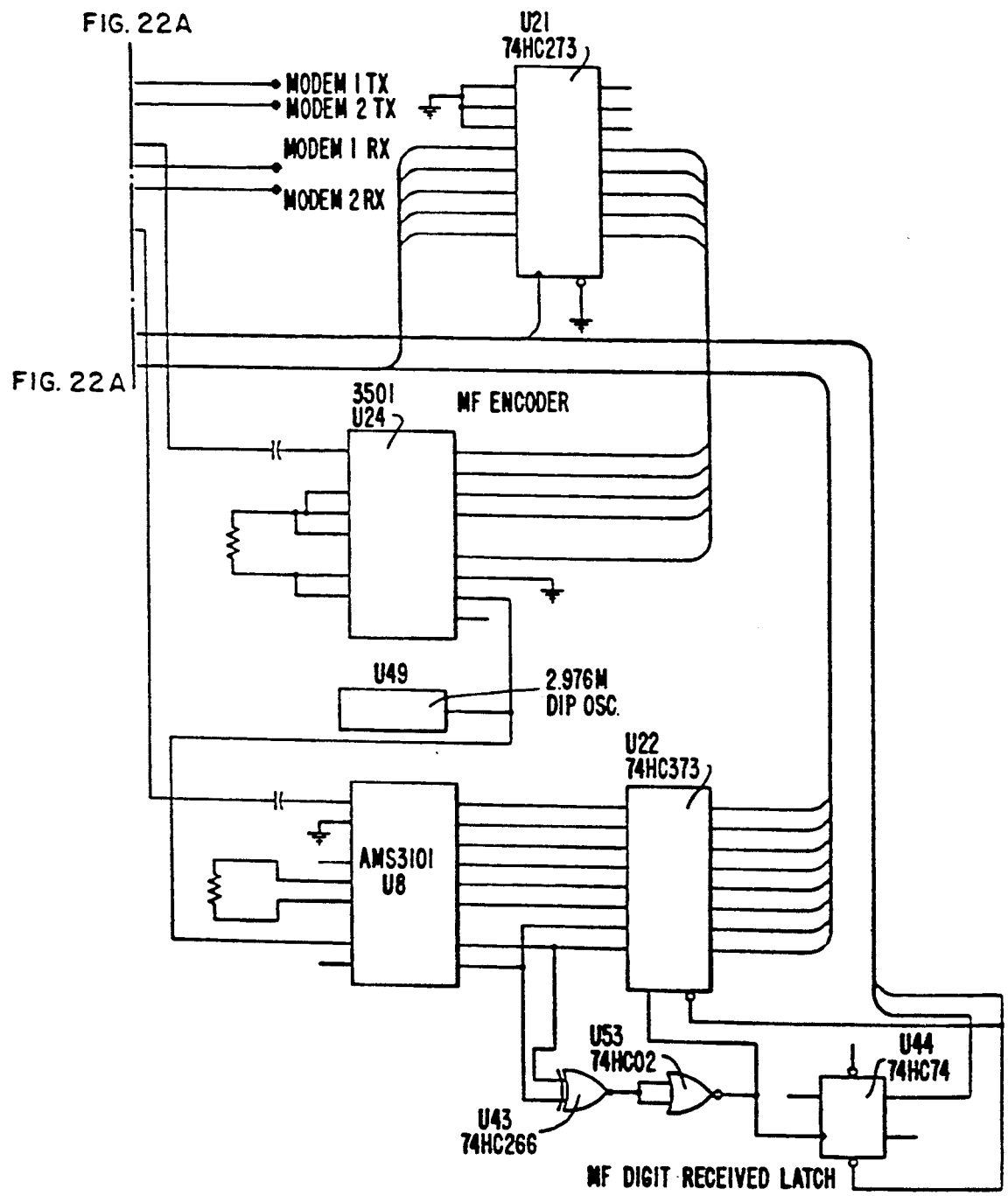
FIGS. 22A and B are a circuit schematic of PC MF Audio Routing of the MF and DTMF Processor 44 of the present invention.

FIGS. 22A and B are described as follows. FIG. 22A contains the U23 22101 audio matrix switch which routes the received and transmitted X.25 transmission formatted pages to the respective trunk. The multiplex MF encoder and decoder is also routed to the respective trunk via the audio switch. The U24 3501 MF encoder and the U8 3101 MF decoder are under direct microprocessor control. The output level of the 3501 encoder is fixed by resistor R5. The 3501 encoder is capable of sending R1 and R2 tone subsets. The voice messaging synthesizer U41 5205 is controlled by the U20 word latch. The word latch addresses the specific areas of the ROM Word memories U6 and U7 and is transferred by the U17 4019 switch to the 5205 voice messaging synthesizer. Address counter U38 sends counts from the starting address set by the U21 HC 273 word latch until the "END WORD" gate U47 detects completion of the word. The word latch is then cleared and the new word may be received from the microprocessor.

4. Data Module Processor 32

The data module processor (DMP) 32 performs several functions. A first function is to interface with the system 10 via the communication path 20 between a local switch 12 and the lata switch 14. A second function is processing of input and output communications which involve the X.25 transmission protocol. Input packets of pages, which are in the X.25 transmission protocol, are received over the communication link 20 from the lata switch 14 or from the telephone trunk 28, as explained above, are stripped of the X.25 transmission protocol down to the fifth level as explained with reference to FIG. 31 below and converted into ASCII code for processing by the CPU 50. The DMP 32 converts ASCII encoded pages received from the outbound lata buffer 82 of the RAM 48, which are intended for transmission to the lata switch 14 over the communication link 20, to the hybrid code described below and formats them into X.25 protocol with the X.25 protocol being identical to that described below with reference to FIG. 31. Furthermore, the DMP 32 contains buffers for storage of ASCII coded pages which are sent to the RAM 48 and storage for packets of pages which are forwarded to the data output 34 for transmission to the associated lata switch 14.

FIGS. 23(A&B)-25(A&B) illustrate a preferred embodiment of the data module processor 32. Integrated circuits are identified by their industry or manufacturer's designation. A control program for the data module processor 32 is programmable by input from the keyboard 36 to alter its function to perform the inputting of data for any one of the sublocal, local, lata and hub switches.

The DMP 32 has two X.25 encoder/decoder sets capable of receiving and transmitting X.25 encoded packets from the network 10. An audio matrix is provided on each of a pair of trunk boards routing the packets in the X.25 transmission protocol. Two modems are provided for the interchange of system data. The resident microprocessor U7 and random access memory U5 and U6 process and store packets of pages. The processing includes the above-described stripping of X.25 transmission protocol from packets of pages and conversion of characters from the hybrid code described below to ASCII and from ASCII to the hybrid code with the X.25 transmission protocol being added. The DMP 32 also provides temporary buffering of disassembled pages prior to transmission to the buffers 80 and 84 of the RAM 48 and temporary buffering of packets of pages prior to transmission to the data output 34.

With reference to FIGS. 23A and B, the resident microprocessor set consists of the CPU (U7-6502), RAM memory (U5,U6-6164), and the 27128 EPROM (U4). All microprocessor address lines are buffered (U8,U9-74HC541) and a data bus buffer U10 (74HC245) is provided. Memory bank decoding is accomplished by U12, with the HC138 being one of eight decoders. The memory decoder partitions the 64K of memory into 8 banks. Two banks (16K) are utilized for stored program access (EPROM) and two banks are used for random access memory (16K RAM). Two banks are utilized for the X.25 encoder/decoder circuits and the remaining two banks for the host processor read/write registers.

Figure 24A:
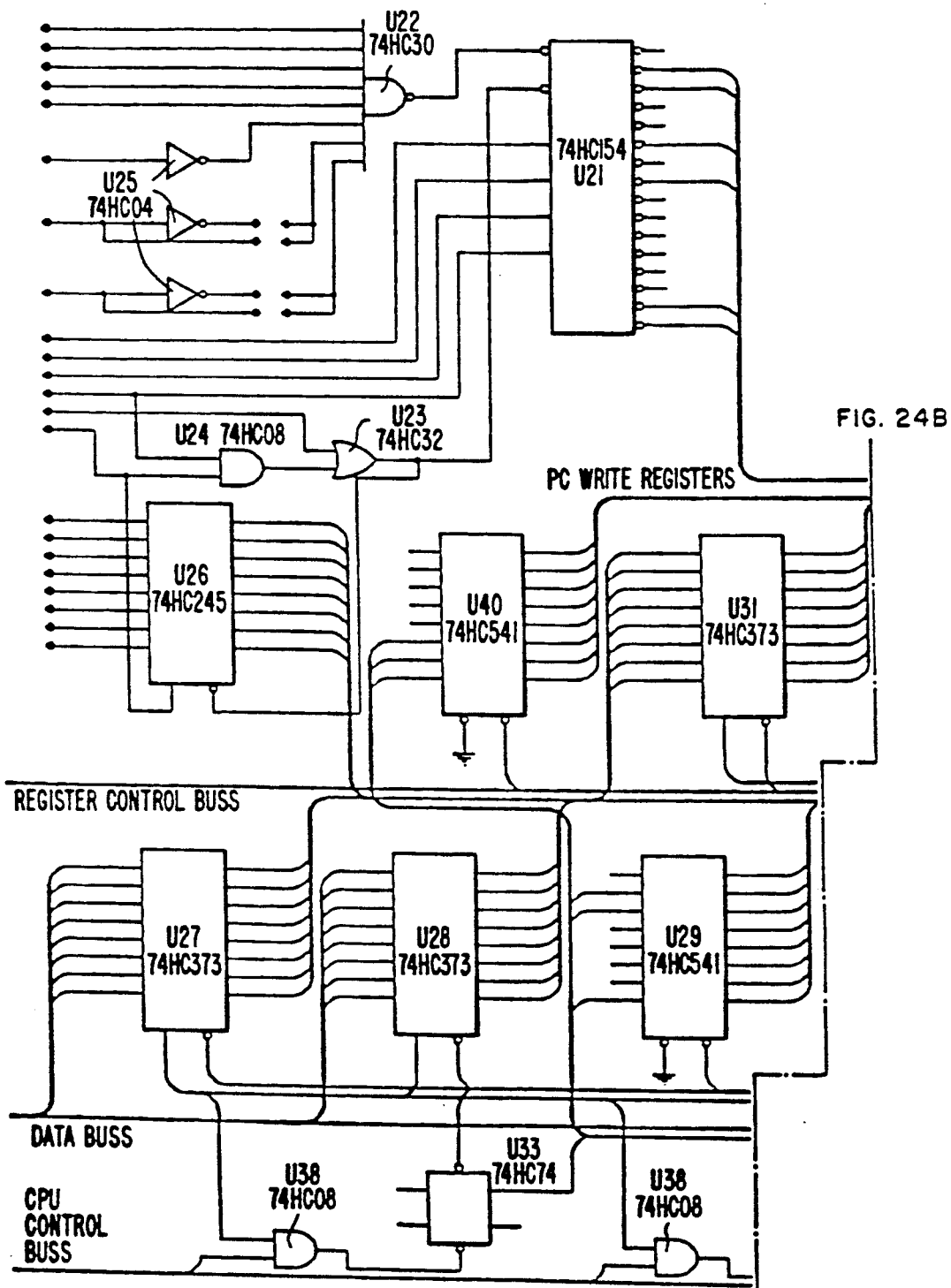
FIGS. 24A and B are a circuit schematic of the PC XT Channel Register and Modems of the data module processor 32 of the present invention.

With reference to FIG. 24A, the host processor interface consists of three write registers (U40 - interrupt, U31- TX data, and U32- command) and four read registers (U27, U28, U29, and U30). Each register is individually addressed in a fashion identical to an 8255 serial port. Memory address decoding is accomplished by a jumper field and decoder U21 (74HC154).

The U7 microprocessor receives clock pulses from divider U33 (74HC74). A resident watchdog timer U37 (74HC123) monitors processor activity and alerts the host CPU 50 in the event of a catastrophic failure.

Figure 23B:
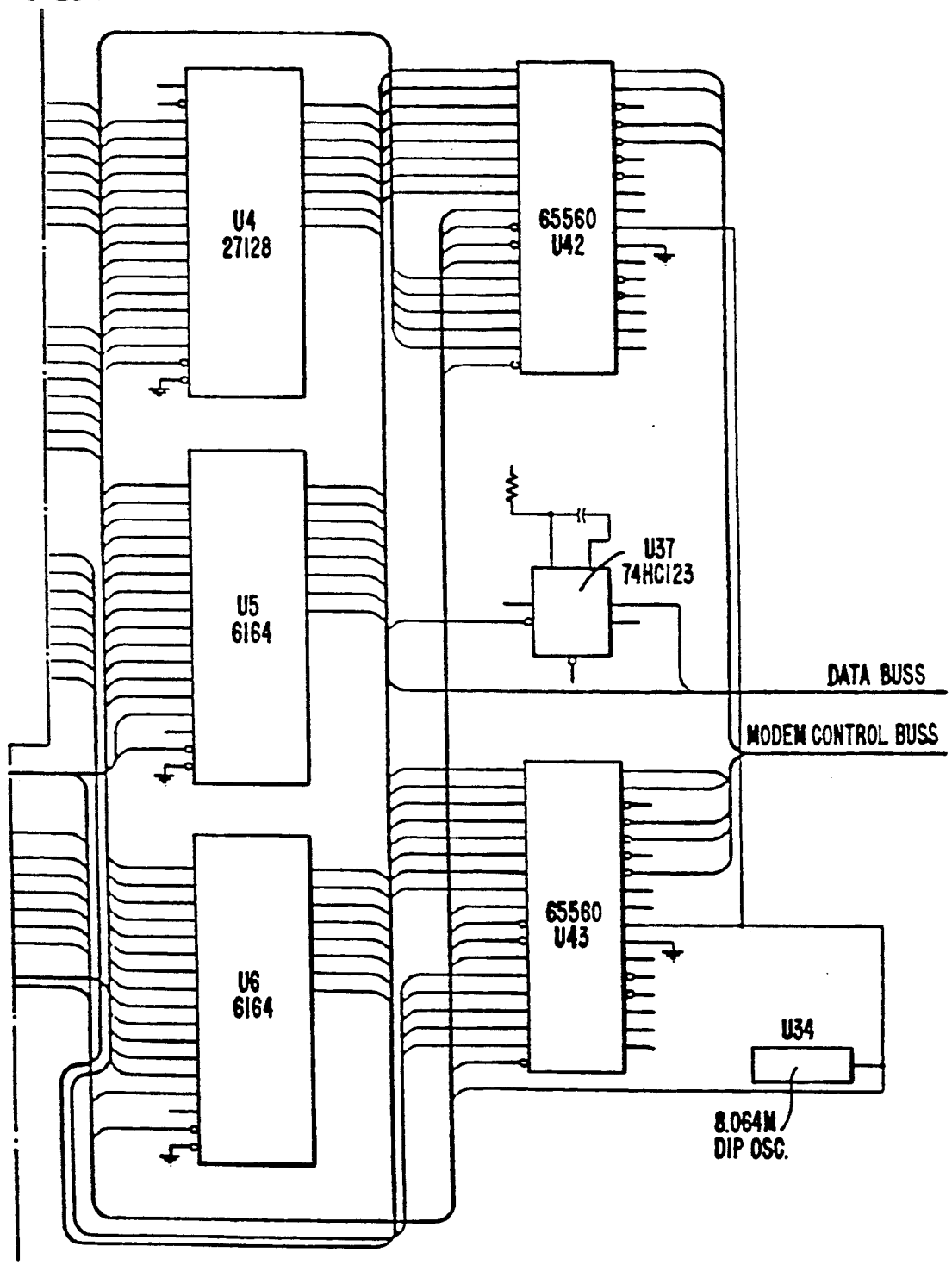
FIGS. 23A and B are a circuit schematic of the PC XT Data Channel Board of the data module processor 32 of the present invention.
Figure 24B:
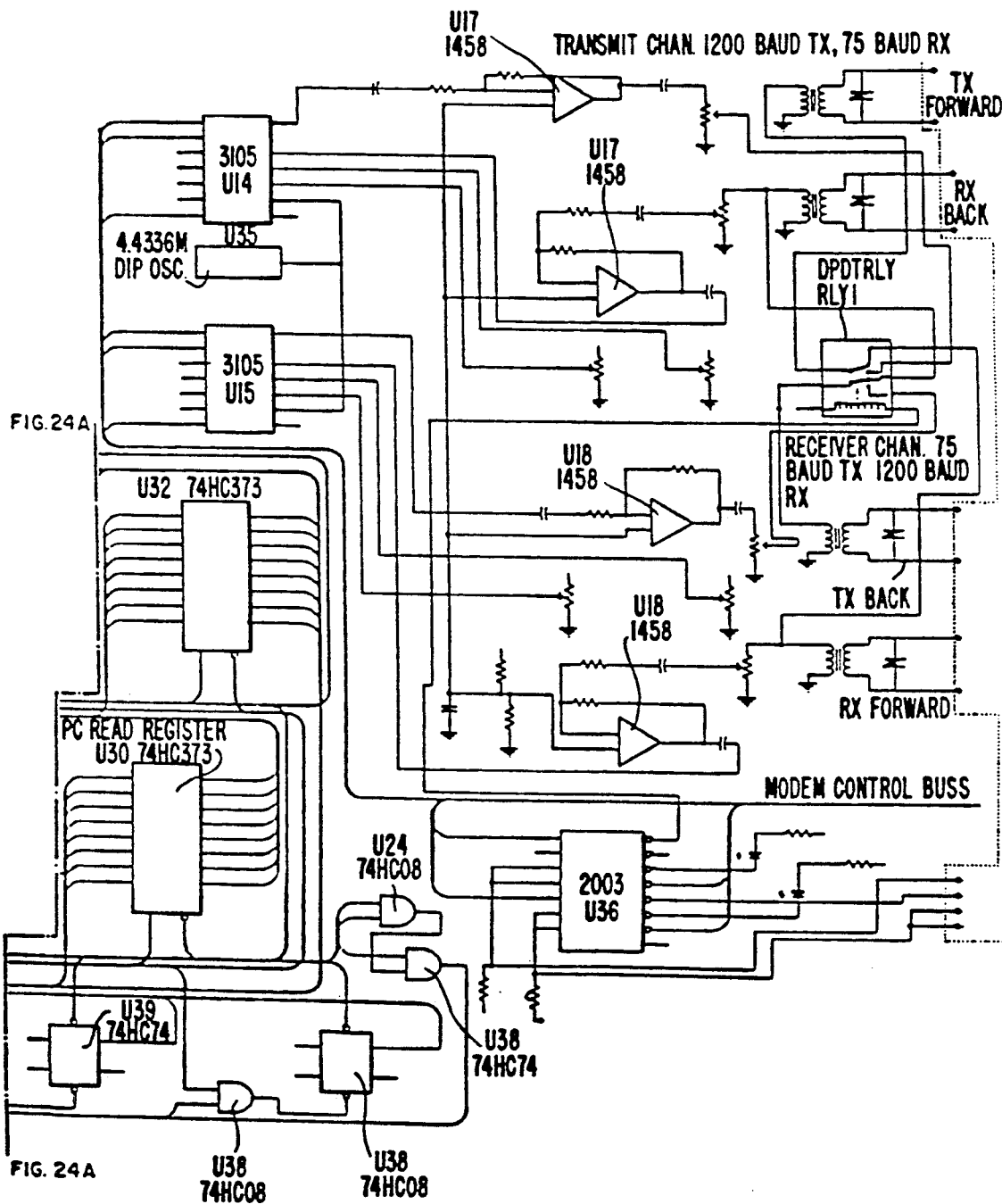

With reference to FIG. 23B, X.25, packet assembly/disassembly is accomplished by the U42, U43 (68560) processors. The 68560 processors control the 3105 modems U14-U15 (FIG. 24B). The clock is derived from U34 (FIG. 23B) and the modems receive the clock from U35 (FIG. 24B). Amplifiers U17 and U18 (FIG. 24B) provide the necessary gain and buffering to receive and send modem tones. Jumper straps select two of the four external paths for the modems.

Modem receiver bias and carrier detect levels are set via potentiometers VR5, VR6, VR7, VR8 of FIG. 24B.

5. Other Components

The keyboard and monitor 36, printer 38, floppy and hard drive disks 40, modem 42, ROM 46 and RAM 48 are of conventional construction. The ROM memory 46 is used for support of the CPU 50. The RAM 48 stores the subscriber base, which is described below with reference to FIG. 3, and the current version of the operating program for the CPU 50. The disks 40 store the stored program to permit updates to be made to the current program stored in the RAM 48. The printer 38 is used for generating the portion of the overall billing information for the network 10 which is to be allocated to the local paging service 18. The keyboard and monitor 36 permit the entry of information into the local switch 12 and the display of communications to and from the local switch 12.

6. Memory Map of Local Switch

Figure 3:
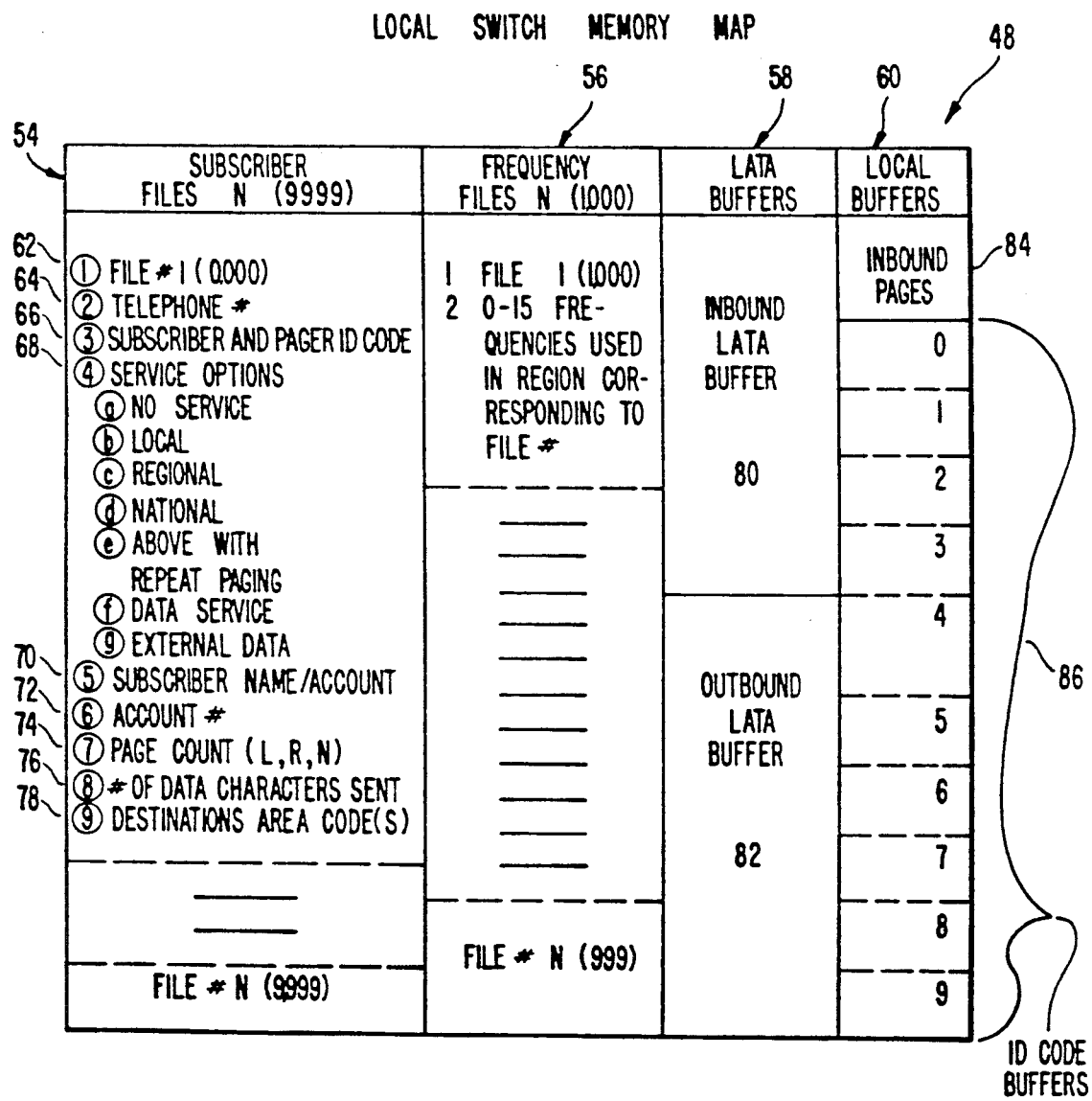
FIG. 3 is a memory map of the random access memory of a local switch.

FIG. 3 illustrates a memory map of the RAM 48. The RAM 48 has four main storage areas which ar the subscriber files 54, frequency files 56, lata buffers 58 and local buffers 60. It should be understood that in FIG. 3 a number in parenthesis illustrates a number present in a preferred embodiment of the invention, but in the more general case any variable number within the scope of the present invention is indicated by a letter.

Each local switch 12 is allocated a capacity of, for example, 10,000 subscribers which are identified by a four-digit code stored in field 62 of the subscriber files 54.

Field 64 stores the subscriber's local telephone number within the area code serviced by the lata switch 14 having jurisdiction.

Field 66 is the subscriber's paging receiver identification code which uniquely identifies the subscriber and the paging receiver of the subscriber which is to receive pages throughout the network 10. The paging receiver identification code in a preferred embodiment consists of 8 digits with the four most significant digits geographically representing the area serviced by the associated lata switch 14 (country code as the most significant digit followed sequentially by area or city code lesser significant digits) and the four least significant digits being digits assigned to identify 10,000 subscribers within the jurisdiction of the local switch. The capacity of the system 10 is 100 million subscribers with the eight digit identification code. The least significant numbers of the identification code define subscribers of a specific local switch 12 within the jurisdiction of the lata switch 14.

Field 68 stores the service options which each subscriber may choose to have provided by the local paging service 18. The service options control the commands discussed below, which are used with pages sent to the paging receivers. The main CPU 50 interrogates the particular subscriber file identified by the identification code inputted with the request for a page by telephone trunks 26 or 28, causes storage of the page, determines the destination(s) of the page and the appropriate system command to be used to transmit the page. It should be understood that the service options may be dynamically programmed through voice prompted communications over the telephone trunk lines 28 with the local switch 12 and through telephone calls to the lata switch 14 by trunk 26 as described below.

The service options are described as follows. The service option "a" is for no service which is a condition when an active subscriber does not wish to receive any pages such as may occur when the subscriber is on vacation or is otherwise desirous of not being paged for a period of time but does not wish to be removed from the subscriber base of the system. The service option "b" is for pages to be broadcast only by the transmitter 15 of the local paging service 18. The local service option has two suboptions (not illustrated) which permit the selection of numeric character transmission (A3 and C3 commands discussed below) and the selection of alphanumeric character transmission (A4 and C4 commands discussed below). The service option "c" is for regional service which is for pages to be broadcast throughout all of the local paging services 18 which are within its lata switch jurisdiction. The service option "d" is for national paging which is for pages to be broadcast from the local switch 12 to one or more lata switches 14 other than the lata switch having jurisdiction over the local switch 12. While not illustrated, an international service option may be added. The regional, national and international service options permit the selection of two suboptions (not illustrated) of numeric and alphanumeric character transmission (A5,C-5,A6,C6 commands discussed below). The service option "e" is for a repeat of pages for any of the "b", "c" or "d" service options so that a page is broadcast more than once. The service option "f" is for data service which causes the page to be stored in a specified section of memory such as sections 11-14 of the RAM (60) described in the above-referenced patent application filed on Oct. 20, 1987. It should be understood that reference to a part of a paging receiver in parenthesis refers to a part in the drawings of the above-referenced application filed on Oct. 29, 1987. The service option "g" is for external data service which commands the paging receiver to output the page to the external data port (67) of the paging receiver disclosed in the above-referenced patent application filed on Oct. 20, 1987. This option permits the paging receiver to support peripheral devices to provide a wide range of data services. Although not illustrated, the service options may further include sublocal and group paging as discussed below. Sublocal paging is discussed below with reference to FIG. 28. Group paging is paging where a specified group of paging receivers receive pages on the local level by the paging receiver being programmed to turn on when a destination code is sent as the first character of the identification code accompanying the page as described below.

The following additional fields are provided. The fifth field 70 is the subscriber's name and the subscriber's specified account number. The sixth field 72 is the subscriber's account number entry for purposes of interval billing by the local paging service 18. The seventh field 74 is the subscriber's page count (local, regional or national) which is a total of the number of pages made in a billing period. The eighth field 76 is the total number of data characters sent during the billing period.

The ninth field 78 is the destination (area code(s)) of each of the pages. For local service, there is no area code specified. For regional service, the area code of the associated lata switch 14 having jurisdiction over the local switch 12 is specified and for national and international service, one or more area codes or other geographic identification identifying lata switches 14 other than the lata switch having jurisdiction over the local switch are specified. For international service, a country code may be used to identify lata switches 14 within a particular country. Any number of area codes may be specified but in a preferred embodiment of the invention, three area codes is a maximum number of lata switches 14 which may be specified as regions to receive pages from the local switch 12.

The above-referenced description describes the first file of the n (10,000) possible subscriber files stored in the subscriber files 54. It should be understood that the other subscriber files have the same configuration. Access to the subscriber file is obtained by a voice prompted message requiring the inputting of a secret code which if inputted correctly is followed by voice prompted requests requesting specification of the information of the subscriber file to be changed.

The frequency files 56 perform an important part in the functioning of the present invention. The frequency files 56 contain n possible lata files with each individual file identifying up to, for example, 15 four-digit numbers that represent broadcast channels available within the service area of a lata switch 14. Thus, each of the individual lata switches 14 in the network 10 will have a separate frequency file which identifies all of the channels which are available to transmit pages from the transmitters 15 associated with the local paging services 18 under the jurisdiction of that lata switch 14. The channels are stored as a four-digit number in a hexadecimal numbering system which requires only four digits of space. The tables of the frequency files may be accessed from the keyboard 36 or the modem 42. A file containing all zeros (no channel) will cause an invalid area code message to be returned to a subscriber attempting to reprogram service areas. A flowchart of the usage of the frequency files 56 by the system is described with reference to FIG. 13 below. However, it should be understood that the frequency files are the source of channels which are utilized by the channel programming command discussed below to program each paging receiver for operation in each lata switch jurisdiction and the local switch jurisdiction. For example, a paging receiver which is to be serviced by only a single local paging service 18 may be programmed to receive only a single or a number of channels up to the number of channels used by that local paging service. Furthermore, for regional service or national service, the frequency files are used to program the paging receiver to receive pages from the channels used by the local paging services 18 within the designated area codes representative of the service areas serviced by the lata switches 14. Furthermore, if a paging receiver is to be programmed to receive message in a particular area serviced by a lata switch 14 as a consequence of the subscriber travelling, the channel programming command utilizes the channels stored in the file number corresponding to the jurisdiction of the lata switch in the area to which the subscriber is to travel, to dynamically program the channel(s) which the paging receiver is to receive in that area. For service in a local region, the frequency files are used as a source of channels to be used by the channel programming command to dynamically shift the channels on which the paging receiver is to receive a page, to adjust the channels used in the broadcast area used by the local paging service 18 associated with the local switch 12 based on the amount of paging traffic on each channel and to further provide a source of channels which are to be used for specialized services for transmitting particular types of information to particular subscribers such as, but not limited to stock quotations.

The lata buffers 58 consist of an inbound lata buffer 80 and an outbound lata buffer 82. The inbound lata buffer 80 functions to receive pages coded in ASCII which have been processed by the data module processor 32 to strip them of the X.25 transmission protocol used for transmitting pages from the lata switch 14 to the local switch 12 and converted from the hybrid code described below to ASCII. Pages which are initially stored in the inbound lata buffer 80 are processed by the CPU 50 for destination and are either for broadcast by the associated local paging service 18 in which case they are ultimately stored in the appropriate identification code buffer 86 which matches the least significant digit of the identification code contained with the page or in the outbound lata buffer 82 if the page is a page which has originated from one of the lata switches 14 by calling on the telephone trunk 26 and which has a final destination which is determined by the field 78 of the subscriber file 54 as described below.

The local buffers 60 are comprised of an inbound pager buffer 84 for receiving all local inbound pages which originate from the trunk line 28 which is connected to the local switch 12 and a plurality of identification code buffers 86 which are each individually assigned to store outbound pages with a particular least significant identification code digit of the number base used for the subscriber identification code which are to be transmitted to a local paging receiver. All of the received pages from the local switch 12 are initially stored in the buffer 84. Each of the individual identification code buffers 86 stores pages for broadcast by the local paging service 18 in batches which ar grouped by the least significant digit of the subscriber identification code received with the page after sorting by the CPU 50. In other words, the least significant digit of the subscriber identification code within a page for broadcast by a local paging service 18 determines in which of the identification code buffers 86 the page is stored. For example, if the last digit of the identification code of a page for broadcast by the local paging service 18 ends in the digit 0, the page is stored in the identification code buffer identified by "0".

7. CPU 50

The main functions of the CPU 50 are (1) to determine and add area destinations to each page received from the telephone trunk 28 and the lata switches 14 without any specified area destination to create a page for each area destination specified by the service option field 68 and area destination field 78 obtained by interrogation of the subscriber file matching the identification code contained in the page, (2) to add one or more system commands to each page created from interrogation of the subscriber file, (3) to process each page received from the network 10 and each page created by the interrogation of the subscriber file by area destination, (4) to store each page processed by area destination in the corresponding storage areas of the RAM 48 as discussed above, and (5) to control the outputting of the stored pages from the RAM 48 for further processing by the data module processor 32 or the data output 34.

Each of the pages created by the CPU 50 has four fields which are (1) the paging receiver identification code, (2) an area destination in the network and if the page is for transmission by only the local paging service 18 the area destination field is left blank, (3) one or more system commands specifying the function(s) to be performed by the paging receiver receiving the page and (4) the text of the page. These fields are discussed below with reference to FIG. 31.

The CPU 50 is programmed to output the groups of pages which are stored in the buffers 82 and 86 whenever either one of two conditions occur which are (1) the buffers are approaching a percentage of their maximum storage capacity measured in characters which should not be exceeded to avoid overflow of the buffers, or (2) pages have not been outputted within an immediately past time interval of a predetermined length. Overflow causes the issuance of a busy tone to a caller wishing to place a page or after a predetermined time interval such as 15 minutes has elapsed, whichever comes first, to avoid a long delay between the calling in of a page and its actual transmission. The maximum percentage of the overall storage capacity of the buffers 82 and 86 which may be utilized before requiring transmission to avoid overflow is programmable from the keyboard 36. Furthermore, the size of the buffers 80, 82, 84 and 86 is programmable from the keyboard 36.

B. Lata Switch 14

1. Architecture

Figure 4:
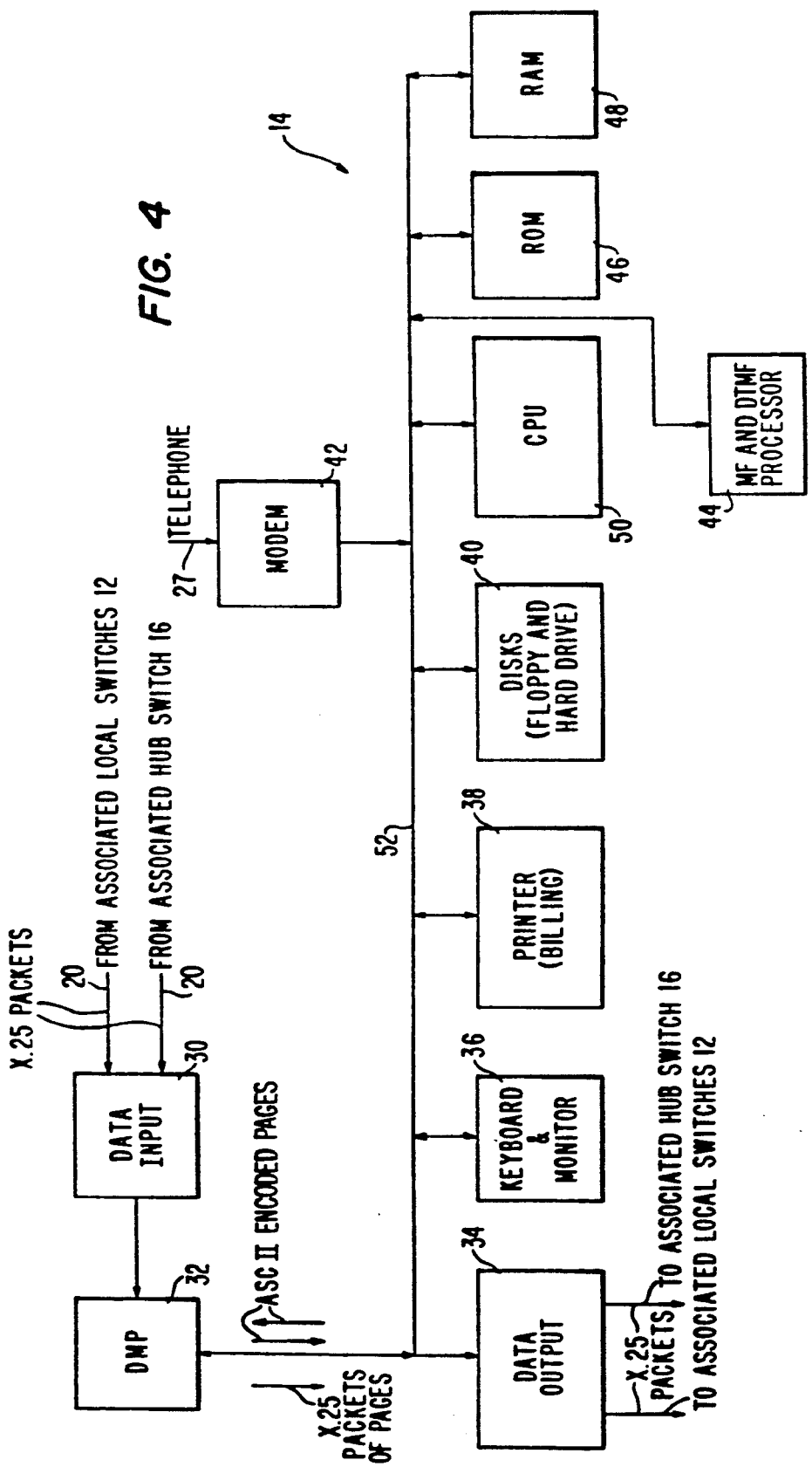
FIG. 4 is a block diagram of a lata switch in accordance with the present invention.

FIG. 4 illustrates a functional block diagram of a lata switch 14. It should be understood that the block diagram of the lata switch 14 is similar to the block diagram of the lata switch 12 described above with reference to FIG. 2. Identical parts in FIGS. 2 and 4 are identified by like reference numerals and are not discussed herein except to the extent necessary to point out the differences. Furthermore, it should be understood that the circuits discussed above with reference to FIGS. 14(A&B)-25(A&B) are utilized for implementing the lata switch 14 with the pages being received and transmitted by the data input 30 and data output 34 being different and further with the operating program for the CPU 50 being different to produce the correct functioning of the circuitry of FIGS. 14(A&B)-25-(A&B) as a lata switch 14 with the changes being implemented by inputs from keyboard 36. The data input 30 has two high speed X.25 protocol ports for respectively receiving packets from each of the local switches 12 associated with the lata switch 14 and packets from an associated hub switch 16. However it should be understood that the number of ports may vary without departing from the invention. Furthermore, the data input 30 does not function to disassemble low speed manual and automatic telephone entered communications as is the case with the data input 30 of the local switch 12 in view of the fact that all communications received by the data input 30 are in the X.25 transmission protocol. The data input transmits both X.25 port inputs directly to the data module processor 32. The data module processor 32 strips the X.25 protocol from the received packets of pages from the local switches 12 over which it has jurisdiction and from the hub switch 16 having jurisdiction over it and converts the hybrid code described below which is preferably utilized with the X.25 transmission formatted packets of pages into ASCII and transmits the ASCII coded pages to the hub buffer 100 and local inbound pager buffer 102. Pages, which are periodically outputted from the outbound pages buffers 98 and 104, are processed by the data module processor 32 to convert them from ASCII to the hybrid code discussed below and are formatted into the X.25 transmission protocol as discussed below with reference to FIG. 31. The printer 38 functions to generate billing information for pages which are distributed to the local switches 12 which are within the jurisdiction of the lata switch 14. The CPU 50 controls the periodic outputting of pages stored in the RAM 48 from the outbound hub buffer 98 and outbound local buffers 104 to the data module processor 32 for code conversion, protocol formatting and transmission to the associated hub switch 16 or the associated local switches 12 via the data output 34 as discussed below when the buffers are storing at least a predetermined percentage (e.g. 70%) of their capacity to avoid loss of pages from overflow or if a transmission of packets from each buffer has not occurred within a predetermined time in a manner analogous to buffers 82 and 86, discussed above. The predetermined percentage and the capacity of the buffers 98, 100, 102 and 104 is programmable by the keyboard 36.

2. Memory Map

Figure 5:
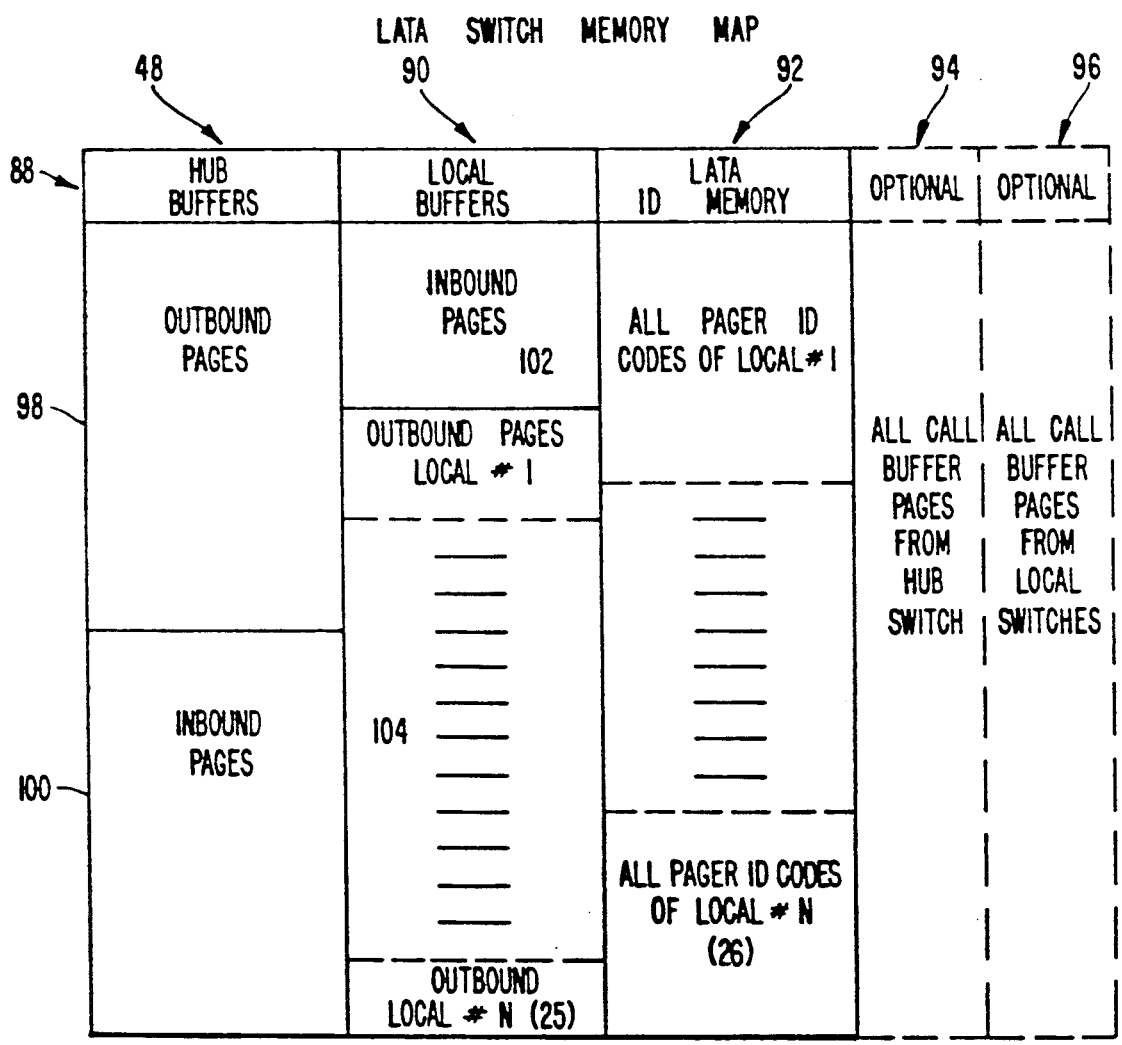
FIG. 5 is a memory map of the random access memory of a lata switch.

FIG. 5 is a memory map of the random access memory 48 of the lata switch 14. The RAM 48 has three main areas and two optional areas. The three main areas are hub buffers 88, local buffers 90 and a lata identification code (ID) memory 92. The optional memory areas are an all call buffer 94 for storing nationwide pages received from the hub switch 16 which are to be transmitted to all of the local switches 12 under the jurisdiction of the lata switch 14 and an all call buffer 96 which stores pages received from one of the local switches which are to be transmitted to all of the local switches 12 under the jurisdiction of the lata switch 14.

The hub buffers 88 are an outbound hub buffer 98 and an inbound hub buffer 100. The outbound hub buffer stores pages to be periodically transmitted to the hub switch 16 having jurisdiction over the lata switch under the control of the CPU 50. The inbound hub buffer 100 stores pages which are periodically received from the associated hub switch 16 via storage in a buffer of the data module processor 32.

The local buffers 90 are comprised of an inbound local buffer 102 which stores groups of inbound pages received from the local switches 12 and a plurality of outbound local buffers 104 each of which store groups of pages which are to be transmitted periodically to a specific one of the local switches with a separate outbound local buffer being provided for each of the local switches under the jurisdiction of the lata switch 14. The CPU 50 processes each of the pages which is received in the inbound buffers 100 and 102 by destination and causes storage in the outbound buffers 98 and 104 which is associated with the destination of the page.

The lata identification code memory 92 stores the subscriber identification numbers of all of the subscribers which are associated with each of the local switches 12 within its jurisdiction. The lata identification code memory 92 is used for determining the local switch which stores a subscriber file of the subscriber used for pages which are inputted to the system from a direct call by telephone trunk 26 to a lata switch 14 or from a direct call by telephone trunk 26 to a lata switch by a subscriber to program the reception area of pages by changing the destination 78 of the pages. The lata identification code memory 92 may be organized by subscriber identification codes which are within the jurisdiction of each local switch 12 so that the matching of an identification code of a page inputted to the lata switch 14 in the lata identification code memory 92 provides the location of the particular local switch which stores the subscriber file 54 of that subscriber.

In order to avoid having to provide additional storage space in each of the outbound local buffers 104, the optional all call buffer 94 may be provided to store a single page, received from the hub switch 16 having jurisdiction over the lata switch 14, which is to be transmitted to each of the local switches 12. Similarly, the optional all call buffer 96 may be provided for receiving pages from an individual local switch 12 which are to be transmitted to all of the local switches 12 within the jurisdiction of the lata switch 14.

The CPU 50 controls the telephone trunk 26 between the lata switch 14 and the caller requesting a numerical or alphanumerical character page over the telephone trunk with voice prompted messages by placing a direct phone call to the lata switch. For pages or requests to reprogram the subscriber file 54 which are made to a lata switch 14 over telephone trunk 26 which require access to a subscriber file outside the jurisdiction of the lata switch, the CPU 50 makes a page contained in a packet having an area destination identified by the four most significant digits of the identification code inputted to the lata switch 14 preceded by the identification code of the paging receiver to receive the page, preceded by the geographical area identification of the lata switch receiving the call to originate a page or to program the subscriber file which is transmitted by the network 10 to the specified area destination. For pages to be billed to subscribers stored in the subscriber file 54 of a local switch 12 within the jurisdiction of the lata switch 14 or requests to program the subscriber file 54, the CPU 50 makes a packet having an area destination of the local switch 12 within its jurisdiction which stores the subscriber identification code as determined by interrogation of the lata identification code buffer 92 by the CPU. The ultimate destination of a page is determined by the destination field 78 of the subscriber file 54 matching the identification code of the paging receiver either within or outside the jurisdiction of the lata switch that is called in over telephone trunk 26. The local switch 12 containing the subscriber file 54 creates the one or more pages in accordance with the information in the subscriber file including the adding of destination(s) and the appropriate command. Transmission of the pages created by the local switch 12 in response to a call to a lata switch 14 is identical to the transmission of pages originating at the local switch 12 by the placing of a telephone call on telephone trunk 28. In the case of requesting programming of the subscriber's file 54, the caller must in response to a voice prompted message enter a four-digit secret identification code to obtain access to the subscriber file with voice prompted messages being supplied under the control of the CPU 50 to control the input of programming information from the subscriber. To request a page by calling the lata switch 14, the caller will receive a voice prompted message to enter the subscriber identification code and then the appropriate numeric or alphanumeric character page.

C. Hub Switch 16

1. Architecture

Figure 6:
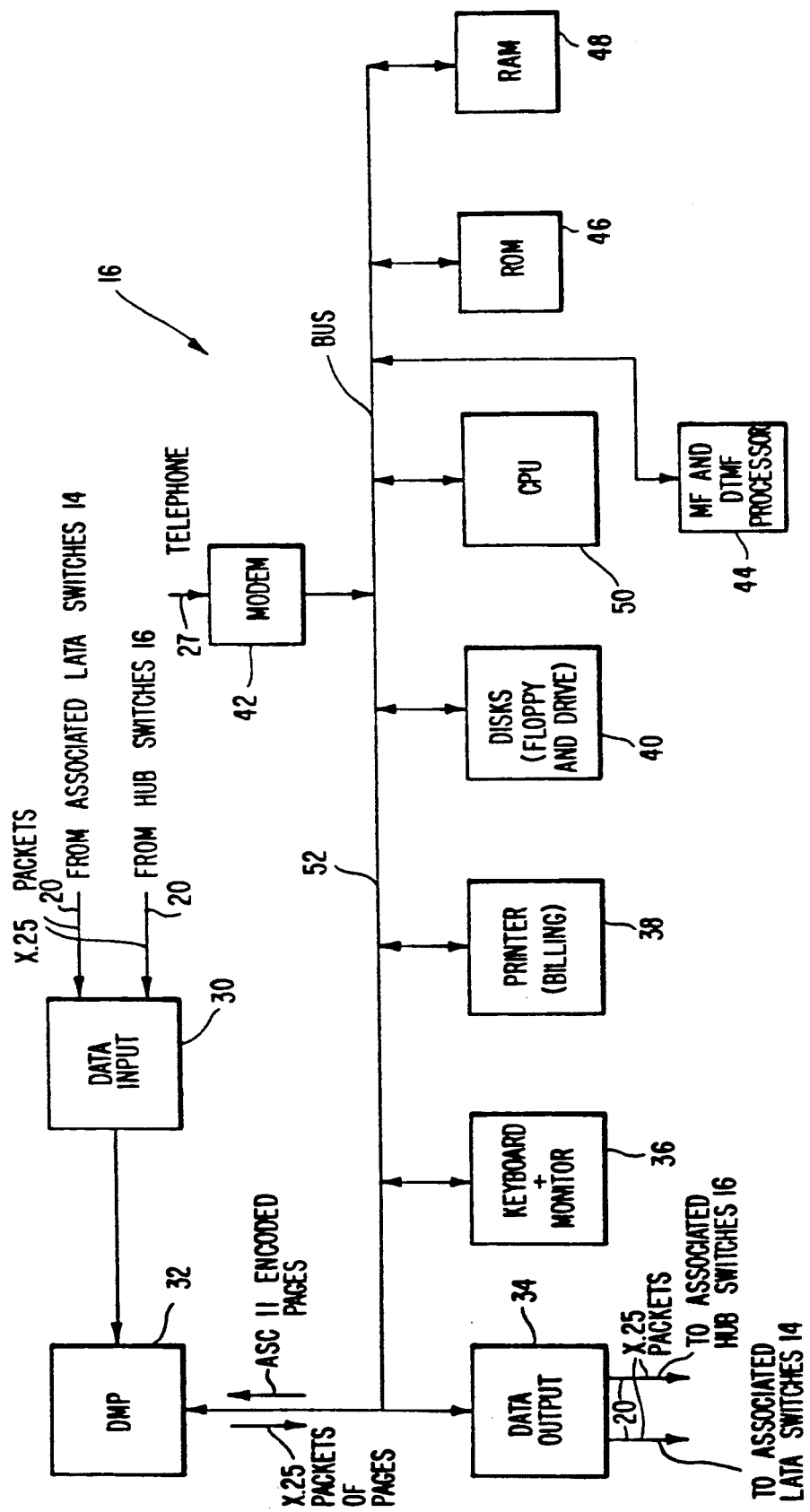
FIG. 6 is a block diagram of a hub switch in accordance with the present invention.

FIG. 6 is a functional block diagram of the hub switch 16. It should be understood that the block diagram of the hub switch 16 is similar to the block diagram of the local and lata switches described with reference to FIGS. 2 and 4. Like parts in FIGS. 2, 4 and 6 are identified by like reference numerals and further only those differences between the subject matter of FIG. 2 and FIG. 6 are discussed which are necessary for understanding the operation of the hub switch 16. Furthermore, it should be understood that the programming for controlling each of the processors including the central processing unit 50 is provided with variations in the programming being implemented by inputs from the keyboard 36 to cause the program to control a hub switch 16. The circuits for implementing the data input 30, data module processor 32, data output 34 and MF and DTMF processor 44 are illustrated in FIGS. 14(A&B)-25(A&B) discussed above. The data input 30 receives X.25 encoded packets on input ports respectively from associated lata switches 14 and from hub switches 16 which are forwarded to the data module processor 32 for processing. The data module processor 32 functions to strip the X.25 transmission protocol and convert the character in the hybrid code described below into ASCII coded pages. Pages received from lata switches 14 within the jurisdiction of the hub switch 16 are addressed by the data module processor 32 for storage in a corresponding inbound lata buffer 118 described below with respect to FIG. 7. Similarly, pages received from other hub switches 16 are addressed by the data module processor 32 for storage in the corresponding inbound hub buffer 114 described below with respect to FIG. 7. The CPU 50 processes each page stored in the inbound buffers 114 or 118 to determine its destination and causes its storage in the outbound buffers 116 and 120 which correspond to the destination of the page. The CPU 50 periodically outputs the stored pages from the outbound buffers 116 and 120 when either the pages stored in the buffers 114 and 118 reaches a predetermined percentage of their maximum capacity to avoid an overflow of pages which could cause a loss of pages or when a transmission of pages from each of the buffers 116 and 120 has not occurred during a predetermined time interval. The predetermined percentage and the size of the buffers 114, 116, 118 and 120 is programmable by input from the keyboard 36. The data module processor 32 also functions to convert the pages from ASCII code to the hybrid code and formats the page into the X.25 transmission protocol described below with reference to FIG. 7, which are periodically outputted from the outbound hub buffers 116 and the outbound lata buffers 120 of RAM 48 described below with reference to FIG. 7. The data output 34 outputs the packets of pages received from the data module processor 32 to the appropriate output port(s) depending upon the destination of the packets of pages. The printer 38 functions to produce a record for billing of subscribers for pages transmitted through the hub switch 16.

Figure 7:
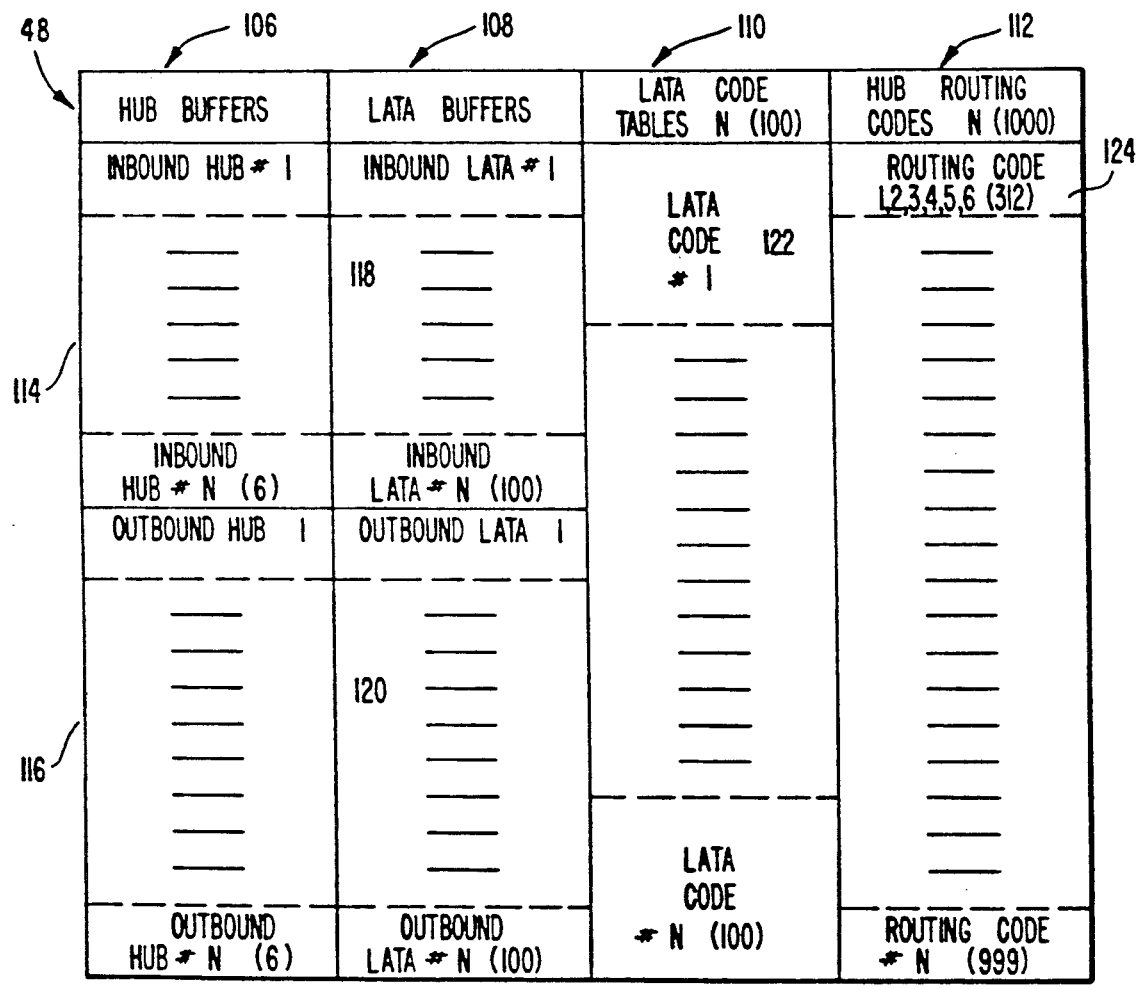
FIG. 7 is a memory map of the random access memory of a hub switch.

2. Memory Man,

FIG. 7 is a memory map of the RAM 48 of the hub switch 16. The hub switch memory map is comprised of four main parts which are hub buffers 106, lata buffers 108, lata code tables 110 and hub routing codes 112. The hub buffers 106 are comprised of a plurality of inbound hub buffers 114 which correspond in number to the number of other hub switches 16 in the network 10 which have direct connection to the hub switch and a corresponding number of outbound hub buffers 116. The individual inbound hub buffers 114 each store pages received from one of the hub switches 16 with pages received from each adjacent hub switch 16 being stored in only a single one of the inbound hub buffers 114. Similarly, pages which are to be transmitted to another hub switch 16 are stored in the outbound hub buffer 116 which is associated with the destination hub switch to which they are being transmitted with all pages which are to be routed to a single hub switch being stored in a corresponding one of the outbound hub buffers 116 with a separate hub buffer being associated with each hub switch to which pages are directly transmitted. The lata buffers 108 are comprised of a plurality of inbound lata buffers 118 which correspond to the number of lata switches 14 under the jurisdiction of the hub switch 16. The inbound lata buffers 118 store all of the pages received from the lata switches 14 under the jurisdiction of the hub switch 16. The outbound lata buffers 120 correspond in number to the lata switches 14 under the jurisdiction of the hub switch 16 with a separate lata buffer being associated with each of the lata switches. The outbound lata buffers 120 store groups of pages to be periodically transmitted to their associated lata switch 14. Pages which are stored in the inbound hub buffers 114 are processed by destination by the CPU 50 and stored in either the outbound hub buffer 116, which is the destination of the pages if the pages are not to be received by a lata switch 14 under the jurisdiction of the hub switch 16, or in one or more of the outbound lata buffers 120 if the destination of the packets of pages received from another hub switch 16 is a lata switch under the jurisdiction of the hub switch 16. The CPU 50 also processes the pages stored in the inbound lata buffers 118 according to their destination and causes their storage in either the outbound hub buffers 116 if the pages are to be sent to a lata switch 14 outside of the jurisdiction of the hub switch 16 or to one or more of the outbound lata switches 120 if the pages are to be received by one or more lata switches 14 under the jurisdiction of the hub switch 16.

The lata code tables 110 store each of the lata (telephone area or other geographic identifier) codes 122 under the jurisdiction of the hub switch 16 which are utilized by the comparison performed by the CPU 50 with the pages stored in the inbound hub buffers 114 and inbound lata buffers 118 to determine in which of the outbound hub buffers 116 or outbound lata buffers 120 the pages should be stored. Each separate lata code 122 corresponds to the geographical identification of the lata switch 14 which in the preferred embodiment is the telephone area code of a lata switch's jurisdiction.

The routing codes 112 determine the transmission routes to other hub switches on a priority basis to which a packet of pages should be sent which are not intended for a lata switch 14 within the jurisdiction of the hub switch 16. It should be understood that a number of factors may be considered in choosing the priority of a route to be used to transmit a page from one hub switch 16 to another hub switch. It would appear on first analysis that a direct first hub switch to second hub switch route would be best but often the switching overhead of routing a packet through one or more intermediate switches is more than compensated for by the efficiency of a route having one or more intermediate hub switches by adding additional pages which are inputted to the one or more intermediate hub switch(es) to the packets of pages being transmitted to the second hub switch. The CPU 50 compares the destination of the groups of pages stored in the inbound hub buffers 114 and the inbound lata buffers 118 to determine if these pages should be routed to another hub switch 16. The hub routing codes 112 are referred to by default when a match is not found by the CPU 50 in comparing the destination of the pages stored in the inbound hub buffers 114 and inbound lata buffers 118 with the codes stored in the lata code tables 110. Each page stored in the inbound hub buffer 114 and inbound lata buffers 118 is processed by destination by the CPU 50 and caused to be stored in the outbound buffers 116 and 120 which correspond to its destination. Each individual hub routing code contains the hub switch destination priorities for pages to be sent to a single lata switch 14 outside the jurisdiction of the hub switch 16. For example, for the lata switch 14 having jurisdiction over area code 312, the hub routing code 134 determines the priorities in descending order from the highest priority to the lowest priority such that the highest priority hub would be #1 followed by #2-#6.

VI. Local Switch Operation

Figure 8:
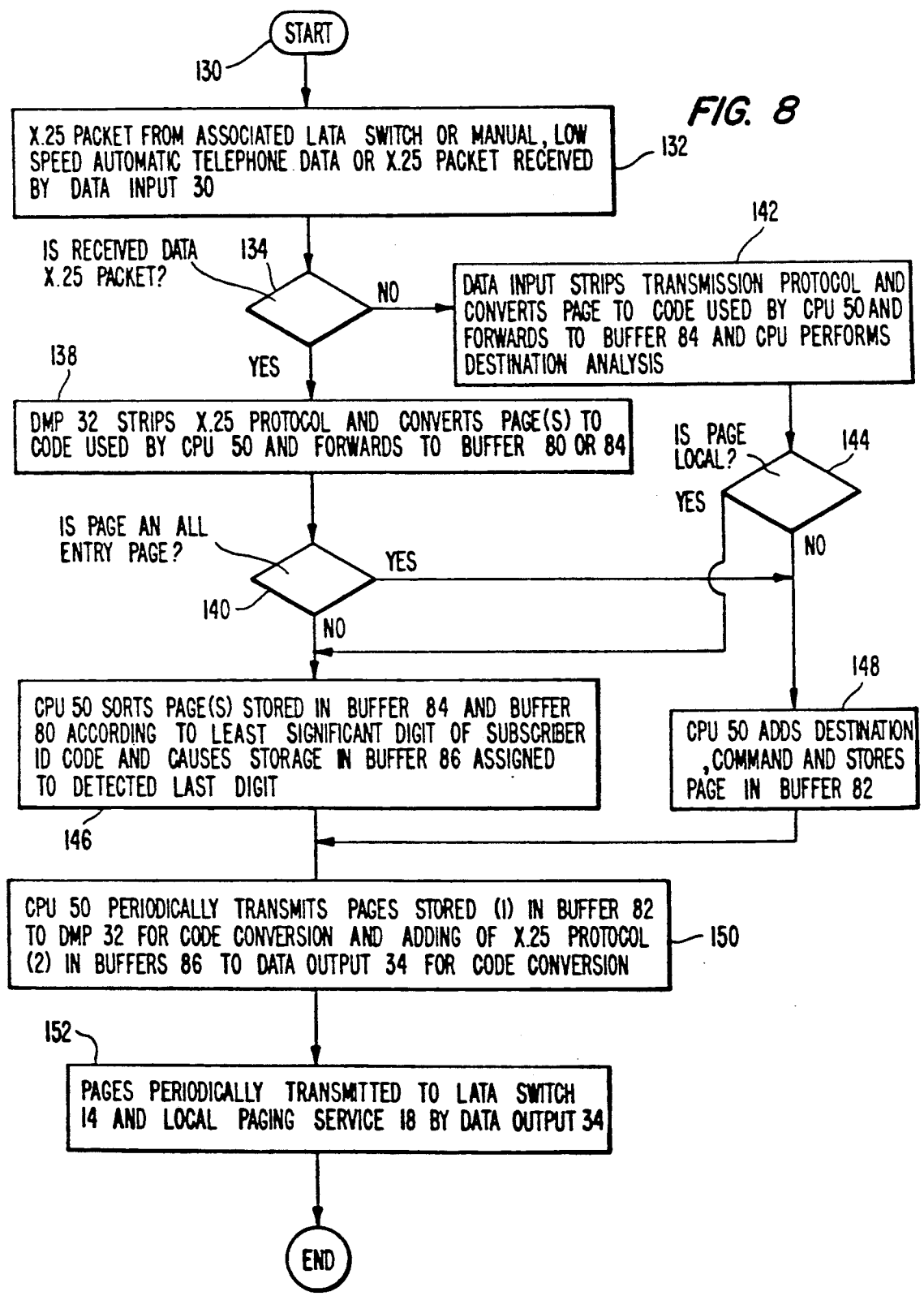
FIG. 8 is a flowchart of the operation of a local switch of the present invention.

FIG. 8 is a flowchart of the operation of the local switch 12 in processing pages received from either a local telephone input by telephone trunk 28 or from the associated lata switch 14 over communication link 20. The processing starts at point 130 and proceeds to point 132 where a packet of pages formatted in the X.25 transmission protocol received from an associated lata switch 14 over transmission link 20 or manual DTMF tone numeric coded characters, manual DTMF alphanumeric encoded characters, low speed automatic telephone DTMF coded alphanumeric characters or alphanumeric coded characters formatted in X.25 transmission protocol from a high speed data device over telephone trunk 28 is received by data input 30. The data input decodes the pages which are received from the telephone port 28 to determine which of the four possible types of inputs the page is. The decoding is performed by detecting if any of the particular command headers discussed above is included within the page. The header or absence thereof within each page controls the processing rate by the microprocessor of the data input 30 as described below. The data input 30 determines if the received data is encoded in a high speed X.25 protocol or in the protocol used for manual or low speed automatic telephone entry as indicated by decision point 134. Data inputs which are not in X.25 transmission protocol ar stripped of any transmission protocol by the data input 30, converted from the code used for transmission to the data input 30 to ASCII and forwarded to the inbound pages buffer 84 as indicated at point 142. If the received packet of pages is determined to be an X.25 protocol, the packet of pages is forwarded to the data module processor 32 where the X.25 encoding protocol is stripped and the pages are converted into ASCII code from the code used for transmission which preferably is the hybrid code described below. The data module processor 32 further places a data buffer address on the disassembled pages and causes them to be forwarded to the inbound lata buffer 80 or to the inbound pages buffer 84 if they were received in X.25 protocol over the telephone trunk 28 as indicated at point 138. The CPU 50 processes the pages stored in the inbound lata buffer 80 by destination to determine if the page is to be placed in the identification code buffers 86 or is an "all entry" page originating from another lata switch 14 by a telephone call over telephone trunk 26 requiring processing by the CPU 50 to determine its final destination by lookup in the subscriber file 54 storing the identification code contained with the page to determine the destination lata switch(es) 14. The CPU 50 performs destination analysis of the pages by matching the page identification code contained within the page with the corresponding subscriber identification code contained in the subscriber file 54 and interrogation of the destination field 78 to determine if the page is to be broadcast to the local paging service 18 or is to be sent back to the network via the lata switch 14 having jurisdiction over it for transmission to the destination specified by field 78. The destination analysis processing by the data input 30 is indicated at point 142 and the determination of whether the page is local or not is indicated at decision point 144. If it is determined that the page is intended for purely local broadcast at decision point 144, processing proceeds to point 146 where all pages received from the lata switch 14 which are determined to not be pages made by local telephone call on telephone trunk 26 to a lata switch 14 and further all pages telephoned to the input 30 by telephone trunk 28 which are determined to be broadcast by the local paging service 18 are processed by the CPU 50 by processing the contents of the inbound lata buffer 80 and the local inbound pages local buffer 84. The CPU 50 determines the least significant digit of the paging receiver identification code contained in the page and causes storage in the buffer of the identification code buffers 86 which is assigned to store pages which are determined to have a least significant digit which agrees with the determined least significant digit. If the pages originating by telephone call to the data input 30 are determined to not be for local destination at decision point 144, processing by the CPU 50 occurs at point 148 where the CPU adds the destination area code specified in field 78 of the subscriber file 54, adds the command to the page which is utilized for its transmission by the system 10 by interrogation of the service options 68 and causes storage in the outbound lata buffer 82. At point 150, the CPU periodically transmits pages (1) stored in the outbound lata buffer 82 to the data module processor 32 for conversion of the characters from ASCII code to another code, which preferably is the hybrid code described below, and the addition of the X.25 transmission protocol and transmission to the data output 34, and (2) stored in buffers 86 to the data output for code conversion from ASCII to another code which preferably is the hybrid code discussed below. At point 152, the data output 34 transmits the X.25 transmission formatted packets of pages to the lata switch 14 by the transmission link 20 and transmits batches of the pages encoded in hybrid code, without the X.25 transmission protocol, to the local paging service 18 by the communications link 22 for transmission by transmitter 15.

VII. Lata Switch Operation

Figure 9:
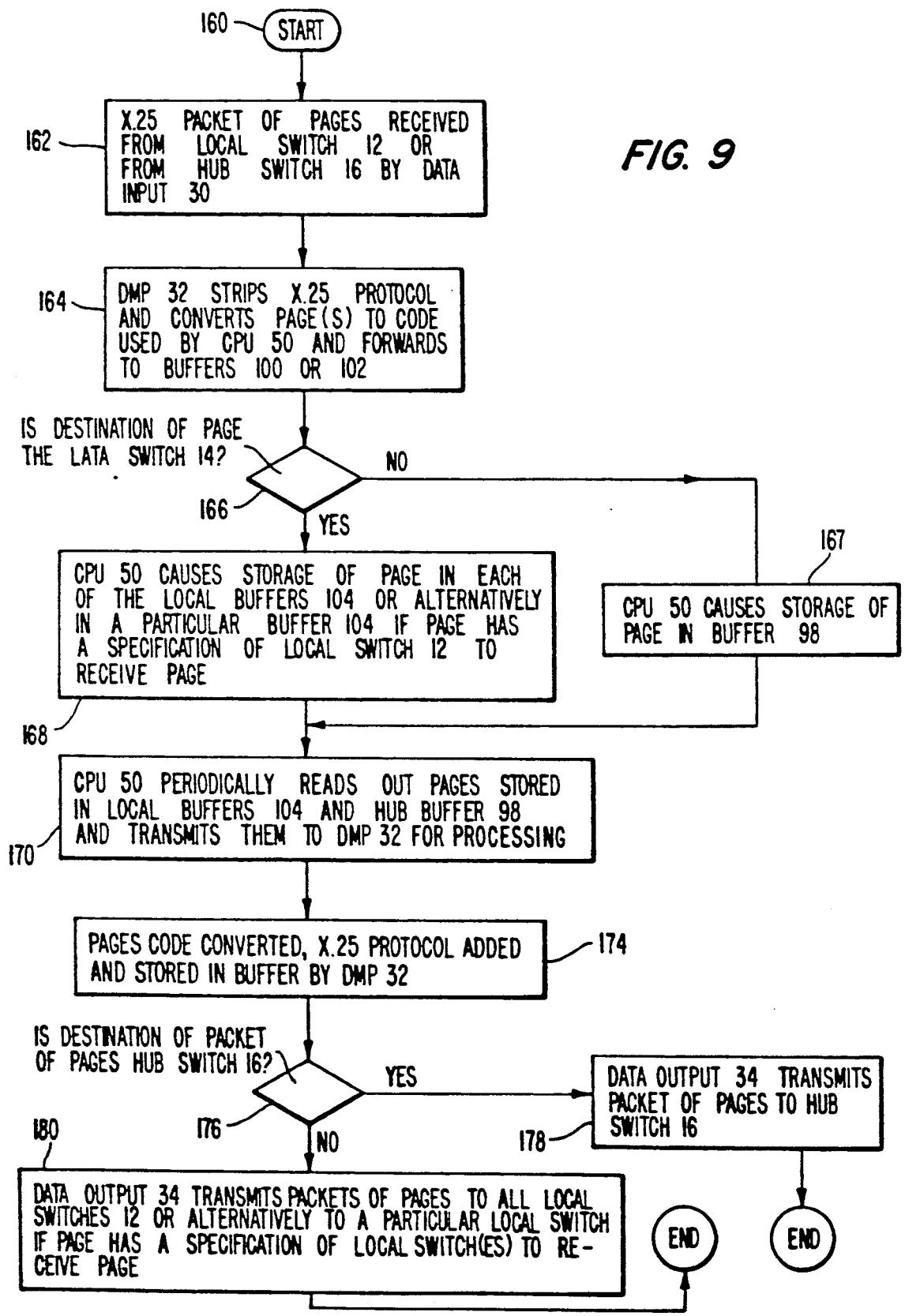
FIG. 9 is a flowchart of the operation of a lata switch of the present invention.

FIG. 9 is a flowchart illustrating the processing of pages by the lata switch 14. Processing proceeds from starting point 160 to point 162 where the data input 30 of the lata switch 14 receives X.25 transmission formatted packets of pages from either an associated local switch 12 in its jurisdiction or from the hub switch 16 having jurisdiction over it. The received packets of pages are forwarded to the data module processor 32 which strips the X.25 transmission protocol and converts the characters of the pages from the code used for transmission, which preferably is the hybrid code discussed below, to ASCII code used by the central processing unit 50 and applies suitable addressing to forward the packets of pages to either the inbound hub buffer 100 for storing pages received from the hub switch 16 or to the inbound local buffer 102 for storing pages received from local switches 12. The functioning of the data module processor 32 is illustrated at point 164. The CPU 50 determines if the packets of pages stored in the buffers 100 and 102 are destined for the lata switch 14 as illustrated at decision point 166. If none of the pages are destined for the lata switch 14, each page is caused by the CPU 50 to be stored in the outbound hub buffer 98 for subsequent transmission to the associated hub switch 16 as indicated at point 167. If, on the other hand, pages in either the buffers 100 or 102 are determined to be destined for transmission to a local switch 12, the CPU 50 causes the storage of each page in each of the local outbound buffers 104 as indicated at point 168. It should be understood that the switch 14 to be to all of the local switches under its jurisdiction could alternatively be determined to be a particular single local switch in which case the page would be stored in a single one of the outbound local buffers 102 which is associated with the destination local switch 12. The only disadvantage of this procedure is that it requires further intelligence to be specified in the destination stored in the destination field 78 for all pages which are to be transmitted from a single local switch 12 to another local switch. The CPU 50 periodically reads out the pages stored in the local buffers 104 and hub buffer 98 and transmits them to the data module processor 32 for processing as indicated at point 170. The data module processor 32 receives the pages outputted from the outbound hub buffer 98 and the local outbound buffers 102, converts them from ASCII to the code to be used to encode characters for transmission, which preferably is the hybrid code discussed below, and adds the X.25 transmission protocol as indicated at point 174. A determination is made by the data module processor 32 of the destination of the packet of pages as indicated at decision point 176. If the destination of the packets of pages received by the data output 34 is the associated hub switch 16, the packets are transmitted to the hub switch by communication link 20 as indicated at point 178 where processing of pages destined for the hub switch is complete. If, on the other hand, the destination of the packets of pages is determined to be to the local switches 12 within the jurisdiction of the lata switch 14, the data output 34 forwards the pages to each of the associated local switches 12 under the jurisdiction of the lata switch 14 by communication links 20. Alternatively, as discussed above with respect to point 168, if a single or a group of local switches 12 less than the total number of switches under the jurisdiction of the lata switch 14 has been specified as the destination of the page, the data output 34 transmits the packet of pages to the single or plurality of local switches 12 which are specified as a destination. The functioning of the page output 34 in transmitting a packet of pages to the local switches is indicated at point 180.

VIII. Hub Switch Ooeration

Figure 10:
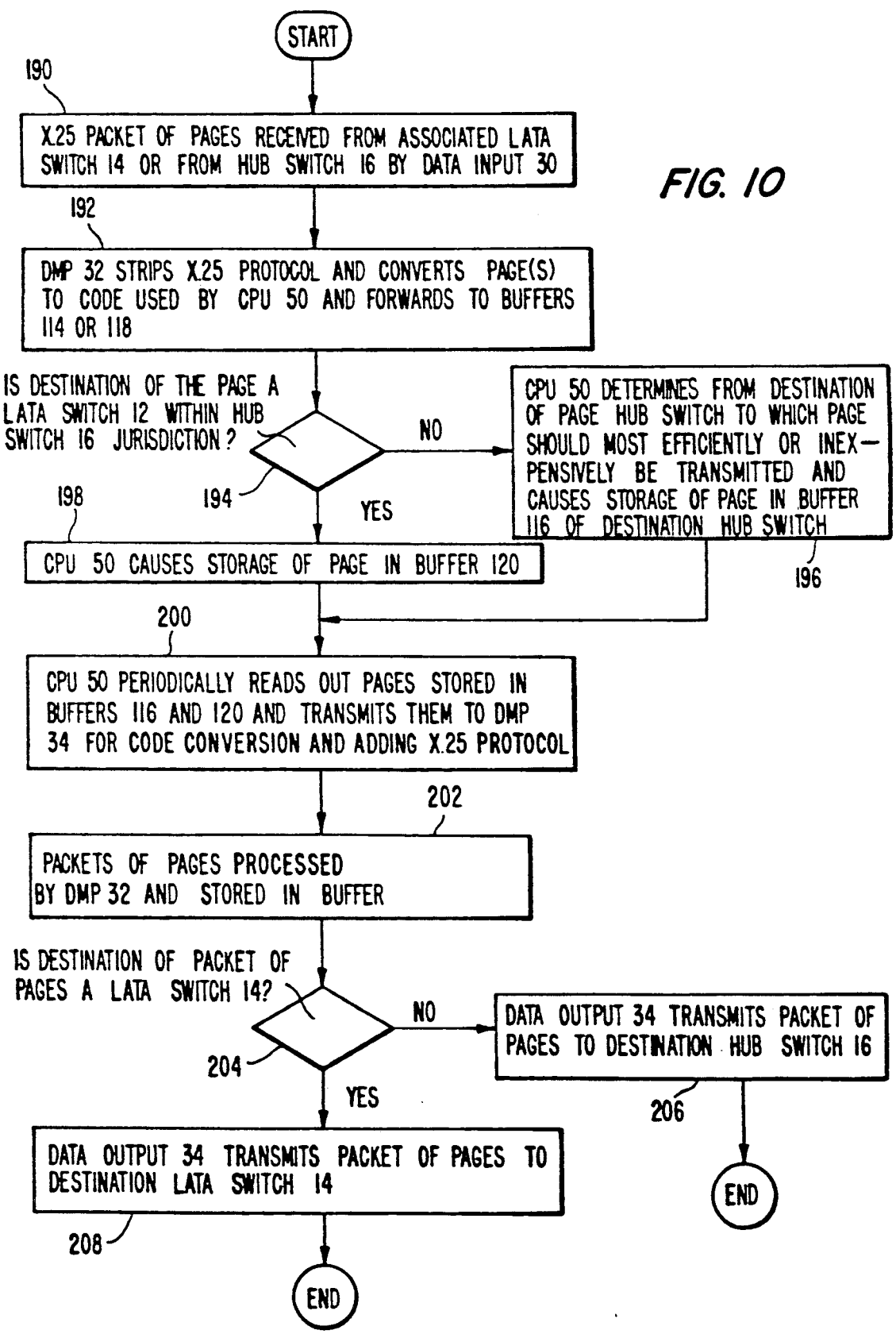
FIG. 10 is a flowchart of the operation of a hub switch of the present invention.

FIG. 10 illustrates a flowchart of the processing of packets of pages received by the hub switch 16. The processing proceeds to point 190 where the data input 30 receives packets of pages from either of the ports connected to the associated lata switches 14 or from the ports connected to the associated hub switches 16 as indicated at point 190. The packets are forwarded from the data input 30 to the data module processor 32 which strips off the X.25 protocol and converts the received pages from the hybrid code described below to ASCII code used by the CPU 50. The data module processor 32 attaches a address to the packets of pages which are respectively received from the ports from the associated lata switches 14 and from the ports from the associated hub switches 16 which is used to address respectively the inbound lata buffers 118 and the inbound hub buffers 114 as indicated at point 192. As indicated at decision point 194, the CPU 50 determines whether or not the pages stored respectively in the inbound lata buffers 118 and the inbound hub buffers 114 are destined for a lata switch within the jurisdiction of the hub switch 16. If the pages stored in the aforementioned inbound lata buffers 118 and the inbound hub buffers 114 are not destined for a lata switch 14, the CPU 50 causes the pages to be stored in the outbound hub buffer 116 associated with the destination hub switch as indicated at point 196. The aforementioned destinations are determined by the CPU 50 utilizing the hub routing codes 112 by comparing the destination of each page with the hub routing code to determine which hub switch 16 to which the page should be sent. It should be noted that each hub routing code 124 contains the priority of the hub switches 16 and the transmission paths by which pages destined for the destination lata switch 14 are to be transmitted. Thus, as illustrated with reference to FIG. 7, if the destination code of the lata switch 14 is area code 312, the first priority hub switch is number 1 with descending priorities being switches 2, 3, 4, 5 and 6. If hub switch number 16 is busy or malfunctioning as determined by the placing of a call to that hub switch by the data output 34, the CPU 50 utilizes the routing code for area code 312 to determine the next highest available priority hub switch 16 and transmission path by which the page should be sent. In this manner, alternative paths which are less efficient or more expensive are substituted for the most efficient or least expensive transmission route to another hub switch 16 to maintain overall system functionality in the event of one or more switches or components failing. If the destination of the page is determined to be a lata switch 14 under the jurisdiction of the hub switch 16 as a consequence of matching the destination with one of the lata codes contained in the lata code table 110, the CPU 50 causes the storage of the page in the outbound lata buffer 120 to which it is destined as indicated by point 198. The CPU 50 periodically reads out the pages stored in the outbound hub buffers 116 and the outbound lata buffers 120. The CPU 50 places an address on pages being read out respectively from the outbound hub buffers 116 and outbound lata buffers 120 which causes them to be received in a buffer of the data module processor 32 for code conversion and adding of transmission protocol to form into packets of pages for transmission to the destinations specified by the CPU as indicated by point 200. The data module processor 32 converts the ASCII encoded characters to the hybrid code described below and formats the pages stored in its buffers with X.25 transmission protocol to form packets of pages. The particular buffers of the DMP 32 in which the packets of pages are stored determines from which port the packets are outputted by the data output 34 to the lata switches 14 under the hub switches jurisdiction or to the other hub switches 16. A determination is made by the data module processor 32 of whether the destination of the packet of pages is a lata switch 14 as indicated at decision point 204 and the packet is transmitted to the data output 34. If the destination of the packet of pages is not a lata switch 14, the data output 34 transmits the packet of pages to a destination hub switch 16 as indicated at point 206. If the destination of the packet is determined to be a lata switch 14, the data output 34 transmits the packet of pages to the destination lata switch as indicated at point 208.

IX. System Operation For Processing Pages Originating At A Local Switch

Figure 11:
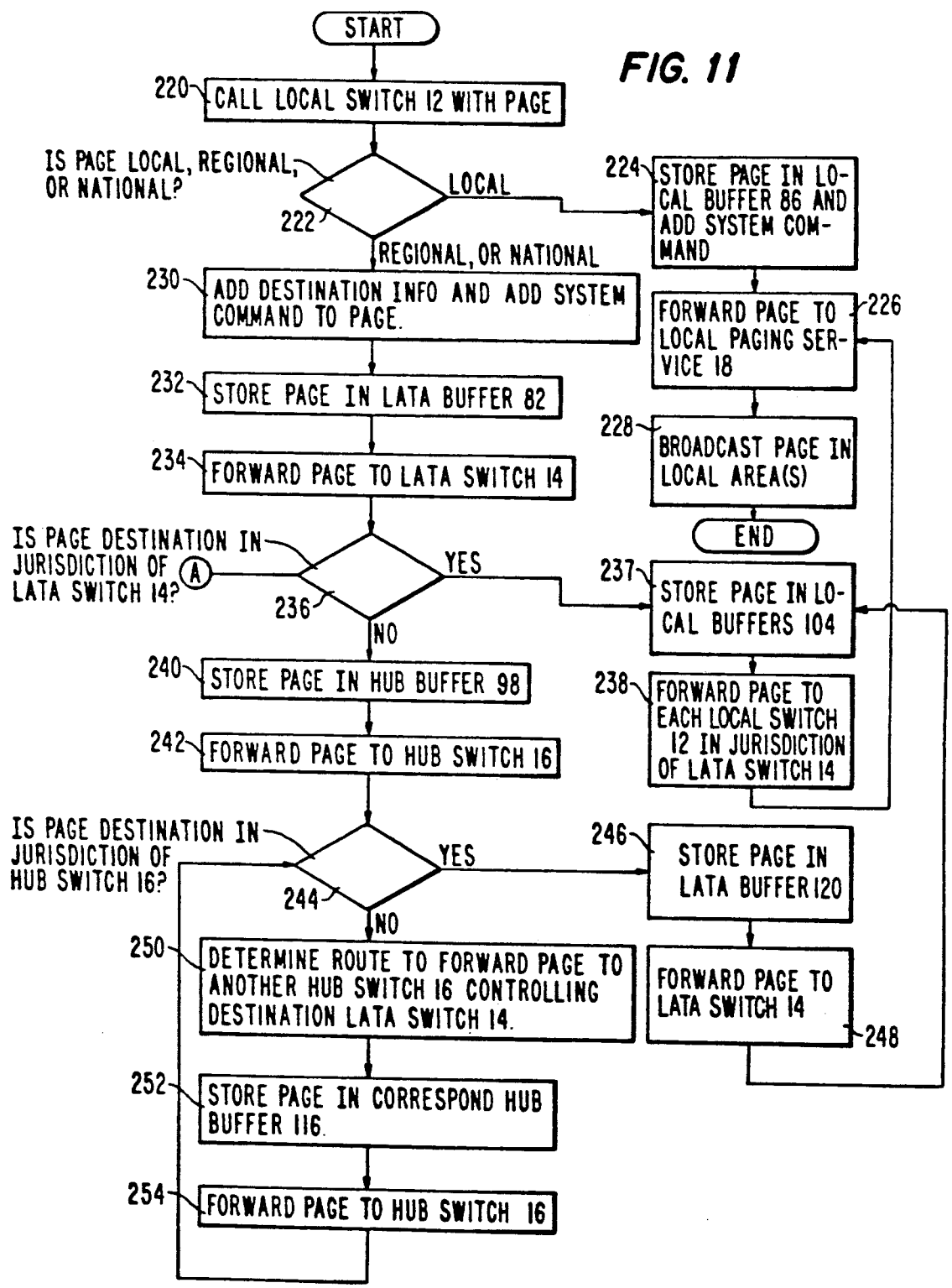
FIG. 11 is a flowchart of the operation of the network in processing pages.

FIG. 11 is a flowchart of the operation of the network 10 in processing pages originating at a local switch 12. The processing proceeds to point 220 where a call is placed to the local switch 12 with a page to be transmitted to a paging receiver. The call is placed via the local telephone trunk 28 and may be either a page consisting of numerical characters or a page consisting of alphanumeric characters having the three input formats described below. As described with reference to FIG. 2, the input may be introduced manually by a telephone handset using DTMF tones or, alternatively, a rotary dial set or from a low speed automatic input providing alphanumeric characters in coded format or from a high speed input in coded format using the X.25 transmission protocol. The message includes the subscriber identification code stored in the field 66. The local switch 12 determines if the page is destined for broadcast by the associated local paging service 18 or for regional or national service as determined by the appropriate service option stored in field 68 of the subscriber file 54. The CPU 50 determines the appropriate level of service by matching the paging receiver identification code inputted by the local call with the corresponding number in the subscriber file 54 and interrogates the service options specified therein in field 68 to determine the command to be used as described below. The operation of the CPU 50 in determining if the service is local, regional, or national is indicated at decision point 222. The page is initially held in the local inbound page buffer 84 while this determination is made. If the page is determined to be a page to be transmitted to a local paging service 18, processing proceeds to point 224 where the CPU 50 causes storage in the identification code buffer 86 associated with a digit which agrees with the least significant digit of the inputted paging receiver identification code and adds the system command to be used. Processing proceeds to point 226 where the CPU 50 periodically reads out any pages stored in the individual ID code buffers 86 to produce groups of one or more pages to be transmitted to the data output 34 for coding in the hybrid code discussed below and transmission to the local paging service 18. Thereafter, the individual page is broadcast by the transmitter 15 associated with the local paging service 18 as indicated as point 228. If at decision point 222 the page is determined to be one destined for a lata switch 14 (regional) or a plurality of lata switches (national), the CPU 50 adds the destination information stored in field 78 of the subscriber file 54, adds the system command as indicated at point 230 and proceeds to store the page in the outbound lata buffer 82 as indicated at point 232. The CPU 50 then forwards the page to the data module processor 32 for code conversion from ASCII to the hybrid code described below and formatting in the X.25 transmission format to form a packet of pages and transmission to the data output 34 where it is outputted to the lata switch 14 as indicated at point 234. The page is received by the associated lata switch 14 where a determination is made if its destination is that particular lata switch jurisdiction as indicated at point 236. If the lata switch 14 determines that the page is destined for its jurisdiction, the CPU 50 of the lata switch 14 causes storage of the page in the outbound local buffers 104 as indicated at point 237. As indicated at point 238, the CPU 50 of the lata switch 14 then periodically outputs the contents of the outbound local buffers 104 to the associated data module processor 32 for code conversion from ASCII to the hybrid code described below and addition of the X.25 transmission protocol as described below to form a packet of pages and forwarding to the data output 34 for transmission to each of the local switches 12 in the jurisdiction of the lata switch 14 as indicated at point 238. Processing then proceeds to point 226 as described above. If the lata switch 14 determines that the page is not destined for its jurisdiction, the CPU 50 causes storage in the outbound hub buffer 98 as indicated at point 240. The CPU 50 then forwards the pages periodically from the hub buffer 98 to the data module processor 32 for code conversion from ASCII to the hybrid code described below and for addition of the X.25 transmission protocol as described below to form a packet of pages and forwarding to data output 34 for transmission to the hub switch 16 associated with the lata switch 14 as indicated at point 242. The hub switch 16 upon receipt of the packet from the lata switch 14 determines if the pages contained therein are destined for a lata switch within its jurisdiction as indicated at decision point 244. If the answer is "yes", the CPU 50 in the hub switch 16 cause the page to be stored in the outbound lata buffer 120 which is associated with the lata switch which is the destination of the page as indicated at point 246. The CPU 50 of the hub switch 16 then periodically outputs any pages stored in the outbound hub buffer 120 to the data module processor 32 for code conversion from ASCII to the hybrid code described below and addition of the X.25 transmission protocol to form a packet of pages and forwarding to data output 34 where they are forwarded to the destination lata switch 14 as indicated at point 248. The process then proceeds to point 237 as described above. If the CPU 50 of the hub switch 16 determines that the destination of the page is not within its jurisdiction, the communication route for the page is determined by the hub routing codes 112 in accordance with the priority information stored therein. As indicated at point 250, the CPU 50 of the hub switch 16 then causes storage in the corresponding outbound hub buffer 116 as indicated at point 252. The CPU 50 periodically causes any pages stored in the output hub buffer to be forwarded to the data module processor 32 for code conversion from ASCII to the hybrid code described below and addition of the X.25 transmission protocol to form a packet of pages and to the data output 34 for transmission to the designated hub switch 16 as indicated at point 254. The processing proceeds back to decision point 244.

X. System Operation For Pages Placed by Local Telephone Call to Lata Switch

FIG. 12 illustrates a flowchart of the processing of an "all entry" page called into a lata switch 14 by calling on the telephone trunk 26. While the description of the network's processing of the page called in to a lata switch 14 discussed below is not with reference to a request to reprogram a subscriber file 54, it should be understood that the processing of requests to reprogram a subscriber file is analogous to the description below in routing a page to a local switch 12. It should be understood that the page called in on telephone trunk 26 may be either a purely numeric character page or an alphanumeric character page received with any of the four input formats described above and further contains an identification code which is the paging receiver to receive the page and subscriber identification code. A page originated by a local phone call to a lata switch 14 includes a message portion preceded by the identification code of the paging receiver to receive the page preceded by the geographic identification code of the lata switch receiving the call on telephone trunk 26 to originate a page. The geographic code of the lata switch 14 enables a receiving local switch 12 to differentiate the page from pages originating at a local switch. The resultant page is formed into a packet and forwarded by the network 10 to a local switch 12 where the subscriber file of the subscriber having the same subscriber identification code as the identification code of the page is stored that is within the jurisdiction of the lata switch 14 identified by the first four digits of the identification code contained in the page. The destination information 78 of the subscriber identified by the subscriber identification code is interrogated by the CPU 50 to determine any area destination(s) of the page in the network. The calling of the lata switch 14 is indicated at point 252. It is not necessary for the person placing the request for a page to have any knowledge of the subscriber's location given the fact that the subscriber and paging receiver identification code called in with the "all entry" page is geographically descriptive of the lata switch 14 having jurisdiction over the local switch 12 storing the subscriber file 54 which permits the network 10 to forward the page back to the local switch to determine any area destination(s) to which the page should be sent. Processing proceeds to decision point 254 where a determination is made if the page received by the lata switch 14 has an area destination within the lata switch jurisdiction which is made by comparing the identification code accompanying the page with the identification codes stored in the lata ID memory 92. If the answer is "yes", processing proceeds to point 256 where the CPU 50 of that lata switch 14 causes the page to be stored in the outbound local buffer 104 which is associated with the particular local switch in which the subscriber file is located based on the above-described comparison of the subscriber identification code with the identification codes stored in the lata ID memory 92. The CPU 50 of the lata switch 14 outputs the page from the buffer 104 to the data module processor 32 for code conversion from ASCII to the hybrid code described below and formatting of the page in the X.25 transmission protocol to form a packet and forwards the packet to the data output 34 for transmission to the local switch 12 containing the subscriber file as indicated at point 258. The local switch 12 receives the packet, disassembles the packet and compares the identification code of the disassembled page with the identification codes contained in the subscriber files 54 to identify the particular subscriber file. Upon location of the particular subscriber file, the subscriber's destination field 78 is interrogated to determine any area destination(s) to which the page is to be transmitted as indicated at point 260. The area destination of the page is then changed by the CPU 50 to any destination(s) specified by the destination field 78 as indicated at point 262 and the system command as dictated by the service option field 68 is added to form one or more pages corresponding in number to the number of area destinations specified by the service options 68 and destination area codes 78. The CPU 50 then causes the page to be stored in the outbound lata buffer 82 as indicated at point 264. The page(s) is then outputted to the data module processor 32 for code conversion from ASCII to the hybrid code discussed below and formatting of the page in the X.25 transmission protocol to form a packet(s) and forwarding to data output 34 where the packet(s) is transmitted to the lata switch 14 having jurisdiction as indicated at point 266. Thereafter, the processing proceeds to point 236 of FIG. 11 as described above. If the determination is that the area destination of the pages(s) is not within the lata switch jurisdiction at decision point 254, processing proceeds to point 257 where the page(s) is stored in the outbound hub buffer 98. The CPU 50 periodically outputs the contents of the hub buffer 98 to the data module processor 32 for code conversion from ASCII to the hybrid code discussed below and formatting of the page(s) in the X.25 transmission protocol to form a packet(s) and forwarding the packet(s) to data output 34 for transmission to the associated hub switch(es) 16 as indicated at point 259. Processing proceeds to decision point 261 where a determination is made by the hub switch 16 if the destination of the page(s) is within the hub switch jurisdiction. If the answer is "yes", the processing proceeds to point 263 where the CPU 50 causes storage of the page(s) in the outbound lata buffer 120. Thereafter, the CPU 50 periodically outputs the contents of the outbound lata buffer 120 to the data module processor 32 for code conversion from ASCII to the hybrid code discussed below and formatting in the X.25 transmission protocol to form a packet(s) and forwarding the packet(s) to the data output 34 where the packet(s) is transmitted to the lata switch 14 which is the destination as indicated at point 265. Processing then proceeds to point 256 as described above. If the answer is "no" at decision point 264, processing proceeds to point 267 where the CPU 50 makes a determination of the transmission route for the page(s) to another hub switch 16 by use of the hub routing codes 112 to determine the hub switch to which the page should be forwarded. The CPU 50 then causes storage in the outbound hub buffer 116 which is the area destination determined by comparison of the destination area code with the hub routing codes 112 as indicated at point 268. The CPU 50 then causes the page(s) to be outputted from the outbound hub buffer 116 to the data module processor 32 for code conversion from ASCII to the hybrid code discussed below and formatting in the X.25 transmission protocol to form a packet(s) and forwarding to data output 34 where the packet(s) is transmitted to the adjacent hub switch 16 as indicated at point 270.

XI. Programming of Frequency Band of Paging Receiver

FIG. 13 is a flowchart illustrating the programming of the channel memory of a paging receiver to receive different channels. Programming of the channels of a paging receiver may be made by placing either a call to a lata swtich 14 by telephone trunk 26 or by local call on telephone trunk 28. The channel programming command that is transmitted to the paging receiver to accomplish programming of the reception frequency is described below. The paging receiver is described in detail in the above-referenced patent applications filed on Oct. 20, 1987. It should be understood that the actual programming of channels is transparent to the subscriber, or other authorized person requesting programming of channels in that the local switch 12 at which the subscriber's subscriber file 54 is stored automatically issues a page commanding the paging receiver having an identification code identical to the paging receiver identification code stored in field 66 to be programmed with channels permitting reception in the new destination area(s) specified in field 78 to receive the channels specified in the frequency files 56 which match the area(s), stored in field 78. Programming the channel by a call to a lata switch 14 proceeds from the starting point where a caller directly calls a lata switch 14 by placing a local phone call over a telephone trunk 26 such as a 950 exchange to program the field 78 for reception in a new area(s). The caller receives a voice prompted message from the CPU 50 located at the lata switch 14 which prompts the caller to enter by means of DTMF codes or by rotary dialing a secret code (four digits) issued to the subscriber and the new area(s) in which the paging receiver is to receive pages. The secret code prevents unauthorized access to the subscriber's file 54 maintained in the local switch 12. This process is identified by reference numeral 290. Processing proceeds to decision point 292 where the lata switch 14 examines the second, third and fourth most significant digits of the paging receiver identification code inputted by the caller and compares those digits with its region designation to determine if the page is destined for that particular lata switch 14. The first digit is common to all paging receivers in a country and therefore is ignored in this example. This determination is made by the central processing unit 50 comparing the identification code called in with the page with the lata ID memory 92 to determine if the identification code matches any one of the paging receiver identification codes stored in the lata ID memory. If a match is found, which means that the page destination is located in the region of the lata switch 14, processing proceeds to point 294 where the page is stored in the particular outbound local buffer 104 which is assigned to the particular local switch 12 which contains the subscriber identification code in its subscriber files 54. Processing proceeds to point 296 where the lata switch 14 causes the pages stored in the local outbound buffer 104 to be periodically read out and forwarded to the data module processor 32 for code conversion from ASCII to the hybrid protocol described below and formatting in the X.25 transmission protocol to form a packet and forwarding to output 34 and transmission to the local switch 12 as indicated. The local switch 12, containing the subscriber identification code matching that contained in the page which was called to the lata switch 14, proceeds to verify that the secret access code to the subscriber's file agrees with that subscriber's secret access code and, enters the new area(s) into the field 78 and looks up the channels in the frequency files 56 which are assigned to the new area as indicated at point 298. The CPU 50 then assembles a channel programming command for each new area(s) which has been added to the field 78 which has a destination of one of the newly added areas as indicated at point 300. The local switch 12 then stores the channel programming command(s) in the outbound lata buffer 82 which is periodically read out under the control of the CPU 50. The CPU 50 then causes the channel programming commands to be outputted from the outbound lata buffer 82 to the data module processor 32 for code conversion from ASCII to the hybrid code described below and formatting in the X.25 transmission protocol to form a packet and forwarding to the data output 34 for transmission to the associated lata switch 14 as indicated at point 302. Furthermore, although not illustrated, if the service option field 68 specifies local service, the CPU 50 causes the page to be assembled as a page to be broadcast locally, stored in the appropriate ID code buffer 86, outputted to the data output 34 and converted to the hybrid code discussed below and forwarded to the local paging service 18. Operation then proceeds as described above at decision point 236 of FIG. 11. If the determination at decision point 292 was that the page destination is outside of the jurisdiction of the lata switch 14, processing proceeds to point 304 where the lata switch 14 causes storage of the page to be stored in the outboard hub buffer 98. The CPU 50 of the lata switch 14 causes the page to be read out of the hub page buffer 98 and transmitted to the data module processor 32 for code conversion from ASCII to the hybrid code described below and formatting in the X.25 transmission protocol to produce a packet and forwarding to the data output 34 for transmission to the associated hub switch 16 as indicated at point 306. The hub switch 16 makes the determination as indicated at decision point 308 of whether the page has a destination of a lata switch 14 within the hub region. If the decision is "yes" at decision point 308, processing proceeds to point 310 where the hub switch 16 causes storage of the page in the outbound lata buffer 120 which is assigned to the destination lata switch 14. The CPU 50 of the hub switch 16 then causes the page to be read out of the lata buffer 120 and transmitted to the data module processor 32 for code conversion from ASCII to the hybrid code described below and formatting in the X.25 transmission protocol to produce a packet and transmission to data output 34 where it is forwarded to the lata switch 14 as indicated at point 312. Processing then proceeds to point 294 as described above. If the answer was "no" at decision point 308 that the page is not destined for a lata switch 14 within the jurisdiction of the hub switch 16, processing proceeds to point 314 where the CPU 50 determines to which hub switch 16 the page should be transmitted by use of the hub routing codes 112 in the random access memory 48. The CPU 50 then determines the destination hub switch 16 by matching the area destination of the page with a particular area destination within the hub routing codes 112 and causes storage of the page in the corresponding outbound hub buffer 116 which is the highest priority hub switch 16 to which pages are to be sent in the matched hub routing code as indicated at point 316. The CPU 50 of the hub switch 16 causes the page to be forwarded to the hub destination upon the periodic reading out of the outbound hub buffer 16 by transmission to the data module processor 32 for code conversion from ASCII to the hybrid code described below and formatting in the X.25 transmission protocol to form a packet and forwarding to the data output 34 where the page is transmitted to the hub destination as indicated at point 318.

Furthermore, it should be understood that programming of the paging receiver to receive pages in a new area(s) by updating the field 78 of the subscriber files may be accomplished by a local telephone call to the local switch 12 having the subscriber file 54 containing the subscriber identification code. The initiation of this programming is indicated by block 320. After verification of the secret code and matching of the identification code transmitted with the page with an identification code in the subscriber file 54 and reprogramming of the destinations 78, processing proceeds to point 322 where the frequency programming command is assembled. At point 324 the command after buffering and protocol formatting is transmitted to a transmitter 15 at the local paging service as indicated and to the area codes (if any) specified in field 78.

It should further be understood that the updating of service by adding an area(s) to the field 78 causes the channel programming command to be outputted to each of the areas stored in the field 78 including those area(s) already present in the field and the newly added area(s). In this way, the highest probability exists for local paging service as indicated and to the area codes (if any) specified in field 78.

It should further be understood that the updating of service by adding an area(s) to the field 78 causes the channel programming command to be outputted to each of the areas stored in the field 78 including those area(s) already present in the field and the newly added area(s). In this way, the highest probability exists for the paging receiver receiving the new frequency programming information.

Figure 26:
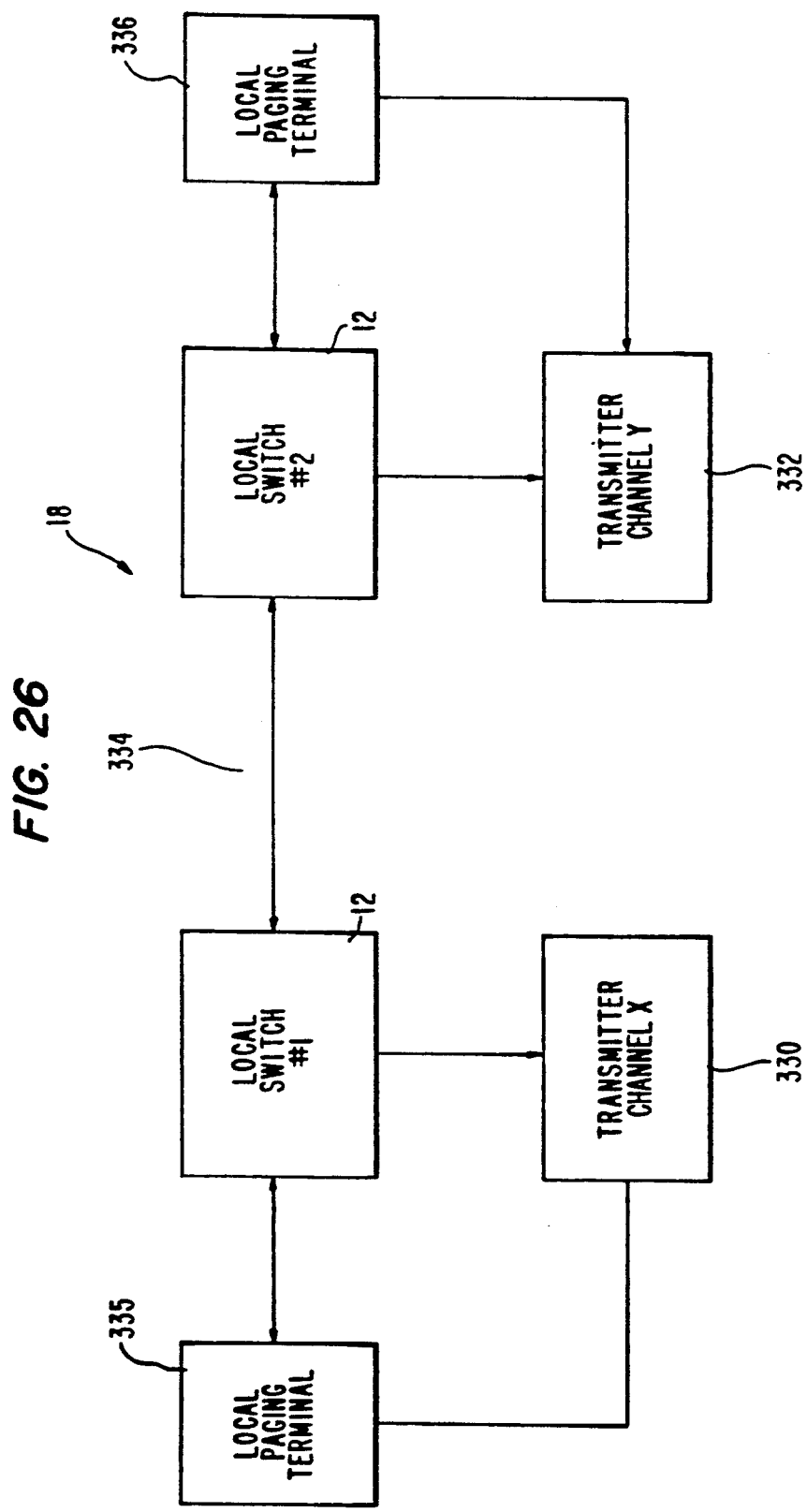
FIG. 26 illustrates a block diagram of a system used by a paging service 18 in dynamically switching paging receiver reception channels between one channel and one or more additional channels.

XII. Local Switch Programming of Reception Frequencies in Response to Paging Traffic FIG. 26 illustrates a block diagram of a system utilized by a local paging service 18 having at least two transmission channels which dynamically switches the channel on which paging receivers under the jurisdiction of the local paging service 18 are to receive pages from one of the channels to another of the channels. As illustrated, the pair of local switches 12, which are identical to those described above with respect to FIGS. 2 and 3, are connected to each other via the communication line 334 which preferably has a RS232 protocol. The local switch #1 is connected to a local paging terminal 335 which represents the part of a local paging service 18 which controls the transmitter 330 transmitting pages on channel X. Similarly, the local switch #2 is connected to a local paging terminal 336 which represents the part of a local paging service 18 which controls the transmission of pages on a transmitter 332 on channel Y. It should be understood that typically the local paging terminals 335 and 336 are contained within a single local paging service 18 but that in fact they are not limited thereto. Furthermore, the local switches #1 and #2 may be disposed in different geographical areas within broadcast range of the area served by the local paging service 18. It should also be understood that the transmitters 330 and 332 may be located at a single transmission facility or may be disposed in separate locations within the service area of the local paging service 18. The local switches #1 and #2 may be implemented in a high capacity switch having the functional capability of two individual local switches 12. Finally, the above-described system may be implemented with only two local switches and transmitters under their jurisdiction.

The system of FIG. 26 functions to change the paging receiver channel of groups of subscribers stored in a subscriber file 54 of one of at least two local switches to the paging receiver channel of one of the other of the switches when traffic conditions on one of the switches reaches an overload as described below. In the preferred form, the channel of individual subscribers is not changed but it should be understood that this could be accomplished in the alternative. Overload conditions typically will happen during three peak traffic periods during a day but may also occur randomly as dictated by service conditions. The local switch controlling the changing of the channel of a group of subscriber's paging receiver to the channel of another local switch issues a frequency changing command discussed below to reprogram the channel of each of the paging receivers having a paging receiver identification code contained within the group of subscribers. The channel "X" of transmitter 330 is utilized when the local switch #2 is overloaded with paging traffic and the channel "Y" of transmitter 332 is utilized when the local switch #1 is overloaded with paging traffic assuming that both switches are not simultaneously busy. The local switch controlling the changing of the channel of a group of paging receivers programs the destination field 78 of the subscriber to forward pages within the group of paging receivers to the port connected to line 334 of the other switch to cause each page to a paging receiver within the group to be transferred to the other switch by line 334 for transmission by its transmitter. It should be understood that the compilation of the pages which are intended for paging receivers within the group of paging receivers that have their channel changed remains under the jurisdiction of the switch which initiated the change in the channel with only the transmission of the pages being controlled by the other switch. It should be understood that this configuration in the network 10 replaces the combination of the local switch 12, transmitter 15 and local paging service 18 associated with each lata switch 14 as illustrated in FIG. 1 when the local paging service has two or more channels available. It should be understood that the number and the size of the buffers of the local switches are programmable by inputs from the keyboard 36.

Figure 27:
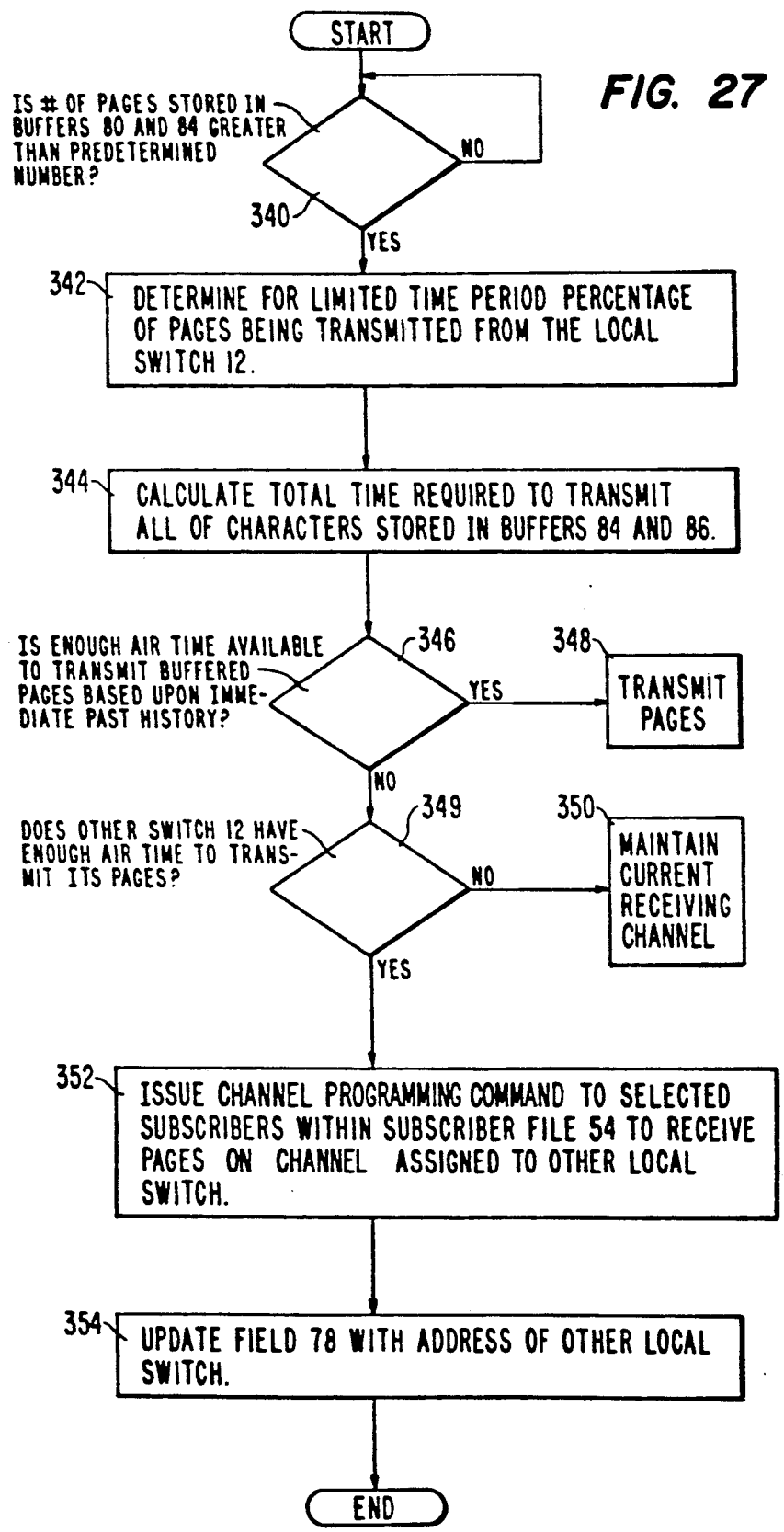
FIG. 27 is a flowchart of the operation of the system of FIG. 26.

FIG. 27 is a flowchart illustrating the operation of the system of FIG. 26. It should be understood that the explanation of operation is equally applicable to either one of the local switches #1 or #2. Operation commences at point 340 where the CPU 50 of one of the local switches 12 determines the number of pages stored in its inbound data buffer 80 and inbound pages buffer 84. If the number is greater than a predetermined programmable number, such as 70% of the overall capacity of pages which may be stored by these buffers, a condition exists in which it may be desirable to shift the channel on which subscribers stored in the subscriber file 54 of the one local switch are to receive pages from one of the channels "X" and "Y" to the other of the channels "X" and "Y". If the system does not have local paging terminals 335 and 336 which have separate subscriber files from the subscriber files 54 of the local switches #1 and #2, then the determination may proceed directly to decision point 348 described below which eliminates the requirement for determining percentage of air time discussed below with reference to steps 342, 344 and 346. If the number exceeds the aforementioned number, processing proceeds to point 342 where a determination is made of the percentage of the air time over an immediately past time interval used by the local switch in transmitting its pages with respect to the total air time of the transmission of pages by the transmitter in transmitting pages from the associated local paging terminal and the local switch. This determination may be made for a period such as the five preceding minutes of operation. The assumption is that if the local switch 12 has its inbound buffers substantially full, then the overall amount of time which it spent transmitting pages in the last five minutes will reflect its percentage of the overall air time. If there is no backup of pages in the buffers 82 and 86 in the last five minutes of operation, there is assumed to be no backup of pages requiring reprogramming of the channel of the paging receivers. The CPU 50 determines the overall total time required to transmit the totality of the pages stored in each of the buffers 82 and 86 as indicated at point 344. At point 346, based upon the overall percentage of transmission time which has been utilized by the local switch during the predetermined time period, a determination is made if the total required time to transmit the totality of buffered pages contained in the buffers 82 and 86 does not exceed the available air time. In other words, if the local switch utilized 20% of broadcast time for an immediately past predetermined time of five minutes, then the total time required to transmit the number of pages stored in the buffers 82 and 86 must not exceed one minute in order to avoid a backup. If the answer is "yes" at point 346, then the local switch proceeds as described above with reference to the operation of the local switch to output the stored pages in the ID code buffers 86 for transmission to its associated transmitter 330 or 332 as indicated at point 348. If the answer is "no" at point 346, the processing proceeds to point 349 where an inquiry is made to the other local switch to determine if it has enough air time available to transmit the pages stored in its buffers 80 and 84. At this point it should be noted that the control program of both local switches are simultaneously making the determinations of steps 340-349. If the answer is "no" at point 349, which means that the other local switch 12 also has backlog pages, then the local switch does not issue any channel programming commands and maintains the current channel for all of the subscribers in its subscriber files 54 as indicated at point 350. If the answer is "yes" at point 349, operation proceeds to point 352 where the CPU 50 causes the generation of the channel programming command as discussed below to receive the page on the channel assigned to the other local switch. Processing proceeds from point 352 to point 354 where a pointer is placed in the field 78 to forward each, page of the group of subscribers who have had their channel changed to the other switch. It should be noted that the formatting of a channel programming command is totally under the control of the switch initiating the changing of the channel with the complete page being forwarded to the other switch under the control of the aforementioned pointer.

At this point it should be understood that there are two main modes of operation which are the automatic and manual modes. During the automatic mode, the control program of the CPU 50 may be altered at the local switch 12 by a suitable input such as from the keyboard and monitor 36 prior to operation to shift the channel of a group of subscribers less than the total number of subscriber files or to shift the whole group of subscribers stored therein. During the automatic mode of operation, the shifting of reception frequency of a group of subscribers happens without human intervention. Shifting of the channel of the entire subscriber file is an action which would normally be reserved for a transmitter failure or shutdown of the transmitter for maintenance. When less than all of the subscribers in the subscriber file 54 are to have their channel changed, the local switch may be programmed to automatically identify those particular subscribers to have their channel changed to identify blocks of subscribers such as but not limited to by the least significant digit of their identification code. The manual mode of operation is the same as described above except that implementation of the step at point 352 is performed with manual intervention which permits the choice of programming either all of the subscribers which are resident in the subscriber file 54 as a group or sub-groups such as those having a common least significant digit in their identification code 66.

XIII. International, National, Regional, Local, Sublocal and Group Paging

As discussed above, the network 10 provides versatility in the level of service which may be provided to the subscriber. The subscriber may elect international, national, regional, local, sublocal and group paging by use of the service option field 68.

A. Local Paging

Figure 28:
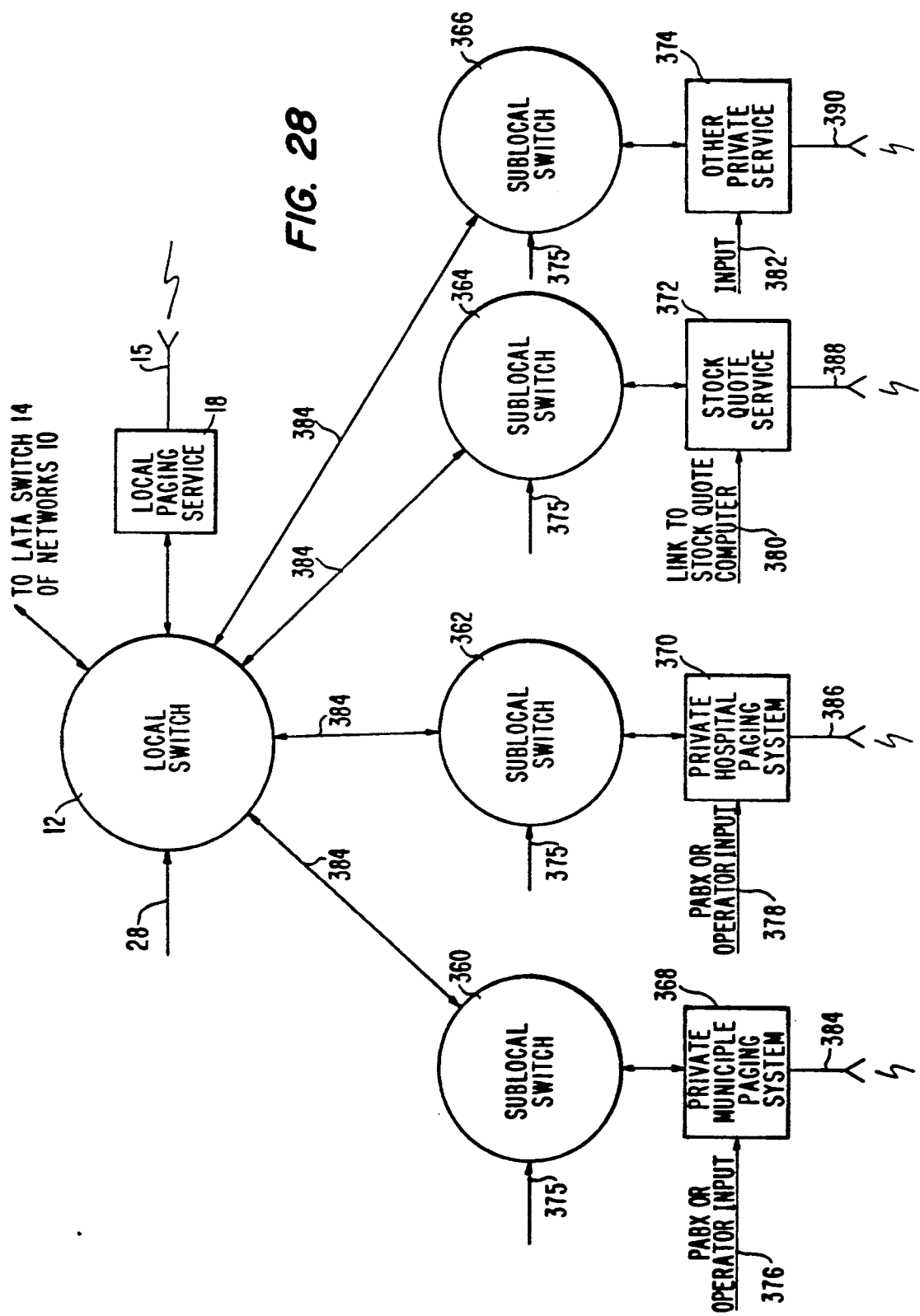
FIG. 28 is a diagram of a local switch 12 and a plurality of sublocal switches.

When it is desired to program a paging receiver which is identified by the pager identification code 66 of the subscriber file 54 to receive local service, the paging receiver is programmed to receive a fixed channels either manually or automatically by use of the channel programming changing AC as described below. Automatic programming is accomplished with the channel programming command AC discussed below with the desired channels being sent twice by identical channel programming command to the paging receiver by mean of the transmitter 15. The operating program of the processor of the paging receiver recognizes the sequential sending of the same channel programming command twice and stores the repeated channel in the area channel section and operating channel section of the channel memory as discussed in detail in the above-referenced patent applications filed Oct. 20, 1987. By storing only a single channel in its operation channel and its area channel sections discussed below, the paging receiver is forced to receive only a single channel which is typically used for local operation. It should also be understood that a paging receiver may be programmed to receive more than one channel B. Sublocal Paging FIG. 28 illustrates a block diagram of a system in accordance with the present invention for providing sublocal paging message services by means of pages transmitted from one or more sublocal paging systems or services 368, 370, 372 and 374 through associated sublocal switches 360, 362, 364 and 366 to the local switch 12 for broadcast by the transmitter 15 of the local paging receiver 18 on a common carrier channel. The programming command, discussed below, is issued by the local switch 12 to program the channel(s) of the paging receiver of subscribers resident in the subscriber file of the systems or services 368-374 to the channel(s) of the local transmitter 15. A sublocal paging system or service transmits on a non-common carrier channel pages to groups of subscribers maintained in a sublocal switch subscriber file 54 as described below to provide specialized services typically of the type not provided by a common carrier paging service such as the local paging service 18. A separate sublocal switch is provided for each of the sublocal services or systems to be controlled. The circuitry of the sublocal switches 360, 362, 364 and 366 is identical to the local switch described above with reference to FIGS. 2 and 3 and they have the same general control program with necessary modifications being made by input from the keyboard 36. As illustrated, sublocal switches 360, 362, 364 and 366 are respectively associated with a private municipal paging system 368, a private hospital paging system 370, a stock quotation service 372 and any other type of private service 374. Each of the sublocal switches and local switch 12 has a telephone trunk(s) 375. A sublocal switch may be used in conjunction with any non-common carrier service or system with the number of sublocal switches not being limited to that as illustrated and further not being limited to any particular type of sublocal system or service as illustrated. As illustrated, the private municipal paging system 368 has a PABX or operator input 376, the private hospital paging system has a PABX or operator input 378; the stock quote service 372 has a link to a stock quote computer 380, and the other private service has an input of any type of information 382 with it being understood that the inputs to the sublocal systems or services are of any nature to support the function performed by these systems or services. The function of these systems is to permit specialized forms of information to be broadcast in the form of a page to subscribers of the services or system 368, 370, 372, and 374 either by means of their associated sublocal non-common carrier transmitter 384, 386, 388 and 390 or by means of the local switch controlling the transmitter 15 of the common carrier of the local paging service 18. Each of the sublocal switches 360, 362, 364 and 366 are connected to the local switch by means of a communication link 384 which may be a telephone trunk.

Figure 30:
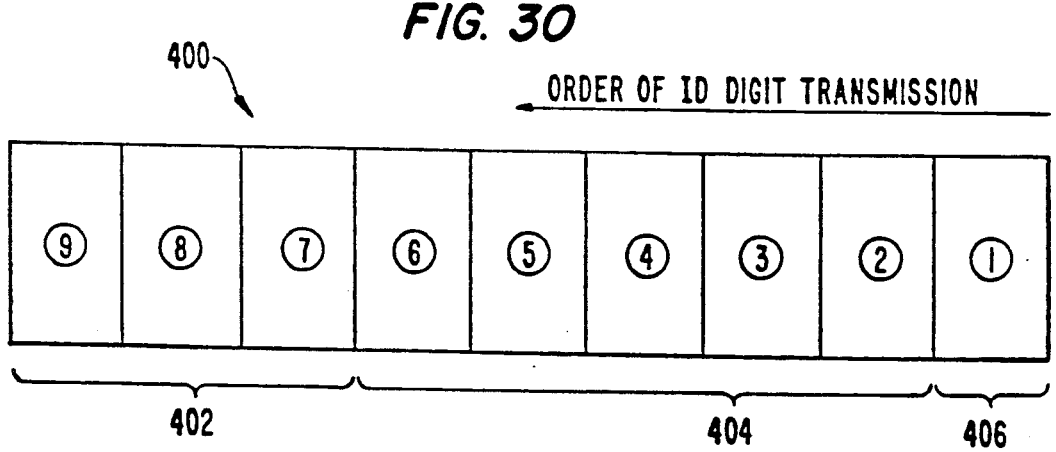
FIG. 30 is a diagram illustrating the digits of the subscriber and paging receiver identification code and destination code and their order of transmission for a page broadcast for service options other than a local service option.

Each of the sublocal switches 360, 362, 364 and 366 has a memory map as illustrated in FIG. 3 with a private service option field 68 (not illustrated) being utilized to permit election of sublocal service which utilizes only the transmitter 384, 386, 388 or 390 associated with the sublocal switches 360, 362, 364 or 366 or local, regional, national or international service provided by the network 10. The channel programming command AC is issued to program the channel of the paging receiver of the subscribers within the subscriber file 54 of the local switch 18 to receive a page originating from the sublocal switch broadcast by the local transmitter 15. The other service options remain which permit a subscriber to the systems or services 360, 370, 372 or 374 to elect the other service levels provided by the network 10. When the subscriber to the private systems or services elects to utilize the transmitter 15 of the local paging service 18, the subscriber calls the local switch 12 and enters the four-digit secret code to obtain access to the subscriber files 54. The subscriber then requests service other than sublocal transmission by the transmitters associated with the systems or services 368, 370, 372 and 374 by specifying a service option of either local service which corresponds to the local service described above with reference to field 68 of the local switch memory map of FIG. 3 or some other wider level of broadcast service by entering the service option and the area code(s) of the destinations. The destination code 40 discussed below with reference to FIG. 30 is transmitted with the channel programming command which is stored by the paging receiver. All pages which originate from a sublocal switch that are broadcast by the transmitter 15 are broadcast with the destination code 406 as the first character of the identification code to save battery power of the paging receiver. The local switch 12 programs the channel(s) to be received by the paging receiver to those used by the service areas of the destination field 78 of the subscriber file by transmission of the channel programming command by the transmitter 15 and to the network 10 if a level of service greater than local service is requested. The regional and national service options also utilize the destination code 406 as described below. The sublocal switch receives each page from the associated system or service and formats the page with the appropriate identification code including destination code 406 and system command as described below including the hybrid code described below and adding of the X.25 transmission protocol to form a packet. The sublocal switch then forwards the packet to the local switch 12 for processing and distribution to the destinations specified by the destination field 78 in accordance with the function of a local switch 12 as described above with reference to FIGS. 2 and 3. When the local switch 12 receives a page from one of the sublocal switches via communication link 384, it compares the identification code of the page with the subscriber file 54 to find a match and determines the destination(s). For a local service option the page is processed as a page received from a lata switch 14, and broadcast by the transmitter 15. If regional, national or international service has been elected then the local switch 12 forwards the page(s) to system 10 for processing as described above. If the subscriber wishes to return to the status of only receiving pages via transmission of the sublocal switches and private transmitter, then a call is made to the sublocal and local switches to reprogram the service options in field 68 to specify only private service over which the switch 12 does not have jurisdiction.

C. International, National, Regional and Group Paging

International, national and regional service are provided by the transmission of packets of pages between switches in the network 10. The channel programming command AC is used to program the paging receiver of the subscriber to receive the channels for the areas identified in field 78 which are stored in the frequency file 56 which are associated with the designated areas. Thus, if regional service is elected for area code 312 or national service is elected to cover a plurality of area codes such as 312, 202 and 212, the local 20 switch 12 issues a channel programming command AC discussed below which is broadcast to all of the specified area codes as well, as the broadcast area of the transmitter 15 with channels chosen from the frequency file.

Group paging is analogous to sublocal paging except that the pages are directed to a selected group of paging receivers within the jurisdiction of the local switch 12. The destination code 406 which is discussed below in detail is added as the first digit of the paging receiver identification code to limit the sampling time required by the local paging receiver to determine if the page is intended to be received by it as part of the group.

Figure 29:
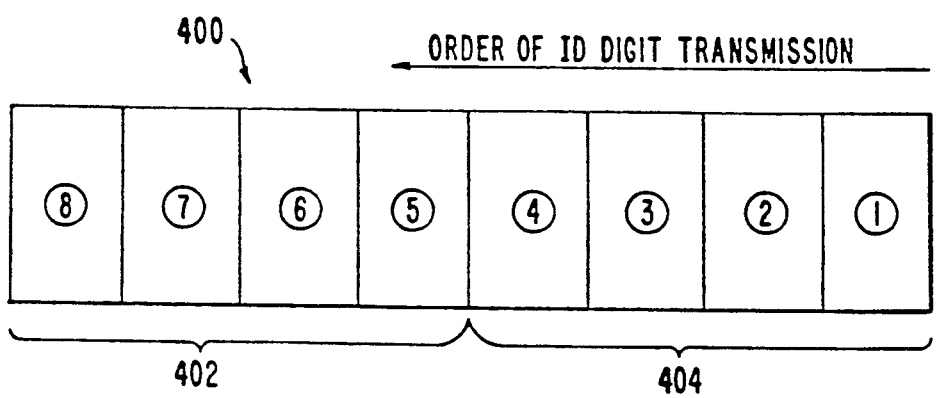
FIG. 29 is a diagram illustrating the digits of the subscriber and paging receiver identification code and their order of transmission for a page broadcast for a local service option.

D. Limiting of Battery Consumption of Paging Receivers for Sublocal, Group, Regional, National and International Paging FIG. 29 illustrates the order of transmission of digits of the identification code for all pages which are broadcast by a local paging service 18 for subscribers stored within its subscriber identification files 54. Each circled number indicates the significance of the digit of the identification code with the most significant digit being identified by the largest number. The area designation field 402 is the country code and area code of the geographical location where the local switch 12 is located with the most significant digit being the country code followed by the next three most significant digits which comprise the area code. For example a local switch in the Chicago area would have a field 402 of "1312". The field 404 are the digits which identify the subscribers of the local switch. The arrow pointing to the left illustrates the order of transmission of the digits of the identification code with the least significant digit being transmitted first sequentially followed by digits of increasing significance with the most significant digit being transmitted last. This order of transmission produces a substantial increase in battery life of the paging receiver because the individual paging receiver, samples fewer digits of the identification code on any given channel to determine if a page on that channel is addressed to a particular paging receiver than if the digits are transmitted in an order of decreasing significance as in the prior art.

FIG. 30 illustrates the use of the destination code 406 to limit power consumption in paging receivers for sublocal, group, regional, national and international paging. Identical reference numerals identify like parts in FIGS. 29 and 30. The only difference between local paging on one hand and sublocal, group, regional, national and international paging on the other hand is that a destination code 406 is added to the identification code of pages as the least significant digit which are transmitted to paging receivers which are to receive group, sublocal, regional, national or international service pursuant to the service option field 68 discussed above. The destination code 406 has one or more characters which precede the paging receiver identification code that are not matched by a paging receiver which is to receive only a local service page. This ensures that only paging receivers which are programmed to receive international, national, regional, sublocal and group pages may be turned on to sample more than one digit of the identification code of pages intended for international, national, regional, sublocal and group service options when transmission occurs on a local frequency. Paging receivers which are programmed for the international, national, regional, sublocal and group service options will only turn on for one digit of local service options on a channel before a mismatch occurs that causes the paging receiver to turn off for pages broadcast local pages. In a preferred form of the invention, the destination code 406 is a letter, which is transmitted prior to the transmission of the paging receiver identification code. Since local pages do not transmit any letters with the identification code, a mismatch will occur immediately for paging receivers programmed to receive nonlocal service pages. Paging receivers which are to receive international, national, regional, sublocal or group pages are programmed by the channel programming command AC to store a destination code as a header on the channels broadcast with the channel programming command. Thus, on a particular channel where some pages are transmitted with destination codes, only the first digit of each page is required to be compared with any stored destination code to enable an identification by a paging receiver programmed to receive pages with destination codes if a page is potentially directed to that paging receiver. The paging receiver which has been programmed with a destination code immediately turns off when a match is not found between the first digit of a page on a received channel and the stored destination code which occurs for pages broadcast as part of local service thereby saving power required to compare the following digits of the stored and transmitted paging receiver identification.

When it is desired to program a paging receiver to receive pages to use the destination code 406, the individual channels of the area channel section of the channel memory, as discussed below, of the paging receiver as discussed in detail in the above-referenced applications filed on Oct. 20, 1987 are programmed by the channel programming command AC as described below. The first digit of the channels which are to be programmed to be received by the channel programming command AC contain the destination code 406 character such as the letter A, B, C, etc., which is not recognized as part of a paging receiver identification code for only local paging, which preferably are base ten numbers. Thus, paging receivers which are programmed for local paging service on a channel also being used for international, national, regional, sublocal or group paging will immediately detect a mismatch when the first digit of a page intended from national, regional, sublocal or group service is received which saves battery life. When a paging receiver which has been programmed for international, national, regional, sublocal or group service receives the first digit of the paging receiver identification code, that digit is compared with the first digit of the channels stored in the area channel section of the paging receiver channel memory. If a match occurs, the operating program of the paging receiver causes the RF tuner to stay in an "on" state to compare the subsequent digits of the received identification code with the stored paging receiver identification code stored by the paging receiver until a mismatch or a complete match is found. If there is no match between the first digit of the transmitted page and the destination code, then the paging receiver RF tuner is immediately turned off to save battery power.

XIV. X.25 Transmission Protocol

Figure 31:
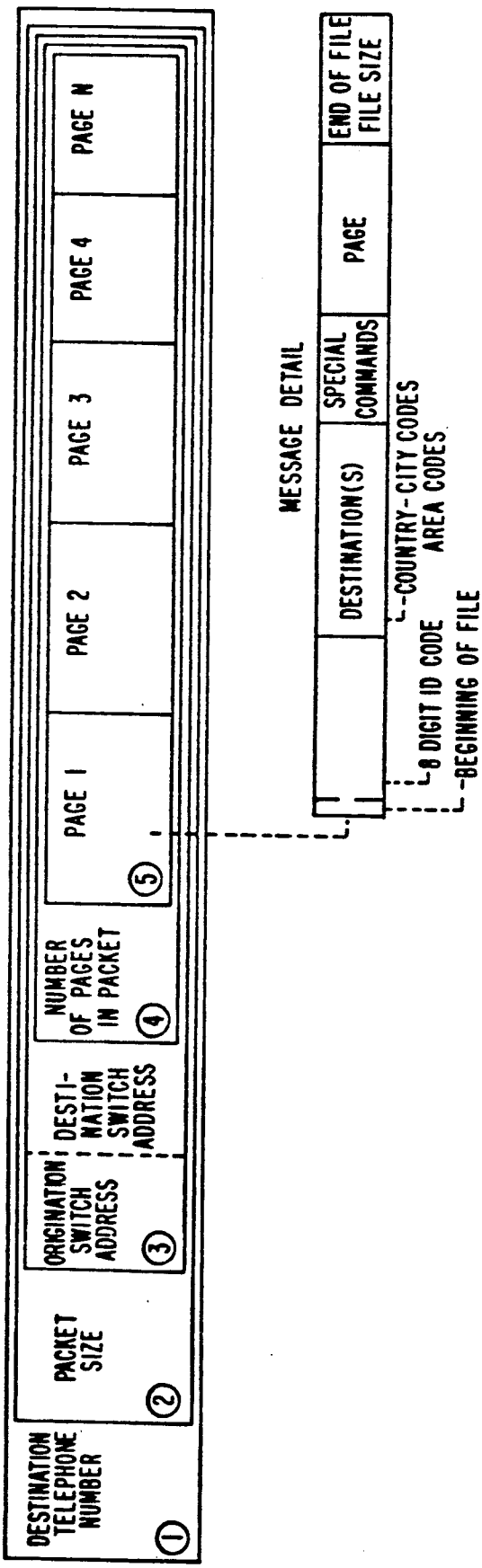
FIG. 31 illustrates a preferred embodiment of the protocols of a packet and a page in accordance with the present invention.

FIG. 31 illustrates a preferred transmission protocol to be used for transmitting packets of pages between switches. The protocol which is used is a modified X.25 protocol. As illustrated, each packet contains five separate layers. The first layer is the destination telephone number which is the receiving port to receive the page. With reference to FIG. 1 if a packet of X.25 formatted pages were to be sent from a first lata switch 14 to its associated hub switch 16 over communication path 20, the destination telephone number would be the telephone number of the hub switch. It should be further understood that the X.25 transmission protocol as described herein may be utilized with other types of communication mediums between switches such that a destination telephone number may be replaced with another form of address of the receiving switch. The second layer indicates the packet size field in terms of succeeding layers of information. In the present case levels 3, 4 and 5 are provided which dictates that the packet size would store the number 3 to indicate the subsequently lower third, fourth and fifth layers. The third layer contains an origination switch address and a destination switch address which can be either telephone numbers or real addresses within the network 10. The fourth layer is the number of pages which are contained in a packet. As illustrated, this number may be any integer n. The fifth layer is one or more pages which each correspond to an individual page to be sent to a particular paging receiver.

Each message includes the following information. In accordance with standard X.25 protocol, a beginning of file header is included. Following the beginning of file header is a pager I.D. code which is the identification code of the destination paging receiver which is identical to the subscriber identification code stored in the subscriber files 54 of the subscriber to receive the page. Following the pager I.D. code is the destination(s) of the page which is geographically descriptive of the area to which the page is to be transmitted and is added by the local switch 12 interrogating the destination field 78 of FIG. 3. In the preferred embodiment, the destination is a combination of country and area code as utilized by the telephone system to identify the area to which the page is destined. For each country, the same country code will be used so that if the paging system 10 as illustrated in FIG. 1 were to be utilized for the United States, the first digit of the destination would be a 1. Similarly, the destinations in other countries would be followed by different numbers identifying those countries followed by code which breaks up the identified country into smaller geographic regions. While the utilization of area codes under the telephone system facilitates the usage of the present invention, it should be understood that a destination which is not based on the telephone system is equally usable with the present invention. The field of special commands are the system commands described below which are transmitted with each page to a paging receiver The "page" is the part of the page which is to be displayed to the bearer of the paging receiver and may be numeric or alphanumeric characters. The end of the file and file size information are part of a standard X.25 protocol.

XV. Hybrid Page Code

In a preferred form of the present invention a hybrid code is utilized which is compatible with both analog and digital FM paging transmitters now currently in use. Preferably, this code is used for coding all forms of transmissions in the system. This hybrid code uses sequential tones to encode numerical pages transmitted with the A3, C3, A5 and C6 commands discussed below. This hybrid code utilizes two sequential tones to encode each numerical or alphanumerical character of alphanumeric pages transmitted with the A4, C4, A6 and C6 commands discussed below. Each tone represents one of 16 possible values in a hexadecimal numbering system as follows: 600 Hz.=0; 741 Hz.=1; 882 Hz.=2; 1023 Hz.=3; 1164 Hz.=4; 1305 Hz.=5; 1446 Hz.=6; 1587 Hz.=7; 1728 Hz.=8; 1869 Hz.=9; 2151 Hz.=A; 2435 Hz.=B; 2010 Hz.=C; 2295 Hz.=D; 4059 Hz.=E; and no tone (absence of modulated carrier signal)=F. The processing by the individual paging receiver of the above-described hybrid code is discussed in detail in the above-referenced patent applications filed on Oct. 20, 1987. Thus, it should be understood that the "page" field of the X.25 packet described above with respect to FIG. 31 is transmitted with one tone being used to encode each number of a numerical page and two tones being used to code each alphanumeric or numeric digit of an alphanumeric page. The encoding format utilized for digits of the alphanumeric commands in the preferred embodiment is set forth below.

| CONVERSION TABLE | | | |
|---|---|---|---|
| Successive Values | Character | Successive Values | Character |
| 01 | ! | 51 | S |
| 02 | " | 52 | T |
| 03 | # | 53 | U |
| 04 | $ | 54 | V |
| 05 | % | 55 | W |
| 06 | & | 56 | X |
| 07 | ' | 57 | Y |
| 08 | ( | 58 | Z |
| 09 | ) | 59 | [ |
| 10 | * | 60 | \ |
| 11 | + | 61 | ] |
| 12 | , | 62 | |
| 13 | - | 63 | ~ |
| 14 | . | 64 | |
| 15 | / | 65 | a |
| 16 | 0 | 66 | b |
| 17 | 1 | 67 | c |
| 18 | 2 | 68 | d |
| 19 | 3 | 69 | e |
| 20 | 4 | 70 | f |
| 21 | 5 | 71 | g |
| 22 | 6 | 72 | h |
| 23 | 7 | 73 | i |
| 24 | 8 | 74 | j |
| 25 | 9 | 75 | k |
| 26 | : | 76 | l |
| 27 | ; | 77 | m |
| 28 | < | 78 | n |
| 29 | = | 79 | o |
| 30 | > | 80 | p |
| 31 | ? | 81 | q |
| 32 | | 82 | r |
| 33 | A | 83 | s |
| 34 | B | 84 | t |
| 35 | C | 85 | u |
| 36 | D | 86 | v |
| 37 | E | 87 | w |
| 38 | F | 88 | x |
| 39 | G | 89 | y |
| 40 | H | 90 | z |
| 41 | I | 91 | { |
| 42 | J | 92 | \| |
| 43 | K | 93 | } |
| 44 | L | 94 | → |
| 45 | M | 95 | ← |
| 46 | N | 96 | |
| 47 | O | 97 | |
| 48 | P | 98 | |
| 49 | Q | 99 | |
| 50 | R | | |

It should be further understood that display of the characters set forth above in the English language is controlled by the first letter of the input commands used for making alphanumeric or numeric pages as described above. Although not illustrated, corresponding Kanji characters of the Japanese language are transmitted by using the same two digit address and varying the first character of the commands described below from the letter "A" for English display as discussed above to the letter "C" for display of the corresponding Japanese character. Thus, with respect to the conversion table set forth above, a command as described below requesting alphanumeric display of an exclamation point in English would be encoded with the sequence "01" with the command beginning with the letter "A" and the display of the corresponding character in Kanji format would also be encoded by the combination of digits "01" with the command beginning with a "C". Every command which is to be executed in conjunction with a page in English begins with a "A" and every command which is to be executed in conjunction with a page in Japanese begins with a "C".

Pages which are to be transmitted to an external device through the paging receiver have the "page" field described above coded in the hybrid code at a 1200 baud rate. For the X.25 transmission of pages to an external data device each bit is encoded in 833 microseconds and each bit in all other transmissions of pages which are coded in the two-tone encoding format described above is coded with 8.2 milliseconds.

XVI. Commands

The command repertoire of the present invention permits the functionality of the paging receiver to be changed dynamically by the network 10 in a manner not achieved by the prior art. All commands which are executed by the paging receiver are sent according to a command protocol. An example of the command protocol is set forth below with a nationwide telephone number page to paging receiver ID 789 12345 with telephone number 424, 6464 and a warble tone.

|  | FF--5--B4 BE 321 BE 987 A7 424 DE 6464 AEA |
|---|---|
| NOTES | 1 1A 2 2 3 4 5 |
| FF | Provides 66 m.s. of silence prior to the page. |
| NOTE 1 | Is the least significant digit of the paging receiver identification code which is sent first as the preamble. If the page is a group page, a C may be substituted for the 5. |
| NOTE 1A | When a "B" appears after the preamble digit, the person receiving the page will be alerted that a "batched" page is occuring to be sent to a group of paging receivers. Batched pages are outputted from the buffers 86. |
| NOTE 2 | The BE's are received by the paging receiver and ignored and provide time spacing. |
| NOTE 3 | A7. The A signifies that a command sequence follows. The 7 indicates the message is numeric, and illuminates a nationwide origin display in the paging receiver and telephone messages. |
| NOTE 4 | DE's are sent during the data character portion of the transmission to allow overlay operation. |
| NOTE 5 | AEA or AE indicates the end of transmission and the type of alert tone to use e.q. warble. |

The command protocol also permits the repeating of digits, the placing of group calls and batches of pages to be sent from identification code buffers 86 as explained below.

The repeating of digits 799 12225 is as follows:
FF--5--2 BE2E1 BE987

The command protocol will never allow the same two numbers to be successively sent. An E is substituted for the second number or letter. i.e.

12225 = 12E25
44BB5 = 4EBE5
38111 = 381E1
11111 = 1E1E1

Group calls to groups of paging receivers are explained as follows:

The "C" tone is substituted for a digit for group calls. Groups are 10,100,1000, etc. or all.

| i.e. | |
|---|---|
| 789 12345 | (no group call) |
| 789 1234C | (10 pagers) (0-9) |
| 789 123C5 | (10 pagers) (05,15,25 etc.) |
| 789 123CC | (100 pagers) (00-99) |
| 789 CCCCC | (100,000 pagers) |
| CCC CCCCC | (all pagers) |

The transmission of batched pages occurs from the identification code buffers 86 within the example below the page being 789-12345. If a "B" tone immediately follows a preamble tone, all paging receivers with the 5 preamble in their identification code will remain on to search for their identification code. Batching of pages allows one preamble to be sent, and then multiple pages to follow within the same preamble group. The following pages will then be sent with the preamble digit 5 eliminated. Each paging receiver will remain on, searching for the AE or AEA end of page combination. If a page does not follow within 300 m.s., the paging receiver will return to sample mode. If a page follows with a new preamble digit of 1900 m.s. duration, the paging receiver will also return to sample mode.

FF--5--B4BE321BE987A7 (ETC.)
Three batched pages are as follows:
987-12345, 987-12435, 987-12125

FF--5--B4BE321BE789A7AE
FFB3BE421BE789A3AEA
FF2BE121BE789A4

Note that "B" is sent on following pages, and the "5" is eliminated on following pages (the 5 is not necessary on following pages as the first page sends 5B which alerts all "5" paging receivers that batcing is occurring). The last page of the batch will not have a "B" sent to allow the paging receivers to digit mismatch and return to sample mode. It should be noted that each of the local switches has the capability of batching pages into a single page having a plurality of identification codes contained in each page.

The operating program of the main CPU 50 of the switch is programmed to generate commands which are transmitted with each page which are dictated by the operation of the system and the specified service options in field 68. As explained above with reference to FIG. 31, a command sequence follows the paging receiver identification code and destinations. The command sequence begins with an "A" character followed by a command character for English language pages and with a "C" character followed by a command character for Japanese language pages. Set forth below is a command table explaining the command structure. While the English language commands are the only commands discussed in the examples below, it should be understood that the Japanese language commands are identical in function and are illustrated in the table.

| COMMAND TABLE | | |
|---|---|---|
| English | Japanese | |
| A0 | C0 | BATTERY SAVE |
| A1 | C1 | REPEAT |
| A2 | C2 | PROGRAM ID |
| A3 | C3 | LOCAL & NUMERIC (16 NUMBERS) |
| A4 | C4 | LOCAL & MESSAGE - ALPHA (511 CHAR) |
| A5 | C5 | NATIONAL & NUMERIC (16 NUMBERS) |
| A6 | C6 | NATIONAL & MESSAGE-ALPHA (511 CHAR.) |
| A7 | C7 | ALPHA FIXED MEMORY LOCATION |
| A8 | C8 | RESERVED |
| A9 | C9 | EXT DATA (OPENS AUDIO TO EXIT JACK) |
| AA | CA | DO NOT USE! |
| AB | CB | OUT OF SERVICE |
| AC | CC | CHANNEL PROGRAM |
| AD | CD | COMPANY MESSAGE |
| AE | CE | DO NOT USE! |

The A1, A3-A7, A9 and AD commands are automatically generated by CPU 50 of local switch 12 as a function of the service options in field 68 of the subscriber files 54. In other words, the programming of field 68 automatically dictates the command structure to be used. Furthermore, the AC command is utilized by the system for programming the channel of the paging receivers as described above in sections XI, XII and XIII, as well as any time the system is used to reprogram the channels to be received by the paging receiver. A number in parenthesis identifies a part identified within the drawings of the above-referenced patent applications filed on Oct. 21, 1987.

A0 and C0 Battery Save

The battery save command is followed by a two digit decimal format indicating how many seconds the paging receiver should be turned off before beginning its channel sampling. It is followed by an AE message terminator with no tone alert necessary. The two digit number represents the number of 10 second increments the paging receiver should be turned off with a maximum of 990 seconds (16.5 minutes).

A022AE=220 second turned off period
A099AE=990 second turned off period

A1 and C1 Repeat Page

The repeat command indicates that the page being sent is a repeat of the previous page. The previous message display will be used, and the numeric character or alphanumeric character page should match a previous page which has been stored in the random access memory (60) of the paging receiver during the execution of the A3-A6 commands which cause a page to be stored in the random access memory. If a page match is detected by the paging receiver, the page is discarded. If the first page was not received, the page should be stored in the random access memory (60) of the paging receiver and the wearer of the paging receiver alerted. The display (64) will show "RPT" indicating a repeat page and the first page was not found in memory, i.e., A1, A3 424DE6464AE REPEAT 424-6464 (local, numeric, which is the execution of command A3 described below)

A2 and C2 Program ID

The program ID command is used to send a new paging receiver identification code 66 to the paging receiver. The previous paging receiver identification code will be overwritten by this command. No tone alert is necessary, but the paging receiver should display the new paging receiver identification code as a page, i.e.,

CHANGE 789 12345 TO ID 789 45678
A2789DE4567DE8AE (NEW ID)

A3 and C3 Local & Numeric (16 Digits)

The A3 command sequentially illuminates the display (64) of the paging receiver described in the above-referenced patent applications filed on Oct. 21, 1987, indicating the page is of local origin, and a numeric character display (telephone number) as a page. This command is used to transmit pages originating within the jurisdiction of the local switch 12 which controls the transmitter 15 broadcasting the page. The numeric characters are sent as sequential tones. The paging receiver will receive and decode individual characters the page as single digits, i.e.,

A3956DE1030AE TEL #956-1030

The maximum numeric message length is 16 digits.

A4 and C4 Local & Alphanumeric (511 Characters)

The A4 command sequentially illuminates the display (64) of the paging receiver of the above-referenced patent applications filed on Oct. 21, 1987 indicating the page is of local origin and an alphanumeric display as a page. The alphanumeric format is sent with each character being encoded as a two digit number as explained above. The paging receiver will receive and decode individual characters of the page as sequential tones. The message length will be 511 characters or less. This command is used to transmit pages originating within the jurisdiction of the local switch 12 which controls the transmitter 15 broadcasting the page. The display (64) will flash, indicating the message is 511 characters long, i.e., IBM STOCK S124 3/4
(18 CHARACTER MESSAGE)
A4 41 34 DE 45 32 DE 51 52 DE 47 35 DE 43 32 DE 04 17 DE 18 20 DE 32 19 DE 15 20 AE (56 CHARACTER 1.848 SEC.)

A5 and C5 National & Numeric (16 Digits)

The A5 command sequentially illuminates the display (64) of the paging receiver described in the above-referenced patent applications filed on Oct. 21, 1987 indicating that the origin of the page is not within the jurisdiction of the local switch 12 controlling the transmitter 15 broadcasting the page and a numeric character message as a page. This command is used by a local switch 12 for relaying a page through the network 10 to a transmitter 15 located at a remote area (an area other than where the subscriber file is located) where a paging receiver is to receive a page transmitted by the transmitter located at the remote area such as between local switch #1 of lata switch #1 to local switch #1 of local switch #m of FIG. 1. The numeric characters are sent as sequential tones. The paging receiver will receive and decode characters of the page in a single digit format, e.g.,

TEL # 956 1001
A6956DE10E1AE (NOTE: REPEAT DIGIT FOR SECOND ZERO)

A6 and C6 National & Message (511 Char.)

The A6 command sequentially illuminates the (64) of the paging receiver described in the above-reference patent applications filed on Oct. 21, 1987 indicating that the origin of the page is not within the jurisdiction of the local switch 12 controlling the transmitter 15 broadcasting the page and an alphanumeric message as a page. This command is used by a local switch 12, for relaying a page through the network 10 to a transmitter 15 located at a remote area (an area other than where the subscriber file is located) where a paging receiver is to receive a page transmitted by the transmitter 15 located at the remote area such as between local switch #1 of lata switch #1 to local switch #1 of local switch #m of FIG. 1.

The maximum message length is 511 characters. The example is identical to the A4 command discussed above with the first two characters being A6.

A7 and C7 Alphanumeric Specific Message Memory

The A7 command permits a subset of commands to follow. The digit immediately following the A7 command will indicate in which section of addressable sections of the random access memory (60) of the paging receiver described in the above-referenced patent applications filed on Oct. 21, 1987 the page is to be stored. If a page exists in this memory location of the random access memory, it will automatically overwrite the page stored therein. The command subset will be 1-4 indicating memory locations (11-14) of the random access memory (60). An ordinary page will not overwrite the (11-14) page locations. The page will immediately follow:

A7 1 (page location 11)
A7 2 (page location 12)
A7 3 (page location 13)

A7 4 (page location 14)

The page locations (11-14) will only be overwritten by pages with the same command (e.g. memory location 11 will only be overwritten by the A7 (1) command) or erased by the user. The page type will always be "Special Call" and will be sent as an alphanumeric page.

A8 and C8 Reserved

A9 and C9 External Data Message

The A9 command alerts the person being paged that the audio must be routed to the external data jack (67) of the paging receiver described in the above-referenced patent applications filed on Oct. 21, 1987 for remote processing. The paging receiver will forward the audio to the external data jack (67) until the AE message is received, indicating end of data transmission, i.e. A9---DATA----AE.

The A9 command plays an important part of the present invention's functionality in offering diverse data services by permitting the connection of peripheral devices to the paging receiver. Thus, diverse data services such as but not limited to telex and facsimile may be offered with the paging receiver acting as the receiver which forwards received data to a peripheral device.

AA and CC Invalid

The AA command cannot be used, as it would be processed by the main CPU (24) as an AE (end of file) command.

AB and CB Out of Service

The AB command will illuminate an out of service display on the display (64) of the paging receiver described in the above-referenced patent applications filed on Oct. 20, 1987 and may or may not have numeric data following. This command may be used when system maintenance is required, or to alert the wearer of the paging service that service is being denied, until the bill is paid, i.e. ABAE (illuminates out of service message upon turn on and for two seconds).

The paging receiver still receives messages as normal. An out of range display turns on. The display (64) displays "out of service" until the next page is allowed. The network 10 will prevent any messages from being sent to the pager.

AC Channel Programming

The AC channel programming command is one of the most important commands in the system in providing paging services. The AC channel programming command alerts the person wearing the paging receiver that channel programming information is forthcoming. The channel programming command is not transmitted with characters comprising a page to be displayed or outputted by a paging receiver and only includes information for changing at least one channel of a paging receiver to which the channel programming command is addressed. The channels are stored in the channel memory (62) of the paging receiver, described in the above-referenced patent applications filed on Oct. 20, 1987 which are transmitted as four digit decimals numbers, each separated by the DE delimiter. As explained in the patent applications filed on Oct. 20, 1987, up to 15 channels may be loaded into the area channel section or the operation channel section. A preceding V indicates VHF, a U UHF, a J indicates Japan and an E indicates Europe.

When only one channel frequency is desired, such as for local paging, the channel is repeated at least twice, to alert the paging receiver that only one channel is desired to be programmed in the area channel section of the channel memory (62). All previous channels in the area channel section (66) of the channel memory 62 are erased. The memory cells have the new channel number entered to fix the paging receiver to receive a single channel. The memory cells will remain programmed until the next channel reprogramming of the paging receiver, i.e.

AC0123DE0123AE (CH.V 123 NO SCANNING)

AC0E10DE0107DE0210DE1050DE7AEA (CH.v10,v107,u210,u50).

The channel programming sequence is as follows:

| | |
|---|---|
| 0001-0DDD | VHF 5 KHz steps |
| 1001-1DDD | VHF 6.25 KHz steps (Europe) |
| 2001-2DDD | UHF 5 KHz steps |
| 3001-3B2B | 280 MHz 2.5 KHz steps (Japan). |

Channel codes 4001, 5001, 6001, 7001, 8001, 9001 are open for additional channels to be added. The total upward reserve channel capacity in ROM 58 is 16,458 channels.

The following sub-commands are utilized for instructing the main CPU to perform functions pertaining to the programming of channels.

NO Command (Add One Channel)

When no sub-command is sent, one channel is to be added to the area channel section (66), e.g. AC 0237 DE 7AEA (add VHF channel 237 to area channel section).

Sub-command 4000 (Typically Regional)

When 4000 is transmitted, it erases the entire area channel section (66) and the operation channel section (64) of the channel memory (62) and cannot be used in adjacent areas which must be programmed with the 6000 sub-command. e.g. AC 4000 DE 0156 DE 2132 DE 7AEA. This command erases and stores VHF 156 and UHF 132 channels in the area channel section (66).

Sub-command 5000

When 5000 is transmitted, the destination code may be programmed. This command erases the operating channel section (64) and the area channel section (66) and force the reception of a particular channel. The command is used for dynamic frequency agility. The paging receiver is fixed to receive a fixed channel. e.g. AC 5000 DE 0171 DE 7AEA. This command erases the operating channel section (64) and the area channel section (66) and forces the paging receiver to VHF channels 171, causing the operating channel section to store VHF channels 171.

Sub-command 6000 (National)

This command is divided into the loading of the 15 possible destination codes (96) and the channels.

ACB6122 DE0200 DE0000 DE0000 DE0000 DE0212 DE0311

DE0408 DE2511 DE2139 DE7AEA

This represents the 6000 national command followed by the destination code (96) or local code for each of the 15 possible channels in the area channel section. The five channels follow and will be as follows:

6122 National, channel 1=A, channel 2=B, channel 3=B
0200 Channel 4=local, channel 5=B, filler code
0000 Channel 8=11, filler code
0000 Channel 12-15, filler code
0212 VHF channel 212
0311 VHF channel 311
0408 VHF channel 408
2511 UHF channel 511
2130 UHF channel 139
7AEA Stop channel command.

Channel Programming Termination (7AEA)

The channels to be sent to the paging receiver are sent in the following order:
0XXX channels (VHF) (ascending numerical order)
1XXX channels (VHF Europe)
2XXX channels (UHF Europe)
3XXX channels (280 MHz).

The last channel sent is actually a terminate message code. It is 7AEA (7AAA).

The paging receiver will receive the last frequency code and immediately terminates the page. The 7AEA terminate frequency code is necessary at the end of every AC channel program message. During the transmission of channel codes, the AEA code may appear (e.g. channel 1AEA). In order to prevent termination of the message, the AC command changes the AEA termination command to 7AEA. 7AEA is an invalid channel code.

AD and CD Company COMMAND

The AD command allows a 32 alphanumeric character company message to be sent to the paging receiver. The message is always alphanumeric, e.g., AD 4247, DE 4637, DE 5100, DE 4833, DE 3941, DE 4639, AE Jones Paging.

When a company message is desired, it will be sent after the paging receiver identification code has been programmed. When the paging receiver is turned on, the company message will be displayed instead of a self test message which is typically used. If no company message resides in the paging receiver, the self test message will display.

The 32 character part of the random access memory (60) is battery protected to permit the message to permanently reside in the paging receiver. It may be changed by simply sending a new AD command and message to the pager. This permits the company message to be changed at will.

AE and CE - Invalid

The AE command cannot be used, as it cannot be encoded and also conflicts with the end of file command.

End of Page Command AE and CE or AEA and CEA

All pages require the end of page command. The end of page command serves a two fold purpose indicating the end of transmission and determines the type of tone alert.

AE=2041 hertz-50% duty cycle-2 seconds
AEA=2041 hertz-25/75% duty cycle-2 seconds Certain commands do not send a tone alert. A listing of the commands is as follows:

| A0 | BATTERY SAVE | (NO ALERT) |
|----|----|----|
| A1 | REPEAT | (NO ALERT)* |
| A2 | PROGRAM ID | (ALERT) - DISPLAY ID |
| A3 | LOCAL & TEL NUMERIC | (ALERT) |
| A4 | LOCAL & ALPHA | (ALERT) |
| A5 | NAT. & TEL NUMERIC | (ALERT) |
| A6 | NAT. & ALPHA | (ALERT) |
| A7 | ALPHA FIXED MEMORY | (ALERT) |
| A8 | UNASSIGNED | (ALERT) |
| A9 | SPECIAL & DATA AUDIO | (ALERT) |
| AB | OUT OF SERVICE | (ALERT) |
| AC | CHANNEL PROGRAM | (ALERT) |
| AD | COMPANY MESSAGE | (ALERT). |

*A1 will alert if first page was not received or if previously erased.

While the invention has been described in terms of its preferred embodiments, it should be understood that numerous modifications may be made thereto without departing from the spirit and scope of the invention as defined in the appended claims. The network 10 is not limited to the commands, code used for coding characters of the pages and transmission protocol described above with reference to the preferred embodiment. Furthermore, while in the preferred embodiment, the code used for coding characters of pages transmitted between switches is different than the code used by the RAM 48 and CPU 50, it should be understood that the invention may be practiced without using any code conversion including the code conversion performed by the data input 30, data module processor 32 and data output 34. While the preferred form of the switches utilizes a PC and hardware assist to perform necessary processing operations, it should be understood that this configuration of processing is not required with other processing configurations utilizing hardware and/or software to perform the disclosed functions of the switches being within the scope of the invention. While the preferred form of transmitting pages between the switches utilizes grouping of the pages to be transmitted between switches into one or more packets which each have a switch as area destination it should be understood that the invention is not limited to utilizing of packets. While the preferred form of the invention utilizes the memory maps of FIGS. 3, 5 and 7, it should be understood that other storage configurations of memory may be used in accordance with known memory storage techniques including those which do not specifically allocate individual storage areas for storing a single type of data such as the preferred memory maps. While in the preferred form of the invention, the pages are transmitted as packets with a transmission protocol, it should be understood that the pages may be sent individually or in groups, without a transmission protocol, to a single receiving switch and processed by the receiving switch in accordance with the area destination of the individual pages and transmitted to an output for further transmission without formatting into packets. It should be understood that the cost of transmitting pages in the network is substantially lowered by the function of the switch in originating a page and the switches located in the network before a final area destination switch of a page in formulating groups of pages for transmission to a single switch are destination for transmission between switches. Finally, it should be understood that the terminology "identification code" and "identification number" and "code" each describe the combination of one or more characters including letters or numbers with the terms being used interchangeably throughout the specification to identify information processed by the switches.

We claim:

1. A method of transmitting information in a network containing a plurality of switches, including a plurality of switches each storing subscriber information, the subscriber information including at least one subscriber file with a subscriber file storing an identification number identifying a subscriber and a receiver for receiving information transmitted by the network, a frequency file storing channels on which information is to be broadcast after transmission in the network to a destination switch determined by the subscriber file and information used by the network for determining a destination switch to which information is transmitted by the network comprising:

storing at least one area within the network which is to receive information be transmitted by the network in a destination field of a subscriber file storing an identification number identical to an identification number to be transmitted with the information to be transmitted by the network;

broadcasting a channel programming command to a receiver, which is identified by an identification number identical to the identification number within the information to be transmitted, from a transmitter associated with the switch storing the subscriber file storing an identification number identical to the identification number within the information to be transmitted, containing at least one channel stored in the frequency file on which the information is to be broadcast in at least one area in the network in response to programming the destination field of the subscriber file storing the identification number of the receiver to receive the information with at least one area to which the information is to be transmitted by the network to program the receiver receiving the channel programming command to receive the at least one channel;

transmitting the information from the switch storing the subscriber file storing the identification number identical to the identification number transmitted with the information to be transmitted to at least one switch identified by the at least one area stored in the destination field of the subscriber file; and broadcasting the information in the at least one area stored in the destination field of the subscriber file from at least one transmitter located in the at least one area stored in the destination field on at least one channel programmed by the channel programming command.

2. A method in accordance with claim 1 wherein: the plurality of switches which store at least one subscriber file are local switches which are associated with a local service broadcasting information to receivers on at least one radio common carrier.

3. A method in accordance with claim 1 wherein: the at least area within the network to receive the information transmitted by the network is identified by a telephone area code received from a telephone call originated from an area code in which a switch storing the subscriber file is located to the switch storing the subscriber file containing an identification number identical to an identification number contained within information to be transmitted by the network.

4. A method in accordance with claim 2 wherein: the at least one area within the network to receive the information transmitted by the network is identified by a telephone area code received from a telephone call originated from an area code in which a switch storing the subscriber file is located to the switch storing the subscriber file containing an identification number identical to an identification number contained within information to be transmitted by the network.

5. A method in accordance with claim 1 wherein: an area in the destination field identifies a switch located in an area which transmits the information to at least one local switch within the area for broadcast on a channel which has been programmed to be received by the receiver by the channel programming command.

6. A method in accordance with claim 2 wherein: an area in the destination field identifies a switch located in an area which transmits the information to at least one local switch within the area for broadcast on a channel which has been programmed to be received by the receiver by the channel programming command.

7. A method in accordance with claim 3 wherein: an area un the destination field identifies a switch located in the area which transmits the information to at least one local switch within the area for broadcast on a channel which has been programmed to.be received by the receiver by the channel programming command.

8. A method in accordance with claim 4 wherein: an area in the destination field identifies a switch located in the area which transmits the information to at least one local switch within the area for broadcast on a channel which has been programmed to be received by the receiver by the channel programming command.

9. A method in accordance with claim 1 wherein: the transmission of the information from the switch storing the subscriber file to at least one switch identified by the at least one area stored in the destination field of the subscriber file is in a packet containing a variable number of blocks of information which is assembled by a switch originating the packet with each packet having a destination switch which receives the packet from the switch assembling the packet and each block of information within a packet having a destination switch which may be a switch other than switch receiving the packet.

10. A method in accordance wtih claim 2 wherein: the transmission of the information from the switch storing the subscriber file to at least one switch identified by the at least one area stored in the destination field of the subscriber file is in a packet containing a variable number of blocks of information which is assembled by a switch originating the packet with each packet having a destination switch which receives the packet from the switch assembling the packet and each block of information within a packet having a destination switch which may be a switch other than a switch receiving the packet.

11. A method in accordance with claim 3 wherein: the transmission of the information from the switch storing the subscriber file to at least one switch identified by the at least one area stored in the destination field of the subscriber file is in a packet containing a variable number of blocks of information which is assembled by a switch originating the packet with each packet having a destination switch which receives the packet from the switch assembling the packet and each block of information within a packet having a destination switch which may be a switch other than a switch receiving the packet.

12. A method in accordance with claim 4 wherein:
the transmission of the information from the switch storing the subscriber file to at least one switch identified by the at least one area stored in the destination field of the subscriber file is in a packet containing a variable number of blocks of information which is assembled by a switch originating the packet with each packet having a destination switch which receives the packet from the switch assembling the packet and each block of information within a packet having a destination switch which may be a switch other than a switch receiving the packet.

13. A method in accordance with claim 5 wherein:
the transmission of the from the switch storing the subscriber file to at least one switch identified by the at least one area stored in the destination field of the subscriber file is in a packet containing a variable number of blocks of information which is assembled by a switch originating the packet with each packet having a destination switch which receives the packet from the switch assembling the packet and each block of information within a packet having a destination switch which may be a switch other than a switch receiving the packet.

14. A method in accordance with claim 6 wherein:
the transmission of the information from the switch storing the subscriber file to at least one switch identified by the at least one area stored in the destination field of the subscriber file is in a packet containing a variable number of blocks of information which is assembled by a switch originating the packet with each packet having a destination switch which receives the packet from the switch assembling the packet and each block of information within a packet having a destination switch which may be a switch other than a switch receiving the packet.

15. A method in accordance with claim 7 wherein:
the transmission of the information from the switch storing the subscriber file to at least one switch identified by the at least one area stored in the destination field of the subscriber file is in a packet containing a variable number of blocks of information which is assembled by a switch originating the packet with each packet having a destination switch which receives the packet from the switch assembling the packet and each block of information within a packet having a destination switch which may be a switch other than a switch receiving the packet.

16. A method in accordance with claim 8 wherein:
the transmission of the information from the switch storing the subscriber file to at least one switch identified by the at least one area stored in the destination field of the subscriber file is in a packet containing a variable number of blocks of information which is assembled by a switch originating the packet with each packet having a destination switch which receives the packet from the switch assembling the packet and each block of information within a packet having a destination switch which may be a switch other than a switch receiving the packet.

17. A method in accordance with claim 1 wherein:
each of the at least one area within the network which is to receive information to be transmitted by the network stored in the destination field is assigned at least one channel in the frequency file on which the information is to be broadcast in the at least one area.

18. A method in accordance with claim 17 wherein:
the programming of the at least one area is by a telephone call to another switch in the network transmitting the at least one area to be programmed and the identification number stored by the switch storing the subscriber file storing the identification number;
the network transmits the identification number and the at least one area which is being programmed to a switch identified by digits of the identification number stored by the switch storing the subscriber file storing the identification number; and
the switch identified by digits of the identification number transmits the at least one area to the switch storing the identification number in response to the switch identified by the digits matching the identification number transmitted with the at least one area to the identification number stored in a table storing a plurality of identification numbers stored by the switch to be programmed by the at least one area.

19. A method in accordance with claim 2 wherein:
each of the at least one area within the network which is to receive information to be transmitted by the network stored in the destination field is assigned at least one channel in the frequency file on which the information is to be broadcast in the at least one area.

20. A method in accordance with claim 19 wherein:
the programming of the at least one area is by a telephone call to another switch in the network containing the at least one area to be programmed and the identification number stored by the switch storing the subscriber file storing the identification number;
the network transmits the identification number and the at least one area which is being programmed to a switch identified by digits of the identification number stored by the switch storing the subscriber file storing the identification number; and
the switch identified by digits of the identification number transmits the at least one area to the switch storing the identification number in response to the switch identified by the digits matching the identification number transmitted with the at least one area to the identification number stored in a table storing a plurality of identification numbers stored by the switch to be programmed by the at least one area.

21. A method in accordance with claim 3 wherein:
each of the at least one area within the network which is to receive information to be transmitted by the network stored in the destination field is assigned at least one channel in the frequency file on which the information is to be broadcast in the at least one area.

22. A method in accordance with claim 4 wherein:

each of the at least one area within the network which is to receive information to be transmitted by the network stored in the destination field is assigned at least one channel in the frequency file on which the information is to be broadcast in the at least one area.

23. A method in accordance with claim 5 wherein:

each of the at least one area within the network which is to receive information to be transmitted by the network stored in the destination field is assigned at least one channel in the frequency file on which the information is to be broadcast in the at least one area.

24. A method in accordance with claim 23 wherein:

the programming of the at least one area is by a telephone call to another switch in the network containing the at least one area to be programmed and the identification number stored by the switch storing the subscriber file storing the identification number;

the network transmits the identification number and the at least one area which is being programmed to a switch identified by digits of the identification number stored by the switch storing the subscriber file storing the identification number; and the switch identified by digits of the identification number transmits the at least one area to the switch storing the identification number in response to the switch identified by the digits matching the identification number transmitted with the at least one area to the identification number stored in a table storing a plurality of identification numbers stored by the switch to be programmed by the at least one area.

25. A method in accordance with claim 6 wherein:

each of the at least one area within the network which is to receive information to be transmitted by the network stored in the destination field is assigned at least one channel in the frequency file on which the information is to be broadcast in the at least one area.

26. A method in accordance with claim 25 wherein:

the programming of the at least one area is by a telephone call to another switch in the network containing the at least one area to be programmed and the identification number stored by the switch storing the subscriber file storing the identification number;

the network transmits the identification number and the at least one area which is being programmed to a switch identified by digits of the identification number stored by the switch storing the subscriber file storing the identification number; and the switch identified by digits of the identification number transmits the at least one area to the switch storing the identification number in response to the switch identified by the digits matching the identification number transmitted with the at least one area to the identification number stored in a table storing a plurality of identification numbers stored by the switch to be programmed by the at least one area.

27. A method in accordance with claim 7 wherein:

each of the at least one area within the network which is to receive information to be transmitted by the network stored in the destination field is assigned at least one channel in the frequency file on which the information is to be broadcast in the at least one area.

28. A method in accordance with claim 27 wherein:

the programming of the at least one area is by a telephone call to another switch in the network containing the at least one area to be programmed and the identification number stored by the switch storing the subscriber file storing the identification number;

the network transmits the identification number and the at least one area which is being programmed to a switch identified by digits of the identification number stored by the switch storing the subscriber file storing the identification number; and the switch identified by digits of the identification number transmits the at least one area to the switch storing the identification number in response to the switch identified by the digits matching the identification number transmitted with the at least one area to the identification number stored in a table storing a plurality identification numbers stored by the switch to be programmed by the at least one area.

29. A method in accordance with claim 8 wherein:

each of the at least one area within the network which is to receive information to be transmitted by the network stored in the destination field is assigned at least one channel in the frequency field on which the information is to be broadcast in the at least one area.

30. A method in accordance with claim 29 wherein:

the programming of the at least one area is by a telephone call to another switch in the network containing the at least one area to be programmed and the identification number stored by the switch storing the subscriber file storing the identification number;

the network transmits the identification number and the at least on area which is being programmed to a switch identified by digits of the identification number stored by the switch storing the subscriber file storing the identification number; and the switch identified by digits of the identification number transmits the at least one area to the switch storing the identification number in response to the switch identified by the digits matching the identification number transmitted with the at least one area to the identification number stored in a table storing a plurality of identification numbers stored by the switch to be programmed by the at least one area.

* * * * *